US009043016B2

(12) United States Patent
Filippov et al.

(10) Patent No.: US 9,043,016 B2
(45) Date of Patent: May 26, 2015

(54) VERSATILE ROBOTIC CONTROL MODULE

(75) Inventors: Mikhail O. Filippov, Arlington, MA (US); Osa Fitch, Nashua, NH (US); Scott P. Keller, Still River, MA (US); John O'Connor, Bedford, NH (US); David S. Zendzian, Bedford, NH (US); Nadim El Fata, Winchester, MA (US); Kevin Larsen, Fargo, ND (US); Arlen Eugene Meuchel, West Fargo, ND (US); Mark David Schmaltz, Fargo, ND (US); James Allard, Newton, MA (US); Chris A. De Roo, Charlotte, NC (US); William Robert Norris, Rock Hill, SC (US); Andrew Julian Norby, West Des Moines, IA (US); Christopher David Glenn Turner, Waterloo, IA (US)

(73) Assignees: Deere & Company, Moline, IL (US); iRobot Corporation, Bedford, MA (US)

( * ) Notice: Subject to any disclaimer, the term of this patent is extended or adjusted under 35 U.S.C. 154(b) by 1365 days.

(21) Appl. No.: 11/584,084

(22) Filed: Oct. 20, 2006

(65) Prior Publication Data
US 2007/0219666 A1 Sep. 20, 2007

Related U.S. Application Data

(60) Provisional application No. 60/729,445, filed on Oct. 21, 2005, provisional application No. 60/729,388, filed on Oct. 21, 2005, provisional application No. 60/780,389, filed on Mar. 8, 2006, provisional application No. 60/838,704, filed on Aug. 18, 2006.

(51) Int. Cl.
G06F 19/00 (2011.01)
G05B 19/414 (2006.01)
(Continued)

(52) U.S. Cl.
CPC ............... *G05B 19/414* (2013.01); *B60T 7/22* (2013.01); *B60W 30/09* (2013.01); *B60W 30/095* (2013.01);
(Continued)

(58) Field of Classification Search
USPC ........ 700/245; 701/2, 23, 24, 25, 36, 41, 301; 235/462.03; 273/236; 446/175, 454, 446/465; 440/84
See application file for complete search history.

(56) References Cited

U.S. PATENT DOCUMENTS 4,155,417 A 5/1979 Ziems
4,202,037 A 5/1980 Glaser et al.
(Continued)

FOREIGN PATENT DOCUMENTS

DE 3404202 A1 5/1987
EP 1184254 3/2002
(Continued)

OTHER PUBLICATIONS

Yokokohji, et al., "Operation Modes for Cooperating with Autonomous Functions in Intelligent Teleoperation Systems," (seven pages) IEEE International Workshop on Robot and Human Communication, 1992.
(Continued)

*Primary Examiner* — John Q Nguyen
*Assistant Examiner* — Kyung Kim
(74) *Attorney, Agent, or Firm* — Kilpatrick Townsend & Stockton LLP

(57) ABSTRACT

Certain embodiments of the present invention provide robotic control modules for use in a robotic control system of a vehicle, including structures, systems and methods, that can provide (i) a robotic control module that has multiple functional circuits, such as a processor and accompanying circuits, an actuator controller, an actuator amplifier, a packet network switch, and a power supply integrated into a mountable and/or stackable package/housing; (ii) a robotic control module with the noted complement of circuits that is configured to reduce heat, reduce space, shield sensitive components from electro-magnetic noise; (iii) a robotic control system utilizing robotic control modules that include the sufficiently interchangeable functionality allowing for interchangeability of modules; and (iv) a robotic control system that distributes the functionality and processing among a plurality of robotic control modules in a vehicle.

48 Claims, 41 Drawing Sheets

(51) Int. Cl.

| | | |
|---|---|---|
| *B60T 7/22* | (2006.01) | |
| *B62D 1/28* | (2006.01) | |
| *G05D 1/00* | (2006.01) | |
| *G05D 1/02* | (2006.01) | |
| *B60W 30/09* | (2012.01) | |
| *B60W 30/095* | (2012.01) | |

(52) U.S. Cl.
CPC .............. *B62D 1/286* (2013.01); *G05D 1/0061* (2013.01); *G05D 1/024* (2013.01); *G05D 1/0246* (2013.01); *G05D 1/0251* (2013.01); *G05D 1/0259* (2013.01); *G05D 1/027* (2013.01); *G05D 1/0272* (2013.01); *G05D 1/0274* (2013.01); *G05D 1/0278* (2013.01); *G05D 1/028* (2013.01); *G05D 2201/0201* (2013.01); *G05D 2201/0202* (2013.01); *G05D 2201/0209* (2013.01); *G05D 2201/0213* (2013.01); *G05D 2201/0216* (2013.01); *Y10S 901/01* (2013.01); *Y10S 901/47* (2013.01)

(56) References Cited

U.S. PATENT DOCUMENTS

| | | | | |
|---|---|---|---|---|
| 4,297,734 | A | * | 10/1981 | Laishley et al. ............ 360/78.09 |
| 4,361,202 | A | | 11/1982 | Minovitch |
| 4,579,209 | A | | 4/1986 | Pacht |
| 4,791,544 | A | * | 12/1988 | Gautherin et al. ............ 363/49 |
| 4,945,647 | A | * | 8/1990 | Beneventano et al. ......... 33/321 |
| 4,985,845 | A | * | 1/1991 | Gotz et al. ................... 700/286 |
| 4,987,402 | A | * | 1/1991 | Nykerk ......................... 704/274 |
| 5,170,352 | A | * | 12/1992 | McTamaney et al. ......... 701/26 |
| 5,220,497 | A | | 6/1993 | Trovato et al. |
| 5,227,973 | A | * | 7/1993 | Marcantonio ................... 701/23 |
| 5,245,422 | A | | 9/1993 | Borcherts et al. |
| 5,400,864 | A | | 3/1995 | Winner et al. |
| 5,455,409 | A | * | 10/1995 | Smith et al. ................... 235/385 |
| 5,471,560 | A | | 11/1995 | Allard et al. |
| 5,508,689 | A | | 4/1996 | Rado et al. |
| 5,511,147 | A | | 4/1996 | Abdel-Malek |
| 5,555,503 | A | | 9/1996 | Kyrtsos et al. |
| 5,563,478 | A | * | 10/1996 | Suganuma .................... 318/116 |
| 5,600,561 | A | | 2/1997 | Okamura |
| 5,602,735 | A | | 2/1997 | Wada |
| 5,652,849 | A | | 7/1997 | Conway et al. |
| 5,675,229 | A | | 10/1997 | Thorne |
| 5,684,696 | A | | 11/1997 | Rao et al. |
| 5,715,902 | A | | 2/1998 | Petrovich et al. |
| 5,794,164 | A | * | 8/1998 | Beckert et al. ............... 455/3.06 |
| 5,831,826 | A | * | 11/1998 | Van Ryswyk ................. 361/719 |
| 5,920,172 | A | | 7/1999 | Bauer |
| 5,984,880 | A | | 11/1999 | Lander et al. |
| 5,995,883 | A | | 11/1999 | Nishikado |
| 6,008,985 | A | * | 12/1999 | Lake et al. ............... 361/679.32 |
| 6,038,496 | A | | 3/2000 | Dobler et al. |
| 6,053,270 | A | | 4/2000 | Nishikawa et al. |
| 6,055,042 | A | | 4/2000 | Sarangapani |
| 6,058,427 | A | * | 5/2000 | Viswanath et al. ........... 709/231 |
| 6,088,020 | A | | 7/2000 | Mor |
| 6,108,031 | A | | 8/2000 | King et al. |
| 6,113,395 | A | | 9/2000 | Hon |
| 6,169,940 | B1 | | 1/2001 | Jitsukata et al. |
| 6,198,992 | B1 | | 3/2001 | Winslow |
| 6,233,504 | B1 | | 5/2001 | Das et al. |
| 6,236,916 | B1 | | 5/2001 | Staub et al. |
| 6,253,161 | B1 | | 6/2001 | Arias-Estrada |
| 6,259,980 | B1 | | 7/2001 | Peck et al. |
| 6,321,147 | B1 | | 11/2001 | Takeda et al. |
| 6,356,819 | B1 | | 3/2002 | Winslow |
| 6,434,462 | B1 | | 8/2002 | Bevly et al. |
| 6,445,983 | B1 | | 9/2002 | Dickson et al. |
| 6,480,762 | B1 | | 11/2002 | Uchikubo et al. |
| 6,535,793 | B2 | | 3/2003 | Allard |
| 6,592,412 | B1 | | 7/2003 | Geil et al. |
| 6,600,986 | B2 | | 7/2003 | Steinle et al. |
| 6,633,800 | B1 | | 10/2003 | Ward et al. |
| 6,650,625 | B1 | * | 11/2003 | Norizuki et al. ............... 370/254 |
| 6,694,260 | B1 | | 2/2004 | Rekow |
| 6,760,654 | B2 | | 7/2004 | Beck |
| 6,789,014 | B1 | | 9/2004 | Rekow et al. |
| 6,813,557 | B2 | | 11/2004 | Schmidt et al. |
| 6,845,297 | B2 | | 1/2005 | Allard |
| 6,873,911 | B2 | | 3/2005 | Nishira et al. |
| 6,901,319 | B1 | | 5/2005 | Nelson et al. |
| 6,927,699 | B2 | | 8/2005 | Samukawa et al. |
| 6,950,882 | B1 | | 9/2005 | Weber et al. |
| 6,975,246 | B1 | | 12/2005 | Trudeau |
| 7,024,278 | B2 | | 4/2006 | Chiappetta et al. |
| 7,123,522 | B2 | * | 10/2006 | Ho et al. .................. 365/189.11 |
| 7,188,000 | B2 | | 3/2007 | Chiappetta et al. |
| 7,299,057 | B2 | | 11/2007 | Anderson |
| 2001/0018640 | A1 | | 8/2001 | Matsunaga |
| 2001/0056544 | A1 | | 12/2001 | Walker |
| 2002/0022909 | A1 | | 2/2002 | Karem |
| 2002/0035416 | A1 | * | 3/2002 | De Leon ......................... 701/14 |
| 2002/0104300 | A1 | | 8/2002 | Hunt |
| 2002/0110155 | A1 | * | 8/2002 | Pearce et al. .................. 370/519 |
| 2002/0136939 | A1 | * | 9/2002 | Grieve et al. ..................... 429/23 |
| 2002/0169531 | A1 | | 11/2002 | Kawazoe et al. |
| 2003/0023348 | A1 | | 1/2003 | Inoue et al. |
| 2003/0032335 | A1 | * | 2/2003 | Garnett et al. ................. 439/638 |
| 2003/0038842 | A1 | | 2/2003 | Peck et al. |
| 2003/0080772 | A1 | | 5/2003 | Giacomini et al. |
| 2004/0052047 | A1 | * | 3/2004 | Bresniker ...................... 361/687 |
| 2004/0061596 | A1 | | 4/2004 | Egami |
| 2004/0114584 | A1 | | 6/2004 | Patz et al. |
| 2004/0158379 | A1 | | 8/2004 | Horbaschek |
| 2004/0168837 | A1 | | 9/2004 | Michaud et al. |
| 2004/0193363 | A1 | | 9/2004 | Schmidt et al. |
| 2004/0217881 | A1 | * | 11/2004 | Pedyash et al. .......... 340/870.07 |
| 2004/0239490 | A1 | | 12/2004 | Chiba et al. |
| 2004/0243285 | A1 | | 12/2004 | Gounder |
| 2005/0002419 | A1 | | 1/2005 | Doviak et al. |
| 2005/0021195 | A1 | | 1/2005 | Zeitler et al. |
| 2005/0021860 | A1 | * | 1/2005 | Kelly et al. .................... 709/246 |
| 2005/0092542 | A1 | | 5/2005 | Turner |
| 2005/0159870 | A1 | | 7/2005 | Tohdo et al. |
| 2005/0216181 | A1 | | 9/2005 | Estkowski et al. |
| 2005/0264998 | A1 | * | 12/2005 | McCutcheon et al. ......... 361/702 |
| 2006/0014439 | A1 | * | 1/2006 | Mundry et al. ................ 439/638 |
| 2006/0022625 | A1 | * | 2/2006 | Hampo et al. ................. 318/432 |
| 2006/0073761 | A1 | * | 4/2006 | Weiss et al. .................... 446/456 |
| 2006/0075176 | A1 | * | 4/2006 | Okamoto ....................... 710/305 |
| 2006/0095207 | A1 | | 5/2006 | Reid |
| 2006/0106496 | A1 | | 5/2006 | Okamoto |
| 2006/0178828 | A1 | | 8/2006 | Moravec |
| 2006/0214253 | A1 | | 9/2006 | Camagna et al. |
| 2006/0237968 | A1 | * | 10/2006 | Chandrasekaran ........... 290/1 R |
| 2006/0267777 | A1 | * | 11/2006 | Moore ......................... 340/572.8 |
| 2007/0193798 | A1 | | 8/2007 | Allard et al. |
| 2007/0198144 | A1 | | 8/2007 | Norris et al. |
| 2007/0198145 | A1 | | 8/2007 | Norris et al. |
| 2009/0024357 | A1 | | 1/2009 | Aso et al. |
| 2009/0125175 | A1 | | 5/2009 | Park et al. |
| 2011/0071718 | A1 | | 3/2011 | Norris et al. |
| 2011/0208357 | A1 | | 8/2011 | Yamauchi |
| 2012/0046820 | A1 | | 2/2012 | Allard et al. |

FOREIGN PATENT DOCUMENTS

| | | |
|---|---|---|
| EP | 14881945 | 12/2004 |
| GB | 2128842 A | 8/1983 |
| JP | 11149315 A | 6/1999 |
| WO | WO 99/05580 | 2/1999 |
| WO | WO 01/26338 A2 | 4/2001 |
| WO | WO 2004/086084 | 10/2004 |
| WO | WO 2007/048029 | 4/2007 |
| WO | WO 2007/050406 | 5/2007 |
| WO | WO 2007/050407 | 5/2007 |

OTHER PUBLICATIONS

International Search Report and Written Opinion for PCT/US2006/040801 (ten pages), dated Mar. 1, 2007.

(56) References Cited

OTHER PUBLICATIONS

International Search Report and Written Opinion for PCT/US2006/040800 (eight pages), dated Mar. 1, 2007.
International Search Report and Written Opinion for PCT/US2006/041227 (fifteen pages), dated Jun. 11, 2007.
International Preliminary Report on Patentability for PCT/US2006/040801 (eight pages), dated Apr. 23, 2008.
International Preliminary Report on Patentability for PCT/US2006/041177 (twelve pages), dated Apr. 23, 2008.
International Preliminary Report on Patentability for PCT/US2006/041227 (eleven pages), dated Apr. 23, 2008.
International Preliminary Report on Patentability for PCT/US2006/040800 (seven pages), dated Apr. 23, 2008.
Non-Final Office Action for U.S. Appl. No. 11/584,085 (nine pages), mailed Aug. 31, 2009.
Non-Final Office Action for U.S. Appl. No. 11/584,087 (sixteen pages), mailed Aug. 31, 2009.
Non-Final Office Action for U.S. Appl. No. 11/584,097 (six pages), mailed Sep. 1, 2009.
Response to Restriction Requirement for U.S. Appl. No. 11/584,085 (ten pages), dated Sep. 30, 2009.
Response to Restriction Requirement for U.S. Appl. No. 11/584,097 (twelve pages), dated Oct. 1, 2009.
Response to Restriction Requirement for U.S. Appl. No. 11/584,087 (three pages), dated Oct. 22, 2009.
Non-Final Office Action for U.S. Appl. No. 11/584,085 (ten pages), mailed Dec. 16, 2009.
Non-Final Office Action for U.S. Appl. No. 11/584,097 (five pages), mailed Dec. 23, 2009.
Response to Restriction Requirement for U.S. Appl. No. 11/584,097 (three pages), dated Feb. 11, 2010.
Non-Final Office Action for U.S. Appl. No. 11/584,087 (sixteen pages), mailed Feb. 19, 2010.
Patent Abstracts of Japan, JP 2000094373 A, Apr. 4, 2000, Takahashi Katsunori.
Corbett, G.K., et al., "A Human Factors Tested for Ground-Vehicle Telerobotics Research," *Southeastcon '90 Proceedings*, vol. 2, pp. 618-620, 1990.
Shimoga, et al., "Touch and Force Reflection for Telepresence Surgery, " *IEEE*, pp. 1049-1050, 1994.
Mair, "Telepresence—The Technology and Its Economic an Social Implications," *IEEE*, pp. 118-124, 1997.
Ohashi et al., "The Sensor Arm and the Sensor Glove II—Haptic Devices for VR Interface," *IEEE*, p. 785, 1999.
Green, P.S., et al., "Telepresence Surgery," *IEEE*, Engeneering in Medicine and Biology, pp. 324-329, May/Jun. 1995.
Naki, et al., "7 DOF Arm Type Haptic Interface for Teleoperation and Virtual Reality Systems," *Proceedings of the 1998 IEEE/RSJ Intl. Conference on Intelligent Robots and Systems*, pp. 1266-1271, 1998.
"Tech Firm Showing Off Gadgets for Consumers," *The Wall Street Journal*, 2001.
"Introducing the iRobot-LE," iRobot Corpation, http://www.irobot.com/ir/index.htm Retrieval Date Dec. 5, 2000.
Department of Energy, Technology Application, "Tactical Robotic Vehicle Aids in Battlefield Surveillance," *NTIS Tech Notes*, Springfield, VA, Dec. 1990.
International Search Report and the Written Opinion for PCT/US2006/041177 dated Jun. 11, 2007.
Spofford, John R., et al., *"Description of the UGV / Demo II System,"* Proceedings: Association for Unmanned Vehicle Systems International Conference, 1997, pp. 255-264 (12 pages).
*Astronomical Data Analysis Software & Systems XIV*, Pasadena, CA, Oct. 24-27, 2004 (194 pages).
Beard, A, et al., *"The Use of CANbus in CARMA,"* Astronomical Data Analysis Software & Systems XIV, Pasadena, CA, Oct. 24-27, 2004, p. 153 (1 page).
Rankin, Arturo L., et al.*"Passive perception system for day/night autonomous off-road navigation,"* Proceedings of the SPIE Defense and Security Symposium: Unmanned Ground Vehicle Technology VI Conference, Mar. 2005 (16 pages).

Wikipedia, *"Internet Protocol Suite,"* http://en.wikipedia.org/wiki/Internet_Protocol_Suite, accessed Apr. 13, 2010) (5 pages).
Amendment and Response to Non-Final Office Action for U.S. Appl. No. 11/584,085, filed Apr. 15, 2010 (15 pages).
Final Office Action for U.S. Appl. No. 11/584,085, mailed May 10, 2010 (11 pages).
Non-Final Office Action for U.S. Appl. No. 11/584,097, mailed May 26, 2010 (6 pages).
Amendment and Response for U.S. Appl. No. 11/584,087, filed Jun. 21, 2010 (33 pages).
Examination Report under Section 18(3) from UK Intellectual Property Office for Application No. GB807131.8 (corresponding to the present application), dated Jul. 12, 2010 (5 pages).
Amendment and Response to Final Office Action for U.S. Appl. No. 11/584,085, filed Oct. 25, 2010 (16 pages).
Amendment and Response to Non-Final Office Action for U.S. Appl. No. 11/584,097, filed Oct. 25, 2010 (13 pages).
Advisory Action for U.S. Appl. No. 11/584,085, mailed Nov. 4, 2010 (3 pages).
Amendment and Response to Final Office Action for U.S. Appl. No. 11/584,085, filed Nov. 26, 2010 (16 pages).
Final Office Action for U.S. Appl. No. 11/584,085, mailed Aug. 25, 2010 (14 pages).
Notice of Allowance for U.S. Appl. No. 11/584,087, mailed Sep. 2, 2010, (6 pages).
U.S. Appl. No. 11/584,097, Office Action mailed on Jan. 5, 2011, 5 Pages.
GB Patent Application No. 0807131.8, Response filed May 3, 2011 (8 pages).
GB Patent Application No. 0807131.8, Office Action dated Feb. 4, 2011 (2 pages).
GB Patent Application No. 0807131.8, Response filed Jan. 2, 2011 (11 pages).
GB Patent Application No. 0807131.8, Office Action dated Jul. 12, 2010 (4 pages).
Israel Patent Application No. 191001, Response, filed May 24, 2011 (33 Pages).
United Kingdom Application No. GB0807131.8, Response to Examination Report, filed Jul. 8, 2011 (22 pages).
Australian Application No. 2006304812, "First Examination Report," mailed May 6, 2010, (2 pages).
Australian Application No. 2006304812, "Response to Office Action," filed May 19, 2011, (24 pages).
Australian Application No. 2006304812, "Second Examination Report," issued Aug. 11, 2011, (2 pages).
Uk Patent Application No. 0807131.8, "Examination Report Under Section 18(3)," mailed Jul. 8, 2011 (1 page).
Uk Patent Application No. 0807131.8, "Notification of Grant," mailed Jul. 26, 2011 (2 pages).
Response to Final Office Action for U.S. Appl. No. 11/584,097, filed May 5, 2011 (8 pages).
Notice of Allowance for U.S. Appl. No. 11/584,097, mailed May 19, 2011 (7 pages).
Israeli Patent Application No. 191001, Office Action mailed Nov. 28, 2011 (7 pages).
Australian Patent Application No. 2006304812, Notice of Acceptance, mailed Jan. 11, 2012 (3 pages).
Australian Patent Application No. 2006304812, Response to Second Examination Report, filed Oct. 6, 2011 (43 pages).
Non-Final Office Action for U.S. Appl. No. 12/959,429, mailed Feb. 10, 2012 (9 pages).
U.S. Appl. No. 12/959,429, Amendment with Request for Continued Examination filed Jan. 2, 2013 (13 pages).
U.S. Appl. No. 11/584,085, Amendment and Response to Non-Final Office Action filed Feb. 5, 2013 (12 pages).
Gharapetian et al., "An Object-Oriented Data Fusion System for Mobile Vehicle", IEEE, 1995, pp. 1404-1409.
Fiorini et al., "Motion Planning in Dynamic Environments Using Velocity Obstacles", Int. J. Robotics Res., 1998, pp. 1-27.
Prassler et al., "Tracking Multiple Moving Objects for Real-Time Robot Navigation", Autonomous Robots, 2000, 15 pages.
Prassler et al., "A Robotic Wheelchair for Crowded Public Environments", IEEE, Mar. 2001, pp. 38-45.

(56) References Cited

OTHER PUBLICATIONS

Krishna et al., "When Does a Robot Perceive a Dynamic Object?", Journal of Robotic Systems, vol. 19, No. 2, 2002, pp. 73-90.

Bedkowski et al., "3D Laser Range Finder Simulation Based on Rotated LMS SICK 200", Proceedings of the EURON/IARP International Workshop on Robotics for Risky Interventions and Surveillance of the Environment, Jan. 2008, 7 pages.

U.S. Appl. No. 13/212,696, Non-Final Office Action, mailed Jun. 21, 2013, 27 pages.

U.S. Appl. No. 12/959,429, Response to Restriction Requirement filed Mar. 12, 2012 (10 pages).

U.S. Appl. No. 12/959,429, Non-Final Office Action mailed Apr. 26, 2012 (16 pages).

U.S. Appl. No. 11/584,085, Non-Final Office Action mailed May 10, 2012 (21 pages).

U.S. Appl. No. 12/959,429, Response to Non-Final Office Action filed Jul. 24, 2012 (21 pages).

U.S. Appl. No. 11/584,085, Response to Non-Final Office Action filed Aug. 9, 2012 (16 pages).

U.S. Appl. No. 12/959,429, Final Office Action mailed Oct. 1, 2012 (17 pages).

U.S. Appl. No. 11/584,085, Non-Final Office Action mailed Oct. 12, 2012 (16 pages).

U.S. Appl. No. 13/212,696, Non-Final Office Action, mailed Oct. 11, 2013, 25 pages.

Weingarten, Jan, et al., EFK-based 3D SLAM for Structured Environment Reconstruction, IEEE, Aug. 2005, 6 pages.

U.S. Appl. No. 12/959,429, Non-Final Office Action mailed Sep. 25, 2013, 17 pages.

U.S. Appl. No. 12/959,429, Final Office Action mailed Mar. 13, 2014, 17 pages.

U.S. Appl. No. 13/902,026, Final Office Action mailed Apr. 11, 2014, 10 pages.

U.S. Appl. No. 13/212,696, Final Office Action mailed Apr. 23, 2014, 31 pages.

U.S. Appl. No. 12/959,429, Non-Final Office Action mailed Sep. 4, 2014, 15 pages.

U.S. Appl. No. 12/959,429, Final Office Action mailed Dec. 3, 2014 (16 pages).

U.S. Appl. No. 13/902,026, Non-Final Office Action mailed Dec. 9, 2013, 9 pages.

U.S. Appl. No. 12/959,429, Advisory Action mailed Jul. 7, 2014, 3 pages.

U.S. Appl. No. 13/212,696, Notice of Allowance mailed Aug. 15, 2014, 10 pages.

U.S. Appl. No. 13/902,026, Non-Final Office Action mailed Jan. 23, 2015, 11 pages.

Lin, Charles, "Big and Little Endian", Mar. 10, 2003, University of Maryland, http://www.cs.umd.edu/class/sum2003/cmsc311/Notes/Data/endian.html, 6 pages.

US 6,650,882, 11/2003, Nokes et al. (withdrawn)

\* cited by examiner

VERSATILE ROBOTIC CONTROL MODULE

RELATED APPLICATIONS

This application claims the benefit of U.S. Provisional Patent Application No. 60/729,445, filed Oct. 21, 2005, U.S. Provisional Patent Application No. 60/729,388, filed Oct. 21, 2005, U.S. Provisional Patent Application No. 60/780,389, filed Mar. 8, 2006 and U.S. Provisional Patent Application No. 60/838,704, filed Aug. 18, 2006, each of which is incorporated herein by reference in its entirety.

This application is related to U.S. Patent Application entitled, "Systems and Methods for Switching Between Autonomous and Manual Operation of a Vehicle" U.S. Ser. No. 11/584,087, U.S. Patent Application entitled, "Systems and Methods for Obstacle Avoidance" U.S. Ser. No. 11/584,097, and U.S. Patent Application entitled, "Networked Multi-Role Robotic Vehicle" U.S. Ser. No. 11/584,085, each of which was filed on Oct. 20, 2006 and incorporated herein by reference in its entirety.

FIELD OF THE INVENTION

This invention relates generally to systems and methods for autonomous control of vehicles and vehicular sensors, actuators, and/or communications. More particularly, embodiments of this invention relate to a versatile robotic control module, and systems and methods utilizing the robotic control module for controlling the autonomous operation of a vehicle and/or vehicle sensors, actuators, and/or communications.

BACKGROUND OF THE INVENTION

Robotic or autonomous vehicles (sometimes referred to as mobile robotic platforms) generally have a robotic control system that controls the operational systems of the vehicle. In a vehicle that is limited to a transportation function, the operational systems may include steering, braking, transmission, and throttle systems. In October 2005, five autonomous vehicles (of twenty-three finalist vehicles) successfully completed the "Grand Challenge" of the United States Defense Advanced Research Projects Administration (DARPA), a competition requiring fully robotic vehicles to traverse a course covering more than one hundred miles. These vehicles were outfitted with robotic control systems in which a bank of computers controlled all of the operational systems of the vehicle, such as the steering, braking, transmission, and throttle, subject to autonomous decisions made by programs on board the vehicle in response to sensor input, without human intervention on the course itself.

Such autonomous vehicles generally have a centralized robotic control system for control of the operational systems of the vehicle. A typical configuration is a standard office rack mount with several 1U or 2U "blade server" configuration personal computers (three finishing vehicles had six or more of these), and/or workstation class (Itanium, Xeon) servers. Many such vehicles include DC to household AC power conversion, and then plug in the controlling computers (as if in an office environment). Other power supplies are specific or dedicated to the sensor or actuator. Separate diesel generators are were used to generate onboard power for the computer banks. Actuator control and amplification/driving is typically handled by separate motor controllers and amplifiers placed close to their actuated system. These centralized robotic control systems are generally bulky and take up a fair amount of space in the vehicle. For example, some of the vehicles had no passenger compartment at all. Space savings is an issue for autonomous vehicles in general, but especially those that can also be used as manned vehicles. In combination manned/autonomous vehicles it is desirable not to take up space used for persons or payload. In high-tolerance, extreme environment vehicles such as military vehicles, available space is at a premium, there being little weight or space to spare.

Some military vehicles have been adapted for autonomous operation. In the U.S., some tanks, personnel carriers (e.g., Stryker) vehicles, and other vehicles have been adapted for autonomous capability. Generally, these are to be used in a manned mode as well. However, these programs are in some ways similar to the Grand Challenge vehicles, at least because they typically result in a large central processing box and a set of power supply, sensor control, motor control, and communications packages that are each hardened and that each affects payload, cargo, or passenger compartments.

A brief catalog of some of the problems associated with the approach taken in almost all of these vehicles includes:

1) Every significant addition of literally any kind of resource—sensor, actuator, compute, or communications, among others—requires significant redesign: providing appropriate power or actuation, routing power to the resource, providing appropriate communication channels, routing communication lines, housing and mounting, heat budget, electromagnetic noise, providing computation or processing to control the resource.

2) Every solution is purpose built for the vehicle adapted, and typically cannot be used on other vehicles (except of similar configuration). All of power, network communications, actuator control are provided ad hoc. No vehicle-wide network is established for any of these.

3) As noted above, passenger and/or payload areas are usually compromised, unless the vehicle is quite large. Even if passenger or payload areas remain useful, they are not useful for long-term use, in view of the exposed wiring, exposed heat sinks, or exposed electronics in the passenger or payload compartments.

4) None consider the problems of survivability or depot-level maintenance (important for high-tolerance, extreme environment vehicles managed in fleets such as emergency or military vehicles).

The Standard Teleoperation System (STS), Standard Robotics System (SRS), or Common Robotics System (Omnitech Robotics International, Englewood, Colo.) were attempts to provide a kit adaptable to a wide range of vehicles for teleoperation. The STS, SRS, or CRS are robust packaging for a wide variety of functional units. For example, each of a vehicle control unit, power system unit, system input/output unit, mobile radio unit, video multiplexer unit, and numerous other system elements is a separately packaged unit that must be connected to the others via CAN bus or RS-232 serial connections. One element, a 17 kilogram, 8 liter "high integration actuator", includes a linear actuator (motor) as well as position and feedback sensors; a power amplifier; a digital servo processor, and a microcontroller with a CAN interface. The processor and microcontroller are used to control the motor bound in the package, and are not reconfigurable or available to different or other control outside motors or sensors. This unit is essentially an integrated motor package, a so-called "smart actuator".

While the Omnitech's Standard Robotics System has been adapted to a wide range of vehicles, including tractors, forklifts, earthmovers, mine clearing tanks, this system has several shortcomings for autonomous/manual use. It is slightly more integrated than the adapted vehicles discussed above, but only when using its own actuators. It lacks any capability for high-bandwidth communications necessary for autonomous use (i.e., to carry interpretable and interpreted sensor data to supervisory robotics control), and were such added, even more bulk would be added. Again, were such added, even more bulk would be added. No component, including the vehicle control unit, includes sufficient processing power for autonomous behaviors (e.g., usually 500-1000 MIPS, although less is possible with less autonomy). Lacking the capability for autonomous control, it inherently lacks the ability for autonomous safety management (for example, partial teleoperation, in which, for example, obstacle avoidance behavior can override operator control). It is restricted to its own actuator suite. A separate power supply is part of the system, but this may not be suitable for laser scanners or radios, which (among other components) are sensitive to power quality and to EM noise.

SUMMARY

Embodiments of the invention provide robotic control modules for use in a robotic control system of a vehicle, including structures, systems and methods, that provide (i) a robotic control module that has multiple functional circuits, such as a processor and accompanying circuits, an actuator controller, an actuator amplifier, a packet network switch, and a power supply integrated into a mountable and/or stackable package/housing; (ii) a robotic control module with the noted complement of circuits that is configured to reduce heat, reduce space, shield sensitive components from electro-magnetic noise; (iii) a robotic control system utilizing robotic control modules that include the sufficiently interchangeable functionality allowing for interchangeability of modules; and (iv) a robotic control system that distributes the functionality and processing among a plurality of robotic control modules in a vehicle, i.e., most advantageously without a central site for processing.

For example, in one embodiment of the present invention, a robotic control unit for use in an autonomous vehicle comprises a robotic control apparatus for a mobile robotic platform, comprising: a mountable housing; a reprogrammable actuator controller within the mountable housing, an actuator connector available on the exterior of the mountable housing communicating a signal for actuator driving that is modulated by the reprogrammable actuator controller; a packet network switch within the mountable housing, each of a plurality of network connectors available on the exterior of the mountable housing being capable of connection to a packet network and communicating with the packet network switch, the packet network being capable of relaying instructions for the reprogrammable actuator controller; and a power supply within the mountable housing, the power supply receiving unregulated power from the mobile robotic platform through a power input to the mountable housing and converting the unregulated power into interior regulated power for the packet network switch and the reprogrammable actuator controller and into exterior regulated power, a power supply connector available on the exterior of the mountable housing being capable of connection to the exterior regulated power. This configuration has some of the advantages discussed above.

In one embodiment of the robotic control apparatus for the mobile robotic platform, the signal for actuator driving may be an actuator control signal for an actuator amplifier that is modulated by the reprogrammable actuator controller. The signal for actuator driving may be an actuator driving signal from an actuator amplifier that is modulated by the reprogrammable actuator controller and the actuator amplifier. The reprogrammable actuator controller may include one of a digital signal processor, programmable logic device or gate array (or equivalent logic device), and wherein at least part of the processing capability of the reprogrammable actuator controller controls signals other than a signal for actuator driving (or executes other code, such as a CAN protocol stack).

In one embodiment of the present invention, a robotic control apparatus for a mobile robotic platform, comprises: a mountable housing; a reprogrammable actuator controller within the mountable housing capable of issuing actuator control signals within the mountable module; an actuator amplifier within the mountable housing that receives the actuator control signal from the reprogrammable actuator controller, an actuator connector available on the exterior of the mountable module communicating an actuator drive signal modulated by the reprogrammable actuator controller and the actuator amplifier; a packet network switch within the mountable housing, each of a plurality of network connectors available on the exterior of the mountable housing being capable of connection to a packet network and communicating with the packet network switch, the packet network being capable of relaying instructions for the reprogrammable actuator controller; and a power supply within the mountable housing, the power supply receiving unregulated power from the mobile robotic platform through a power input to the mountable housing and converting the unregulated power into interior regulated power for the packet network switch and the reprogrammable actuator controller and into exterior regulated power, a power supply connector available on the exterior of the mountable housing being capable of connection to the exterior regulated power.

In one embodiment of the present invention, a robotic control apparatus for a mobile robotic platform, comprises: a mountable housing; a microprocessor board with code execution dynamic memory and code storage nonvolatile memory within the mountable module, the microprocessor board being capable of executing and arbitrating among robotic control behaviors; a reprogrammable actuator controller within the mountable housing capable of issuing actuator control signals within the mountable housing according to the robotic control behaviors; an actuator amplifier within the mountable housing that receives the actuator control signal from the reprogrammable actuator controller, an actuator connector available on the exterior of the mountable housing communicating an actuator drive signal modulated by the reprogrammable actuator controller and the actuator amplifier; a packet network switch within the mountable housing, each of a plurality of network connectors available on the exterior of the mountable housing being capable of connection to a packet network and communicating with the packet network switch, the packet network being capable of relaying instructions for the reprogrammable actuator controller; and a power supply within the mountable housing, the power supply receiving unregulated power from the mobile robotic platform through a power input to the mountable housing and converting the unregulated power into interior regulated power for the microprocessor board, the reprogrammable actuator controller, and the packet network switch and into exterior regulated power, a power supply connector available on the exterior of the mountable housing being capable of connection to the exterior regulated power.

In one embodiment of the present invention, a robotic control apparatus for a mobile robotic platform, comprises: a mountable housing; a microprocessor board with code execution dynamic memory and code storage nonvolatile memory within the mountable module, the microprocessor board being capable of executing and arbitrating among robotic control behaviors; a packet network switch within the mountable housing, each of a plurality of network connectors available on the exterior of the mountable housing being capable of connection to a packet network and communicating with the packet network switch, the packet network being capable of relaying instructions from the microprocessor board; and a power supply within the mountable housing, the power supply receiving unregulated power from the mobile robotic platform through a power input to the mountable housing and converting the unregulated power into interior regulated power for the microprocessor board, and the packet network switch and into exterior regulated power, a power supply connector available on the exterior of the mountable housing being capable of connection to the exterior regulated power.

In one embodiment of the present invention, a robotic control apparatus for a mobile robotic platform, comprises: a mountable housing; a microprocessor board with code execution dynamic memory and code storage nonvolatile memory within the mountable housing, the microprocessor board further including a plurality of protocol transceivers and being capable of executing transceiver monitoring code, a multi-pin connector available on the exterior of the mountable housing being capable of communicating with the plurality of protocol transceivers sensors; a reprogrammable actuator controller within the mountable housing capable of issuing actuator control signals within the mountable housing; an actuator amplifier within the mountable housing that receives the actuator control signal from the reprogrammable actuator controller, an actuator connector available on the exterior of the mountable housing communicating an actuator drive signal modulated by the reprogrammable actuator controller and the actuator amplifier; a packet network switch within the mountable housing, each of a plurality of network connectors available on the exterior of the mountable housing being capable of connection to a packet network and communicating with the packet network switch, the packet network being capable of relaying instructions for the reprogrammable actuator controller; and a power supply within the mountable housing, the power supply receiving unregulated power from the mobile robotic platform through a power input to the mountable housing and converting the unregulated power into interior regulated power for the microprocessor board, the reprogrammable actuator controller, and the packet network switch and into exterior regulated power, a power supply connector available on the exterior of the mountable housing being capable of connection to the exterior regulated power.

In one embodiment of the present invention, a robotic control unit for use in an autonomous vehicle, comprises: a single housing; a power supply positioned in the housing; a processor module positioned in the housing; a motor controller positioned in the housing; a motor amplifier positioned proximate to the motor controller in the housing; and an Ethernet switch/router positioned in the housing.

In one embodiment of the present invention, a robotic control unit for use in an autonomous vehicle, comprises: a housing; and a processor contained in the housing, wherein the robotic control unit is capable of controlling at least one motor associated with an operating system of the autonomous vehicle, and wherein the robotic control unit is capable of receiving unregulated vehicle power and outputting regulated power.

In one embodiment of the present invention, robotic control packaging for a mobile robotic platform, comprises: a housing formed as a flat rectangular prism of six face panels, front and rear faces of the housing being defined on the smallest surface panels of the six surface panels; a first circuit board arranged within the housing, extending from the front face to the rear face, the first circuit board including a signal processor sensitive to electromagnetic noise arranged toward the front face of the housing; a second circuit board arranged within the housing parallel to the first circuit board, extending from the front face to the rear face, the second circuit board including a motor amplifier inductor and a power supply inductor both arranged toward the rear face of the housing and both generating electromagnetic noise; and a third circuit board arranged within the housing parallel to each of the first and second circuit boards and intermediate the first circuit board and the second circuit board, the third circuit board shielding the signal processor from the electromagnetic noise generated by the motor amplifier inductor and power supply inductor.

According to one embodiment, the first circuit board and the second circuit board may define there between a flat intermediate volume, each of the motor amplifier inductor, power supply inductor, and third circuit board, and at least some components of the first circuit board and of the second circuit board extend into the flat intermediate volume by an amount such that such components of the first circuit board and second circuit board overlap within the flat intermediate volume. The robotic controller packaging for a mobile robotic platform may further be configured such that the housing is made from heat conductive material; the first circuit board includes power supply circuitry generating internal heat connected to the housing via a direct heat conductive path; and the second circuit board includes motor amplifier circuitry generating internal heat connected to the module via a direct heat conductive path, so that the housing acts as a heat sink for each of the power supply circuitry and the motor amplifier circuitry. The motor amplifier circuitry generating internal heat may include a plurality of FETs or MOSFETs (or other classes of transistors used for the same purpose), and such FETs or MOSFETs can be each arranged to directly contact the housing connected to the housing so that the housing acts as a heat sink for the plurality of FETs or MOSFETs.

An embodiment of the present invention includes a method of fitting an existing mobile platform with robotic control packaging and comprises: forming a plurality of mountable modules as flat rectangular prisms of six surface panels, front and rear faces of each mountable module being defined on the smallest surface panels of the six surface panels, the front and rear faces having distributed between them a power input, an actuator connector, a plurality of network connectors, and a power supply connector; selecting a plurality of mounting sites for the plurality of mountable modules on the existing mobile platform, at least some of the mounting sites being idle space within interior compartments of the existing mobile platform through which no moving part passes; mounting a plurality of the mountable modules within the mounting sites; connecting all of the mountable modules to form a communications network among the network connectors; connecting all of the mountable modules via the power input to a power source of the existing mobile platform; connecting selected ones of the mountable modules to a corresponding actuator proximate thereto to be driven via the actuator connector; and connecting selected ones of the mountable modules to a corresponding sensor proximate thereto to be powered by the power supply.

In one embodiment, the mountable modules are identical in terms of size and functionality. In another embodiment, the mountable modules can be distinct. In one advantageous embodiment, all interior components and exterior components are identical, permitting easy "swappable" maintenance in a depot environment.

An embodiment of the present invention includes a method of forward- or retro-fitting a vehicle for autonomous control, comprising: identifying idle spaces in the vehicle; distributing a plurality of robotic control units in the idle spaces, wherein the robotic control units each comprise a power supply and a processor and at least one of a motor controller, a motor amplifier, or an Ethernet switch/router; and connecting the robotic control units so the robotic control units can communicate with each other and at least one operating system of the vehicle.

In one embodiment of the present invention, a robotics kit for use on a vehicle, comprises: at least one robotic control unit having a single housing configurable to have at least three of a power supply, an Ethernet switch/router, a motor controller, a motor amplifier, or a processor in the housing, wherein the housing is sized to fit into available idle spaces in the vehicle. The dimensions of the robotic control unit may be a maximum of 5 inches by 8 inches by 10 inches. However, the dimensions are preferably approximately 200 mm×250 mm×50 mm in +/−50 mm increments (of course, the 50 mm dimension is a minimum guideline)

In one embodiment of the present invention, a robotic control system for a mobile robotic platform, comprises: a plurality of interchangeable mountable modules, each interchangeable mountable module including a power input, an actuator connector, a plurality of network connectors, and a power supply connector available on the exterior of the interchangeable mountable module, and each interchangeable mountable module including: an actuator controller, the actuator connector communicating a signal for actuator driving that is modulated by the reprogrammable actuator controller; a packet network switch, each network connector being capable of connection to a packet network and communicating with the packet network switch, the packet network being capable of relaying instructions for the actuator controller; and a power supply, the power supply receiving unregulated power from the mobile robotic platform through the power input and converting the unregulated power into interior regulated power for the packet network switch and the reprogrammable actuator controller and into exterior regulated power, the power supply connector being connected to the exterior regulated power; and a memory including executable code, each interchangeable mountable module being configurable to execute a selected part of the executable code, such that each of the plurality of interchangeable mountable modules may be provided with multiple possible executable code parts for different modular roles and each of the plurality of interchangeable mountable modules is configurable to execute only the selected part of the executable code appropriate for a selected modular role.

In one embodiment of the present invention, a robot, comprises: a platform having a body and a motor connected to a drive having steering control and speed control; a plurality of interchangeable mountable modules, each interchangeable mountable module including a power input, an actuator connector, a plurality of network connectors, and a power supply connector available on the exterior of the interchangeable mountable module, and each interchangeable mountable module including therewithin: a reprogrammable actuator controller capable of issuing actuator control signals; an actuator amplifier that receives the actuator control signal from the reprogrammable actuator controller, the actuator connector communicating an actuator drive signal modulated by the reprogrammable actuator controller and the actuator amplifier; a packet network switch, each of the plurality of network connectors being capable of connection to a packet network and communicating with the packet network switch, the packet network being capable of relaying instructions for the reprogrammable actuator controller; and a memory including executable code, each interchangeable mountable module being configurable to execute a selected part of the executable code, such that each of the plurality of interchangeable mountable modules may be provided with multiple possible executable code parts for different modular roles and each of the plurality of interchangeable mountable modules is configurable to execute only the selected part of the executable code appropriate for a selected modular role, wherein one interchangeable mountable module is mounted to control an actuator for the steering control of the drive, and one interchangeable mountable module is mounted to control an actuator for the speed control of the drive.

The speed control of the robot can include at least two of throttle controls for the drive, direction control for the drive, or braking control for the drive, and wherein two interchangeable mountable modules can be mounted to control actuators for such two of the throttle control for the drive, direction control for the drive, or braking control for the drive.

In one embodiment of the present invention, a robot, comprises: a platform having a body and a motor connected to a drive; a plurality of interchangeable mountable modules, each interchangeable mountable module including a power input, a plurality of network connectors, and a multi-pin connector available on the exterior of the interchangeable mountable module, and each interchangeable mountable module includes: a microprocessor board with code execution dynamic memory and code storage nonvolatile memory, the microprocessor board further including a plurality of protocol transceivers and being capable of executing transceiver monitoring code, the multi-pin connector being capable of communicating with the plurality of protocol transceivers sensors; a packet network switch, each of the plurality of network connectors being capable of connection to a packet network distributed through the body and communicating with the packet network switch, the packet network being capable of relaying instructions for or from the microprocessor board; and a power supply, the power supply receiving unregulated power from the platform through the power input and converting the unregulated power into interior regulated power for the microprocessor board and the packet network switch and into exterior regulated power, them multi-pin connector being connected to the exterior regulated power; and a memory including executable code, each interchangeable mountable module being configurable to execute a selected part of the executable code, such that each of the plurality of interchangeable mountable modules may be provided with multiple possible executable code parts for different modular roles and each of the plurality of interchangeable mountable modules is configurable to execute only the selected part of the executable code appropriate for a selected modular role.

In one embodiment of the present invention, a distributed computing system for a robot, comprises: a robot platform having a body and a motor connected to a drive; a defined set of robotic control routines selected from behavior arbitration and behaviors; sensor drivers; drive/actuator controllers; database management and databases; or data converters; a plurality of interchangeable mountable modules, each interchangeable mountable module including a power input, a plurality of network connectors, and a multi-pin connector available on the exterior of the interchangeable mountable module, and each interchangeable mountable module including: a microprocessor board with code execution dynamic memory, the microprocessor board further includes: a plurality of protocol transceivers, the multi-pin connector being capable of communicating with the plurality of protocol transceivers sensors, and nonvolatile memory including executable code, each microprocessor board of a interchangeable mountable module being configurable to execute a selected part of the executable code; a packet network switch, each of the plurality of network connectors being capable of connection to a packet network distributed through the body and communicating with the packet network switch, the packet network being capable of relaying instructions for or from the microprocessor board, the plurality of microprocessor boards can be provided with instructions to load and execute discrete ones of the defined set of robotic control routines, such that all of the defined set of robotic control routines are executed among the plurality of interchangeable mountable modules.

In one embodiment, each microprocessor board can be configurable to execute a selected part of the executable code loaded in the corresponding nonvolatile memory, such that each of the plurality of microprocessor boards is configurable to execute only a selected part of the executable code loaded in the corresponding nonvolatile memory. A selected one of the microprocessor boards can be capable of updating the executable code in the nonvolatile memory of remaining ones of the microprocessor boards via the packet network distributed through the body. A selected one of the interchangeable mountable modules can be designated a supervisory role and provides supervisory instruction to remaining ones of the interchangeable mountable modules. The interchangeable mountable modules can be distributed throughout the body of the robot, and at least selected ones of behavior arbitration code, behavior code, sensor driver code, drive controller code, actuator controller code, database management code, database data, and data converter code are distributed for execution among the interchangeable mountable modules distributed throughout the body of the robot.

In some embodiments of the present invention, a robotic control module is provided in which the power supply has been removed or the robotic control module does not include a power supply and power may be provided to the robotic control module from off-the-shelf power supplies wired into a wire harness, or otherwise, providing vehicle power.

In one embodiment of the present invention, a programmable motor controller comprising a motor amplifier, the motor controller is adapted to receive inputs from a robotic control module or robotic control unit (RCU) and process the inputs to generate control signals to send to the motor amplifier. The motor controller may also comprise an encoder connection for communicating with an encoder, a connection for communication with a hall sensor. In one embodiment, the motor controller contains a Digital Signal Processor (DSP). In other embodiments, the motor controller can include a programmable logic device or a gate array. The inputs may include vehicle behavior modes.

In one embodiment of the present invention, a motor amplifier is provided comprising a first stage and a second stage. The first stage comprises a DC/DC converter for providing voltage to the second stage and a health monitor for monitoring the operation of the motor amplifier and/or motor and shutting the motor amplifier down if the health monitor detects a problem with the motor amplifier operation. The second stage comprises a FET/commutator for controlling the operation of the motor. Both the first stage and the second stage comprise a digital signal processor (DSP) for providing control signals to the motor amplifier components and receiving feedback signals from the FET/commutator and a complex programmable logic device (CPLD) receiving control signals from the DSP and communicating signals to the FET/commutator to control the motor.

In one embodiment of the present invention, the CPLD receives a position feedback signal from a Hall effect sensor associated with the motor. The position feedback signal may include position data associated with the motor and used to control the FET/commutator. The DSP may receive a feedback signal from an analog position sensor and/or encoder that are associated with the motor and may transmit control signals based, at least in part, on the feedback signals. The DSP may receive a current sensing signal that includes data associated with the current of the FET/commutator. The DSP may transmit control signals based, at least in part, on the current sensing signal. The FET/commutator may include a commutation FET circuit comprising an H-bridge that is adapted to control the motor based on signals from the CPLD.

In one embodiment of the present invention, the motor amplifier may operate in brush or brushless mode. The DSP can receive a signal from an RCU and operator control unit (OCU) to instruct the motor amplifier to operate in brush or brushless mode. The DSP sends a signal to the CPLD instructing which mode to operate. Using tables associated with brush or brushless mode, the CPLD sends controls to the FET/commutator. In brushless mode, the CPLD receives a feedback signal from a Hall sensor and sends control signals based on the Hall sensor feedback signal to the H-bridge to control the motor. In brush mode, the DSP receives feedback from the encoder and sends control signals to the FET/commutator through the CPLD based at least in part on the encoder control signal. The FET/commutator controls the motor using the H-bridge.

These illustrative embodiments are mentioned not to limit or define the invention, but to provide examples to aid understanding thereof. Illustrative embodiments are discussed in the Detailed Description, and further description of the invention is provided there. Advantages offered by the various embodiments of this invention may be further understood by examining this specification.

BRIEF DESCRIPTION OF THE DRAWINGS

These and other features, aspects, and advantages of the this invention are better understood when the following Detailed Description is read with reference to the accompanying drawings, wherein.

DETAILED DESCRIPTION

Figure 1:
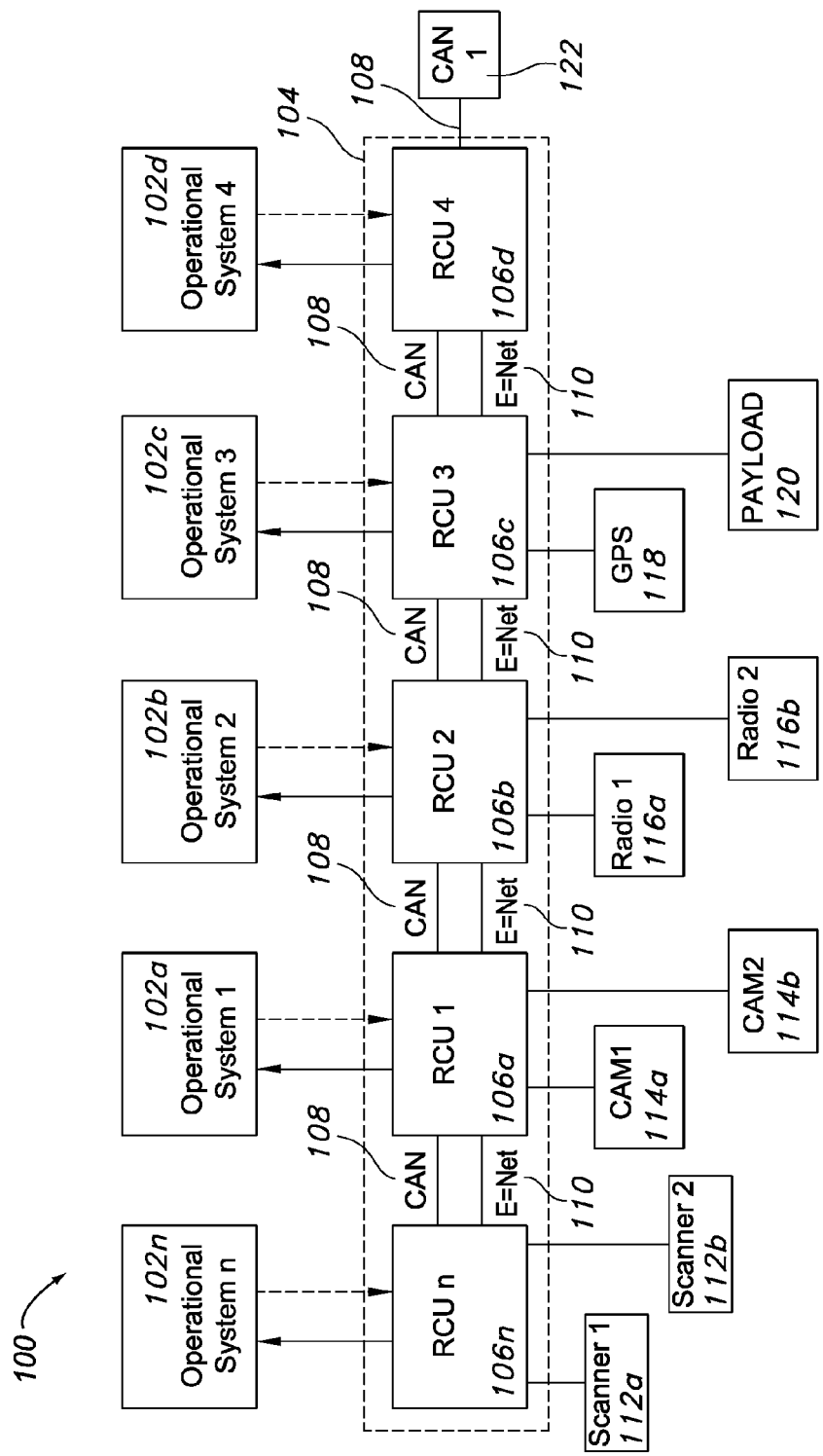
FIG. 1 is a block diagram illustrating a robotic control system in one embodiment of the present invention.

Embodiments of the invention provide a robotic control module or robotic control unit (RCU) for use in a robotic control system, advantageously of a vehicle, including structures, systems and methods, that provide (i) a robotic control module that has multiple functional units, such as a processor, an actuator controller, an actuator amplifier, a packet network switch, and a power supply integrated into a single package/housing; (ii) a robotic control module that is packaged to reduce heat, reduce space, shield sensitive components from electro-magnetic noise; (iii) a robotic control system utilizing robotic control modules that include the same functionality allowing for interchangeability of modules; and (iv) a robotic control system that distributes the functionality and processing among a plurality of robotic control modules in a vehicle.

First, the integration of the processor, actuator controller, actuator amplifier, packet network switch, and power supply in a single location or single mount can be highly synergistic. A processor typically handles an overall supervisory role, but a local processor can also run sensor drivers and peripheral drivers, including readily available operating system ("OS") and/or real time operating system ("RTOS") drivers (e.g., Linux, Windows, VxWorks), as well as specific controller code for such platforms. A processor can also execute data converters, e.g., video, image, audio, or other signal protocol converter or a map generator. A power supply can provide appropriate, clean, conditioned power for such sensors and peripherals. A motor controller and amplifier are generally required for actuators—and some sensors may also require actuation (e.g., scanning sensors, gimbaled sensors). A DSP motor controller can also run a CAN protocol stack, which provides the capability of CAN communications and control of standardized vehicle payloads and peripherals. Combined with a flexible amplifier (e.g., fast, precise CPLD or other logic device control over phase, commutation), a wide variety of actuators can be used. The packet network switch or router can channel the large amounts of data coming from cameras, laser scanners, and other sensors.

Sensors and actuators may be laid out in positions according to necessity (e.g., cameras are mounted relatively high up, radios are mounted very close to their antennas—which are preferably also as high as possible, a steering actuator on the steering column, etc.). It is advantageous to provide the above-described capabilities in a form that can be placed adjacent the sensor or actuator (e.g., minimizing noise caused by long signal paths, wiring, etc.). It can be advantageous to provide all of them in a form that can be placed adjacent to or near any sensor and/or actuator and provide everything the sensor might need (power, control, drivers, data conversion, communication); or everything that the actuator could need (modulated phase control and amplified power, communication), or everything both could need. In some cases contemplated by the invention, selected ones of these capabilities can be provided in the single location with different advantages as discussed herein, but it remains advantageous to include all of them.

Figure 4:
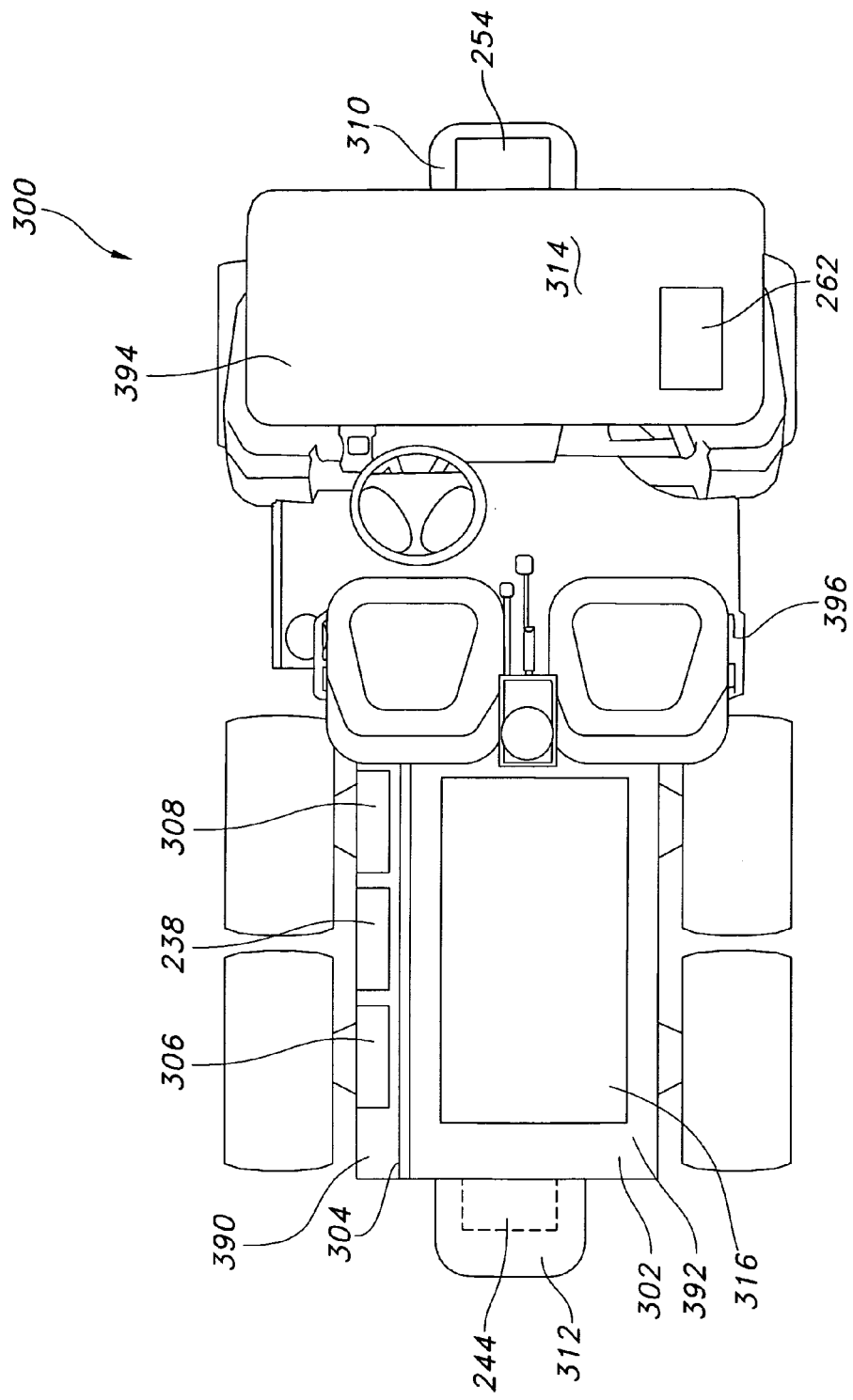
FIG. 4 is a top view of an illustrative vehicle including robotic control modules according to one embodiment of the present invention.
Figure 11A:
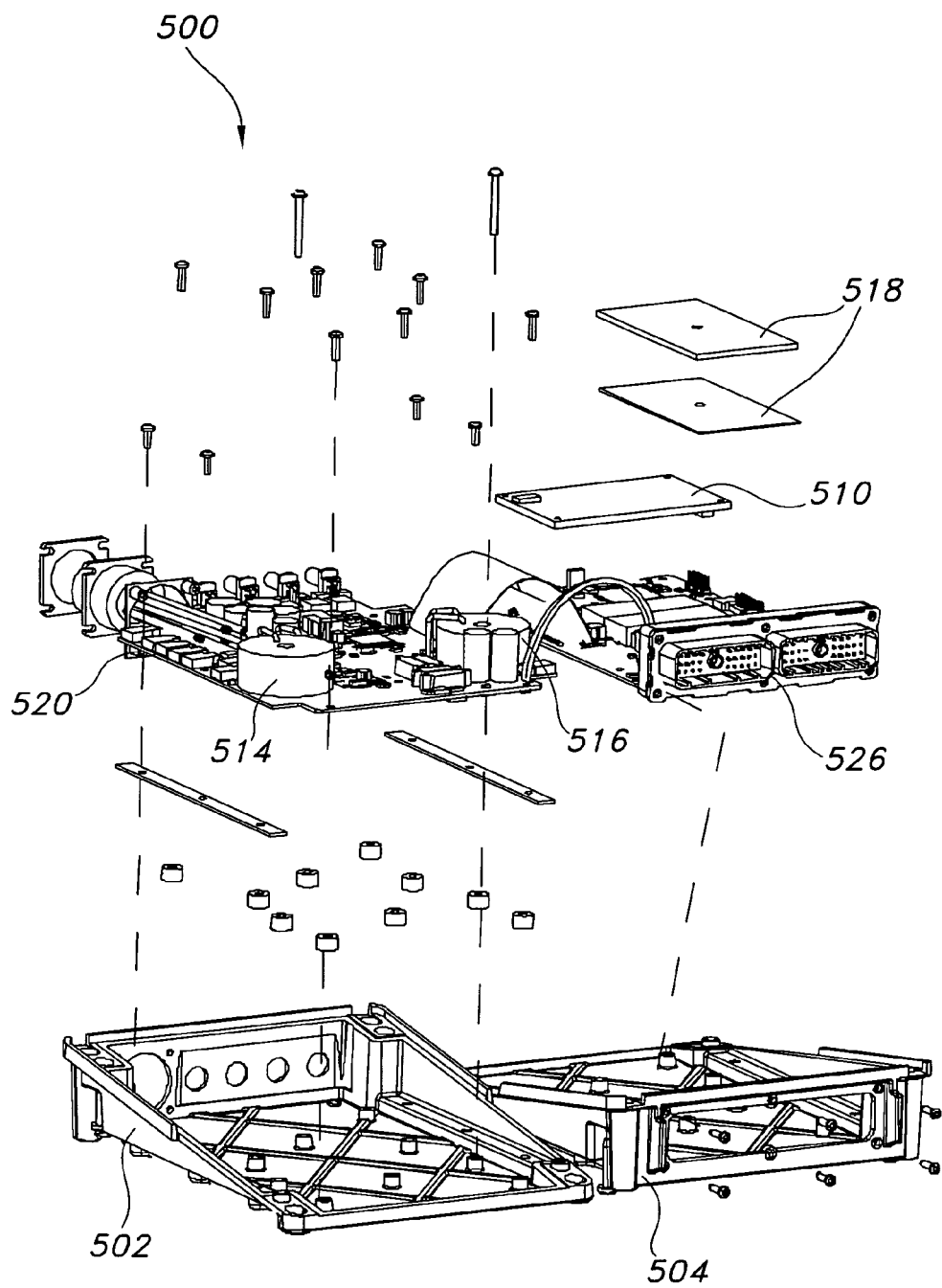
FIGS. 11A-D are various views of the robotic control module in FIG. 6 according to one embodiment of the present invention.
Figure 11B:
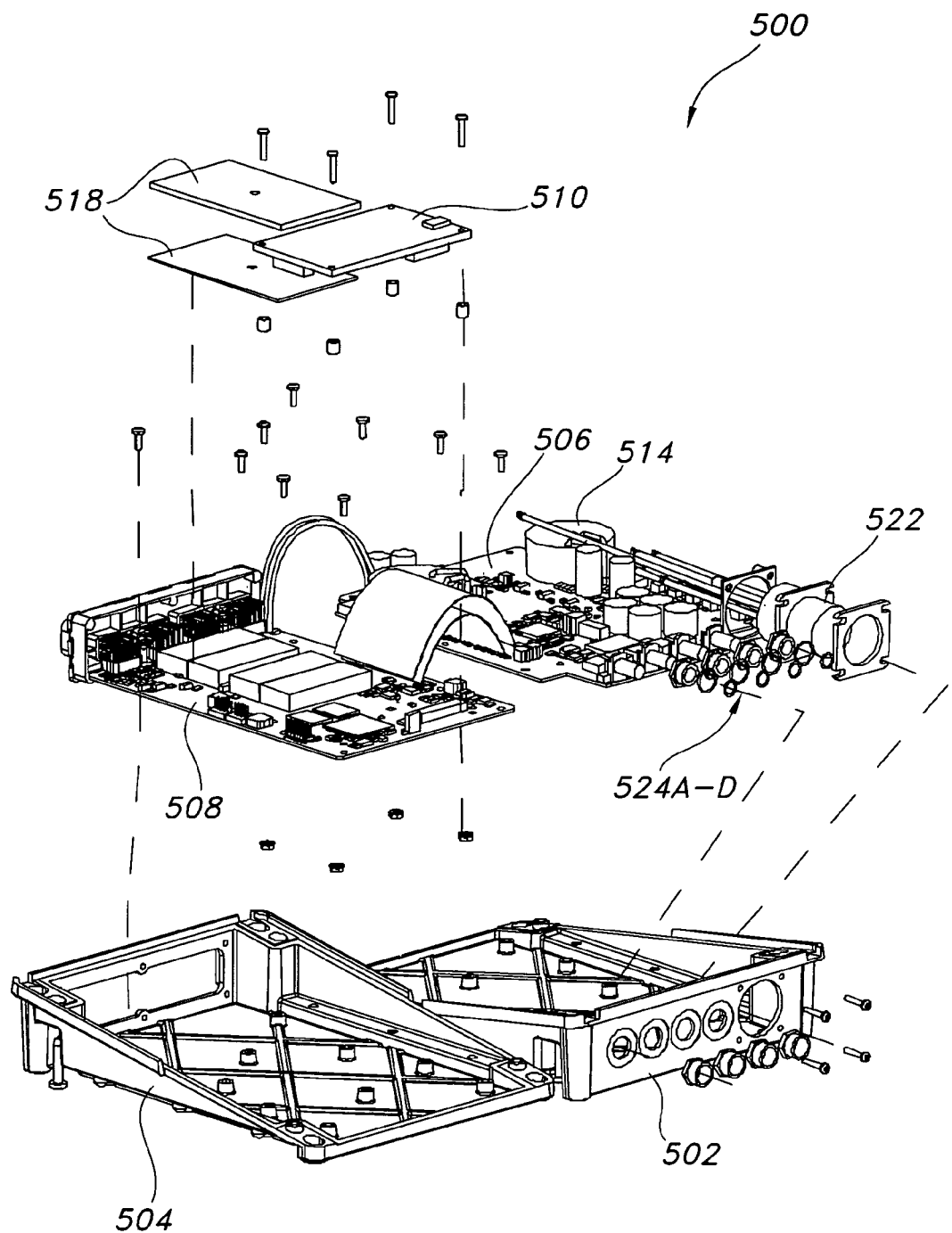
Figure 11C:
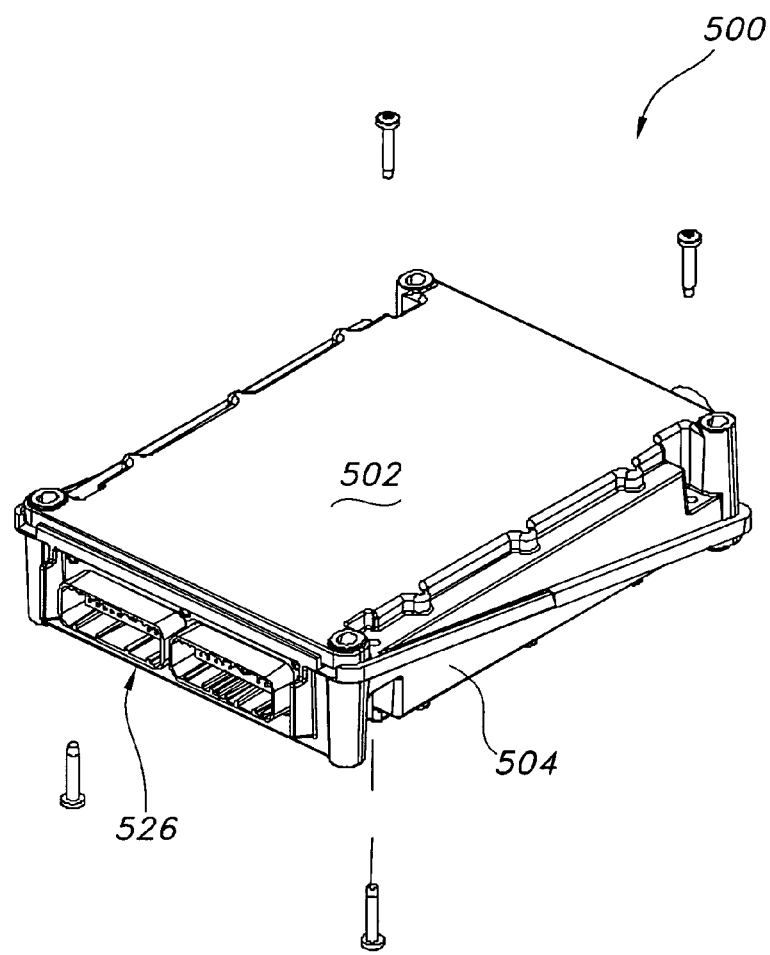

In one embodiment, a flattened, cigar-box like unit, such as module 500 in FIG. 11C, preferably less than 2-3 liters, e.g. 1 liter, (approximately 200 mm×250 mm×50 mm in +/−50 mm increments) may preferably house all of the listed components without active cooling. The circuit board arrangement, such as the arrangement illustrated in FIGS. 11A-D, therein can be relatively tight, and balanced to arrange heat-generating and heat sensitive components to avoid one another, and also EM noise-generating, and EM noise-sensitive components to avoid one another (some of these components may be one and the same). Such an enclosure can be placed strategically in idle or void spaces of a smaller vehicle (where no moving parts intrude), and can be networked within and between such spaces. For example, and as illustrated in FIG. 4, while larger or more cubic enclosures might fit in a trunk or passenger compartment, a cigar-box enclosure will fit between an engine and the engine compartment walls 390, 392, under or above flat surfaces 394, inside vehicle doors 396, under floor space, attached to the back of seats, in roof space, etc. The versatile unit as configured herein may be useful and advantageous even where there are no idle spaces, such as in a "vehicle" too small to carry a passenger, or when it is arranged in payload or passenger compartments.

Certain embodiments of the present invention can provide identical or nearly identical versatile robotic control modules that can be placed in different locations to serve different roles, and nonetheless be arbitrarily placed in each location, exchanged with one another, or exchanged with spares from a depot, with "zero configuration" or in a "plug and play" manner. "Zero configuration" may be implemented here with a local code setting (e.g., resistor, jumper, etc.) at the site of placement that is read by the module and tells the module how to configure itself, i.e., according to the site (which has predetermined resources to be hooked up). The modules can have the same software, and load up what is deemed necessary for the site. For example in FIG. 4, RCUs 238 and 306 may be removed and RCU 238 may be installed in the space provided for RCU 306 or vice versa. Although some embodiments of modules discussed herein are compact and optimized, the feature of interchangeability does not depend upon the configuration discussed above, although integration of multiple components enables interchangeability in this case by providing all of the components that might be needed at any sensor, communications, or actuator site.

Figure 10:
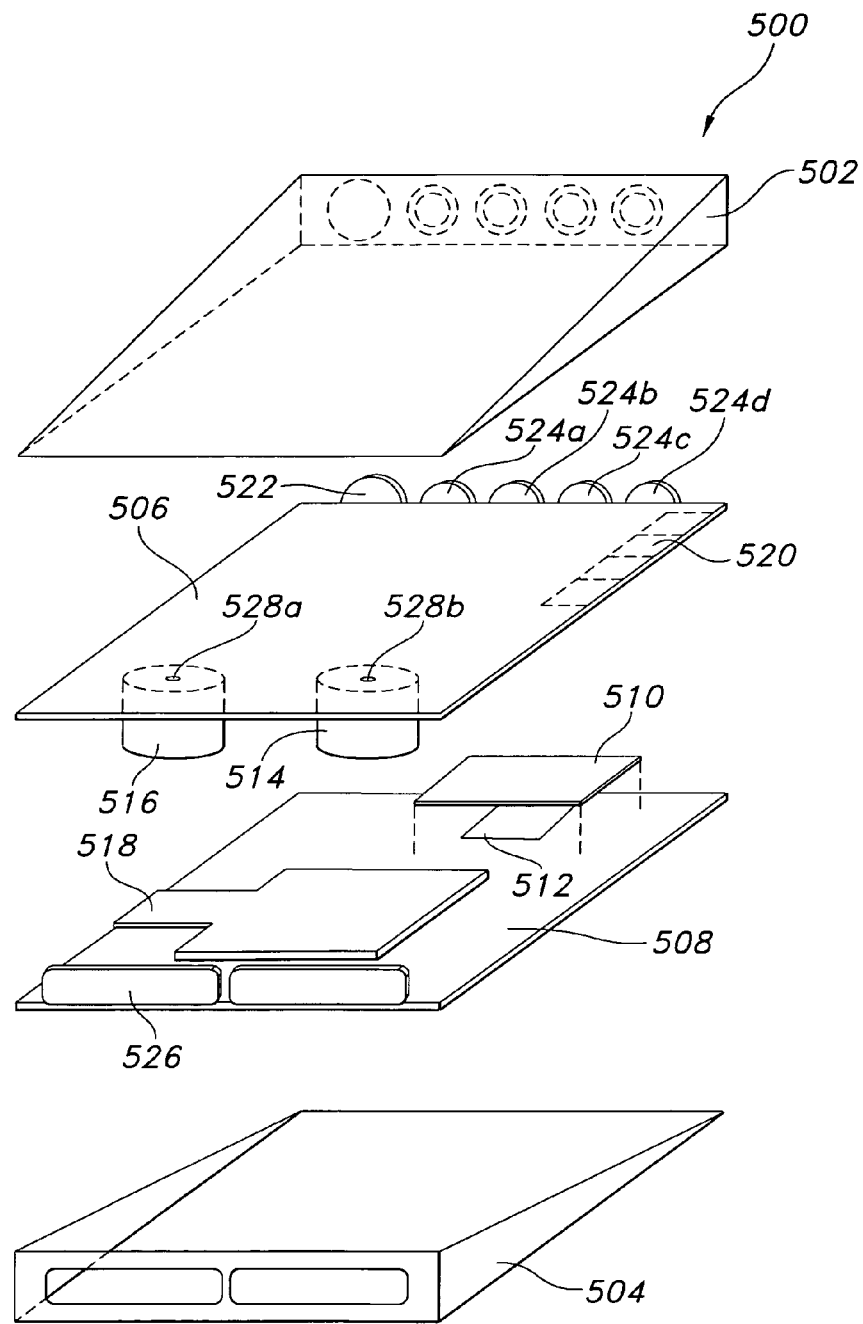
FIG. 10 is an exploded view of a robotic control module in one embodiment of the present invention.
Figure 11D:
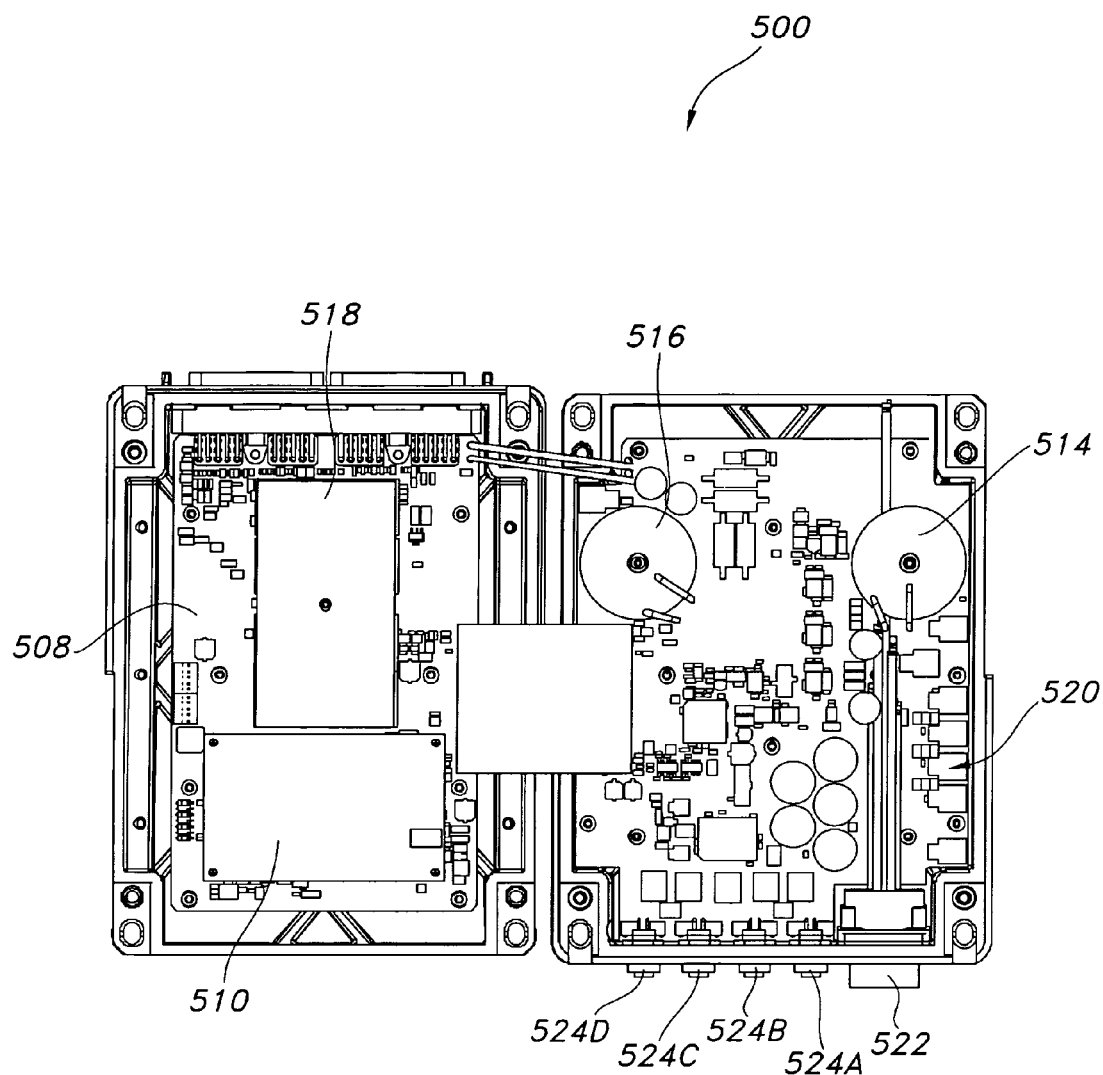

As described in more detail in view of FIGS. 10-11D, some embodiments of modules used here, as discussed in detail, include at least one processing core, chip and/or board, as well as one of motor driving circuitry (e.g., with phase modulation code and/or integrated amplifier) and/or (e.g., sensor) power supply (e.g., with driver code), and/or a network connection (e.g., switch). There are advantages to combining certain subsets of these circuits in an interchangeable module, as discussed herein. A sensor module, interchangeable, could omit the motor driving circuits, and still be interchangeable at sensor sites to provide computing, power supply, and network facilities at each site; an actuator module, interchangeable, could omit the external outputs of the power supply (the power supply conditions vehicle power for the internal components as well), and still be interchangeable at actuator sites. A sensor/motor module could omit one of the processor cores, although not the motor control processor core, which may be a DSP. Every module added can be added in the same manner, and can enhance the overall capability for the vehicle.

Certain embodiments of the present invention provide a robotic control platform dispersing computation, motor control, and sensor/communication capabilities among networked modules. Because one advantageous implementation of the invention includes a substantially 500-1000 MIPS (millions of instructions per second, which is a rough lower limit for an autonomous supervisory processor), 1 Watt class processor in each module, each module that is added adds significant "compute." The modules drive actuators—in a vehicle, three to five modules corresponding to actuators for, e.g., steering, braking, acceleration or throttle, forward/reverse. The modules also drive sensors and communication—in an autonomous vehicle, a number of modules for sensors and cameras for machine vision, scanning, proximity, radios, GPS, inertial, etc. Any module that has been placed for an actuator is available to drive and network nearby sensors and adds computational capacity. One module, which may also drive sensors and control an actuator (but not necessarily), is a supervisory module and executes supervisory processors. Nonetheless, the computing capability of each module can be used for other processes, such as sensor drivers, motor control, signal processing, and the like. The distributed system adds computational power with every added module. Higher power dissipation might also require more significant heat management, such as, but not limited to, fans, heat pipes, or otherwise, with higher cost and reduced reliability.

The 500-1000 MIPS, 1 watt class processor (e.g., 2-4 watts as integrated in the single board computer supporting it) together with the other elements can be advantageous in this regard. Less computational capacity, i.e., less by an order of magnitude, is insufficient for an autonomous mobile robots to execute the processes necessary to support autonomy. Higher power dissipation, e.g., higher by an order of magnitude, can generate too much heat in each module (which dissipate a maximum of approximately 30 watts with all systems—CPU, DSP, power, motor control, motor amplification, Ethernet switch—fully occupied), and overwhelms electrical systems of most vehicles. With the distributed system, each module that is added at an appropriate site (e.g., sensor, communication, or actuator site or node) adds significant computational power.

For example, replacing the primary core in the disclosed module with a Pentium M class server-type processor could increase computational power, but would dissipate more power by an order of magnitude (likely 10-30 or more watts), and would overheat the enclosure with all components active. Accordingly, the selection of the appropriate upper limit on power dissipation for the processor and single board computer (approximately 1 watt for the processor alone, exceeding this by an order of magnitude being unacceptable), limited by the lower limit on necessary computational cycles for autonomous operation of a vehicle (approximately 500-1000 MIPS for the processor alone, less than this by an order of magnitude being unacceptable), further limited by the presence of the other functional components (which are heat sensitive, and, especially the motor amplifier and power supply, generate heat), is part of the invention described herein. Other highly efficient components were also provided to the modules, as disclosed herein, and provided incremental power efficiencies leading to the maximum of 30 watts dissipated by the module from its 2-3 liters of volume. In the inventive distributed system, added computational power can be provided with an additional independent module placed at an appropriate site (e.g., sensor, communication, or actuator site or node), and is added beneficially whenever an actuator is supported.

Robotic Control Module

A robotic control module can contain one or more of a processor and associated memory, such as a single board computer with a microprocessor, a network switch, such as an Ethernet switch, an actuator controller, such as a reprogrammable motor controller, an actuator amplifier, such as a motor amplifier, and a power supply within a single mountable housing.

Figure 9:
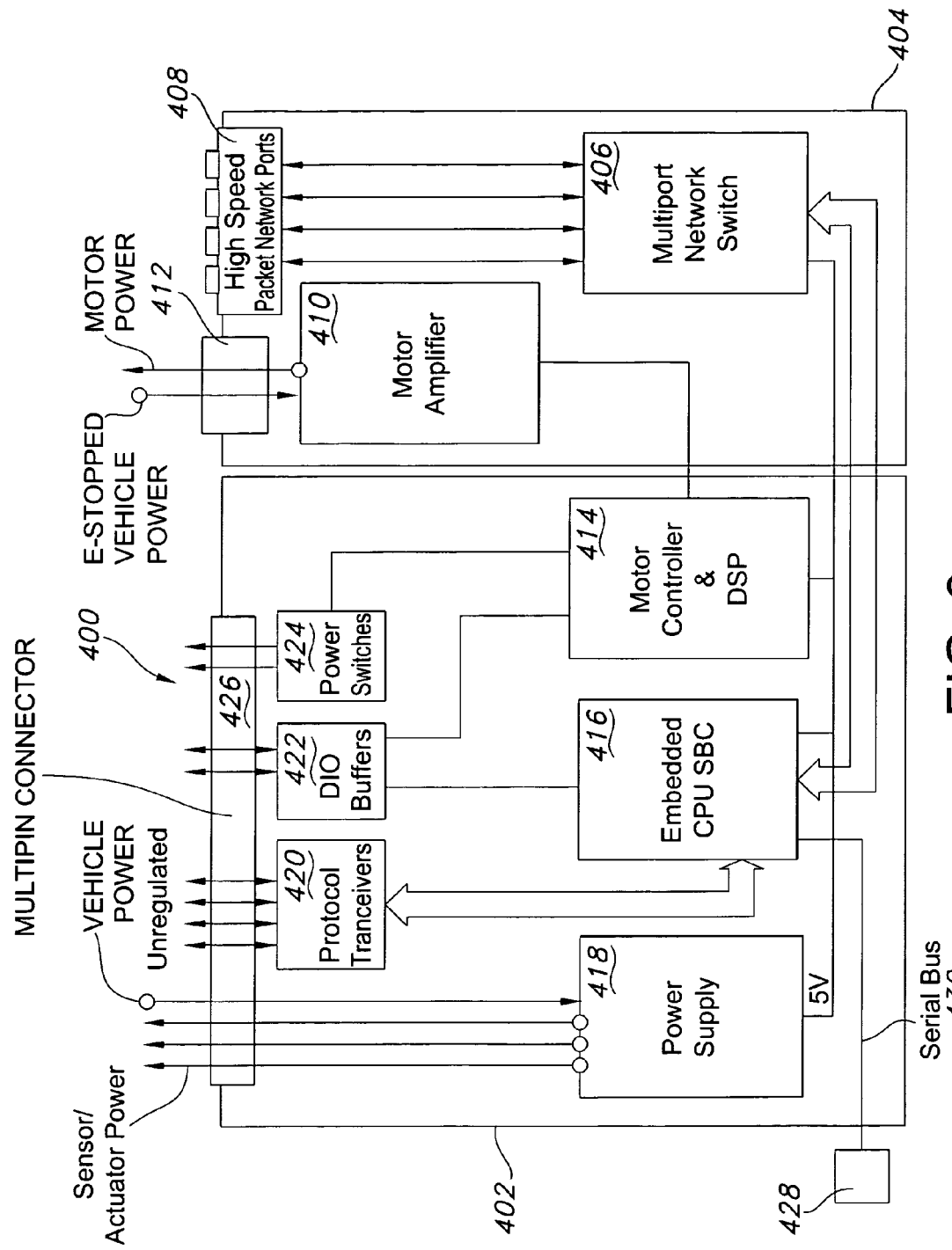
FIG. 9 is a block diagram illustrating a robotic control module in one embodiment of the present invention.

FIG. 9 is a block diagram of an illustrative robotics control module 400 (sometimes referred to as a Robotic Control Unit or RCU) according to one embodiment of the present invention. FIGS. 18-22 include additional examples of various embodiments of RCUs, including a supervisory RCU illustrated in FIG. 19 and additional RCUs that perform various functions illustrated in FIG. 20-22. In the embodiment illustrated in FIG. 9, the robotics control module 400 is contained in a single housing. The robotics control module 400 shown in FIG. 9 is divided into a top housing 402 and a bottom housing 404. Other suitable configurations are possible. The bottom housing 404 contains a multi-port network switch 406, high-speed packet network ports 408, a motor amplifier 410, and a motor connector 412. The top housing 402 contains a motor controller 414, a single board computer 416, a power supply 418, protocol transceivers 420, Digital Input/Output (DIO) Buffers 422, power switches 424, and a multi-pin connector 426. The robotic control module may also contain a serial bus 430 and a serial connector 428. The serial bus 430 can be connected to the single board computer 416. In one embodiment, the serial bus 430 is a Universal Serial Bus (USB) and the serial connector 428 is a USB connector.

The Single Board Computer (SBC) 416 includes an embedded Central Processing Unit (CPU) and associated memory, such as, for example, Random Access Memory (RAM) and/or nonvolatile memory. Examples of SBC software architecture are illustrated in FIGS. 23-33. In one embodiment, the SBC 416 is a Motorola MPC5200 PowerPC 400 MHz single board computer with the approximate dimensions of 2.5 inches by 4 inches. In this embodiment, the SBC 416 may include 128 MB DDR RAM and 64 MB Flash memory.

The SBC 416 may send signals to and receive signals from the protocol transceivers 420, the DIO buffer 422, and the switch 406. The protocol transceivers 420 may send and receive CAN, RS232, RS422, USB signals. For the purpose of this disclosure, "protocol transceivers" means transceivers that are controlled pursuant to predetermined rules for communications (e.g., packet contents, handshaking, addressing). All of CAN bus, RS-232, RS-422, and USB are well-known communications protocols for different uses—respectively for automotive control, generic serial, longer distance serial for instrumentation, and peripheral bus purposes. Other protocol transceivers can be added to implement different desired communications, including, but not limited to, RS-485, IEEE-488, IEEE-1394 (Firewire 400), Firewire 800, Bluetooth, USB 2.0, Wireless USB, FDDI, Fibre Channel, MIL-STD-1553 wired databus and variations such as EBR 1553 (including proprietary versions) or MIl-STD-1553C, AFDX, MMSI, ARINC 429, ATM, WIN-T, wave-division multiplexed optical fiber, SCSI of any kind, PCI & PCI Express (and other switched fabrics), SATA (serial ATA), proprietary and purpose-built rule sets, and modifications or successors to any of these. The DIO Buffer 422 can send and receive digital and analog signals. In one embodiment, the SBC 416 sends and receives signals from a Digital Signal Processor (DSP) located in the motor controller 414 via RS-232 protocol. In one embodiment, the multi-pin connector 426 is a 60 pin Cinch connector. The power supply 418, protocol transceivers 420, DIO Buffers 422, and the power switches are connected to the multi-pin connector 426. Each of these components can receive inputs from the multi-pin connector 426 and provide outputs to the multi-pin connector 426. The power switches are not necessarily used, but can control external power lines, switching the supply of power via such lines on and off. That is, an external power line is routed into and out of a power switch on the RCU, and the RCU can control the switch as part of its general functionality.

Executable code may be stored in memory of the SBC 416 that can be executed by the CPU to enable the SBC to execute and arbitrate among robotic control behaviors. Each robotic control module in the robotic control system may be provided with multiple executable code parts for different modular roles within the control system. For example, each robotic control module can include executable code for supervisory role, for actuator control, for sensor monitoring, etc. The robotic control modules can be configurable to execute only a selected portion of the executable code appropriate for the role of the particular robotic control module. Examples of the parts of the executable code can be behavior arbitration code, behavior code, sensor driver code, drive controller code, actuator controller code, database management code, database data, and data converter code. Each robotic control module can determine the function or role they will perform and what executable code they will perform based on location, connections, or other suitable methods as described above. This provides for the interchangeability of the robotic control modules.

FIGS. 23-33 illustrate embodiments of SBC software architecture for selected robotic control units. One embodiment of an SBC 1900 for a supervisory robotic control unit is shown as a high level block diagram in FIG. 23. The supervisory SBC 1900 includes a processor 1902 and network connection 1904. The network connection 1904 may be one or more network connections. Examples of such network connections 1904 include Ethernet TCP/IP, USB, and CAN connection such as J1939.

The network connections 1904 are adapted to connect with a plurality of devices outside of supervisory SBC 1900, such that the supervisory SBC 1900 can receive and send a plurality of types of data and/or control signals. The supervisory RCU may also include a computer-readable medium, such as memory 1906. Memory 1906 may any type of memory. Examples of memory 1906 include random access memory ("RAM"), read-only memory ("ROM"), optical storage, and magnetic storage. Memory 1906 may include a data storage and/or persistent data storage to store various received or computed data and executable code.

Examples of executable-code include an operating system (not shown), such as for example BlueCat Linux or DSP basic input/output system (BIOS), a data transport (not shown) that includes software, such as for example iRobot Aware™, to assist in the supervisory SBC 1900 communicating with outside devices, and/or applications 1908. The applications 1908 can include one or more supervisory RCU functional code and drive behaviors. For example, the applications 1908 may include configuration code 1910 that reads configuration files from storage, such as persistent storage, and puts these values into appropriate locations in the data transport.

The applications 1908 may also include an obstacle map, detection and/or avoidance code 1912, teleoperation code 1914, follow mode 1916, waypoint navigation code 1918, drive arbiter 1920, data logging code 1922, path playback code 1924, telemetry code 1926, dashboard display control 1928, version upgrade manager 1930, and vehicle control unit (VCU) interface 1932. Embodiments of the applications 1908 are described in more detail below with regard to FIGS. 26-33.

Figure 24:
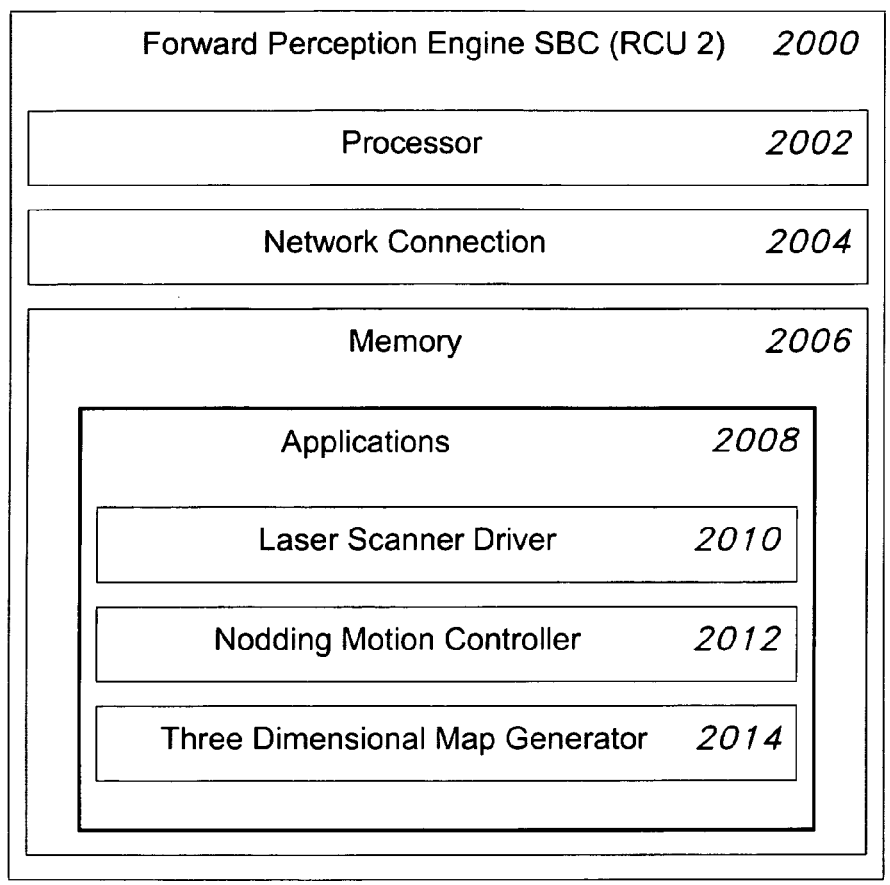
FIG. 24 illustrates a single board computer forward perception engine software architecture for an RCU according to one embodiment of the present invention.

FIG. 24 illustrates one embodiment of software architecture for a forward perception engine SBC 2000 included on a second RCU. The forward perception engine includes a processor 2002 and network connection 2004. The network connection may include one or more different types of network connections, as described above, that are adapted to receive and send data over one or more networks. The forward perception engine SBC 2000 may also include a readable medium, such as memory 2006. Memory 2006 may any type of memory and may include a data storage and/or persistent data storage to store various received or computed data and executable code.

An example of such executable code includes applications 2008. The applications 2008 can include a variety of software code and behavior code. For example, the applications 2008 can include a laser scanner driver 2010, a nodding motion controller 2012, and a three-dimensional map generator 2014. Embodiments of a laser scanner driver, nodding motion controller, and three-dimensional map generator are described in more detail below.

Embodiments of the present invention may also include a third RCU having an SBC that includes a rear perception engine (not shown). The rear perception engine can include a laser scanner driver that reads configuration data, configurations the laser scanner for continuous output of range data, reads range data, and publishes the data to a network message queue for use by a supervisory RCU. The rear perception engine may include similar or the same behavior code, architecture, or otherwise, or the forward perception engine.

Figure 25:
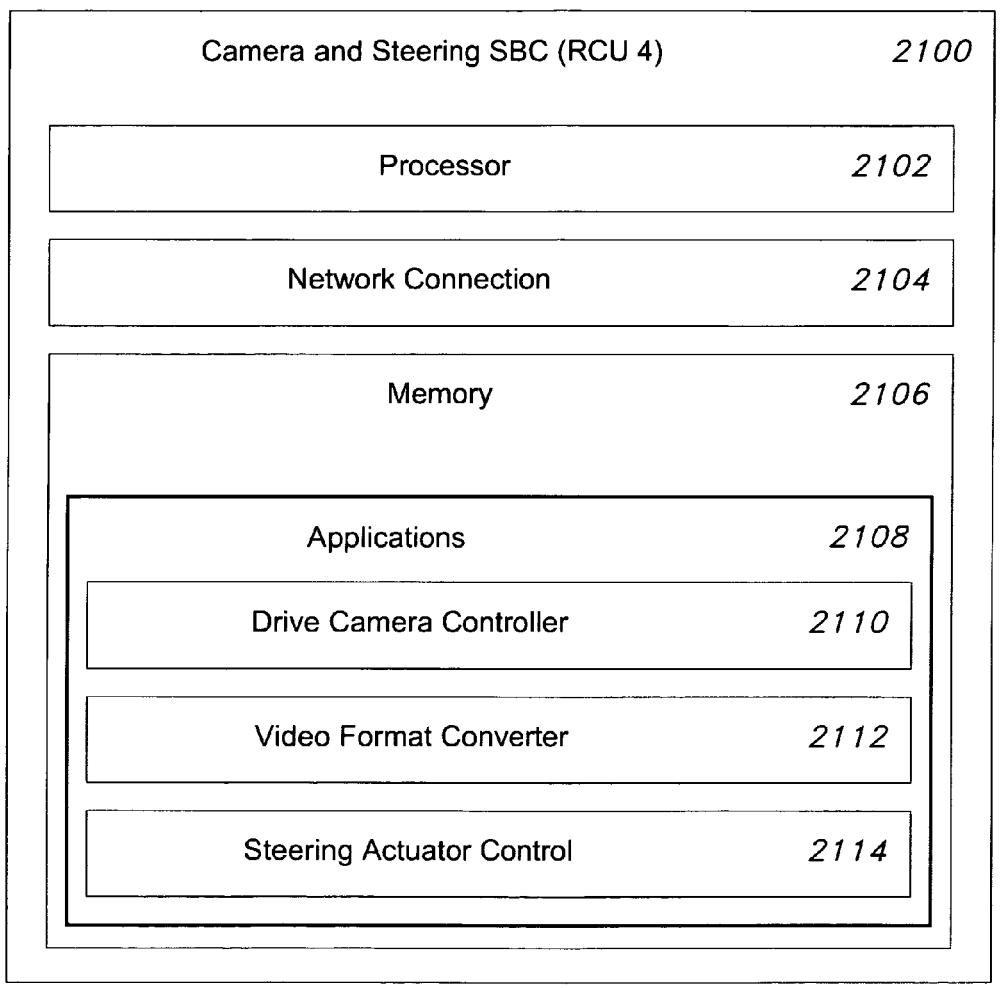
FIG. 25 illustrates a single board computer camera and steering software architecture for an RCU according to one embodiment of the present invention.

FIG. 25 illustrates one embodiment of a fourth RCU that can be a camera and steering RCU including an SBC 2100. The camera and steering SBC 2100 may include a processor 2102 and one or more network connections 2104. The network connections 2104 can send and receive data over a network to other devices or other RCUs.

The camera and steering SBC 2100 may also include a readable medium, such as memory 2106. Memory 2106 may any type of memory and include a data storage and/or persistent data storage to store various received or computed data and executable code. An example of such executable code includes applications 2108 that include one or more software programs and/or behavior code. Examples of such programs or code include a drive camera controller 2110, a video format converter 2112, and a steering actuator control 2114. Embodiments of a drive camera controller, video format converter, and steering actuator control are described in more detail below.

Figure 26:
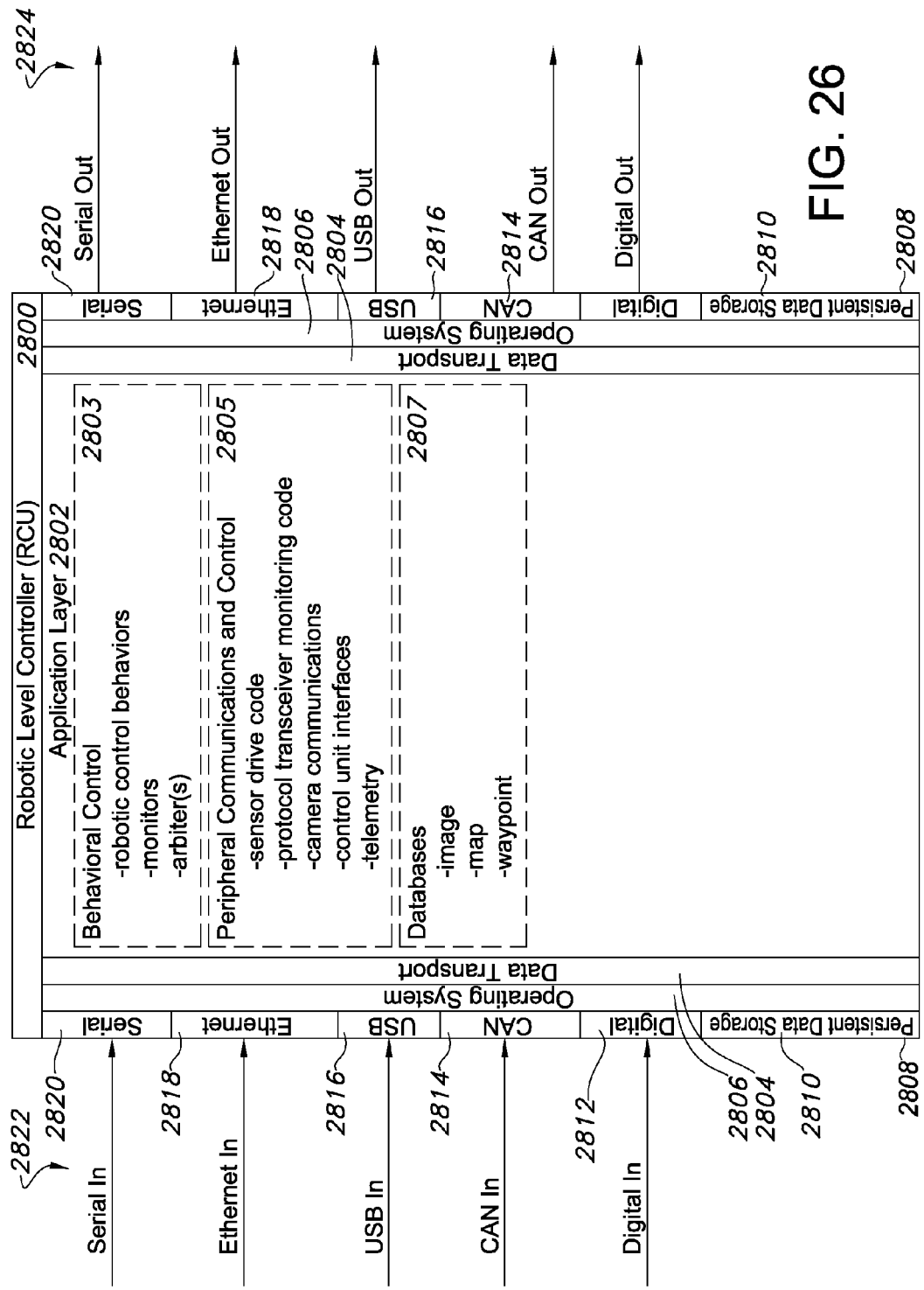
FIG. 26 illustrates an RCU software architecture according to one embodiment of the present invention.
Figure 27:
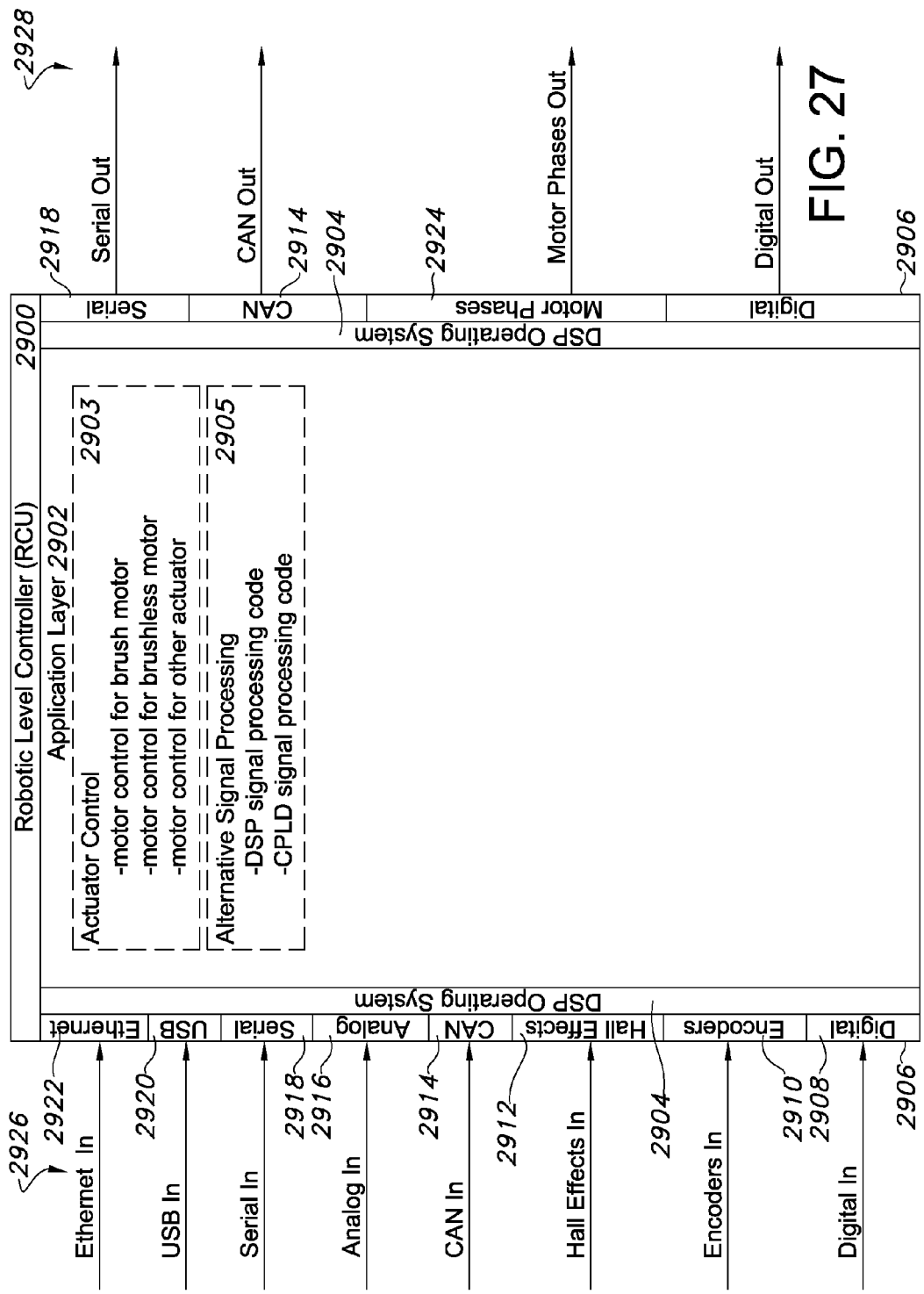
FIG. 27 illustrates an RCU software architecture according to another embodiment of the present invention.

In some embodiments of the present invention, RCUs may be provided having a software architecture that includes a application layer with a one or more applications and types of applications. RCUs may include only one application, while other RCUs are configured include more than one application. In some embodiments, the applications may be uploaded to the RCUs. FIGS. 26-27 illustrate embodiments of a robotic level controller and including one or more application types and network connections. FIG. 26 illustrates a software architecture for a robotic level controller 2800 that includes a application layer 2802 that can include one or application types. Examples of such application types include behavioral control 2803, peripheral communications and control 2805, and databases 2807. The behavioral control 2803 may include applications such as robotic control behaviors, monitors, and/or arbiters. These and other types of behavioral controls are described below with reference to FIGS. 28-33. The peripheral communications and control 2805 may include sensor drive code, protocol transceiver monitoring code, camera communications, control unit interfaces, and telemetry. Databases 2807 may include image, map, and waypoint databases.

The RCU software architecture 2800 may also include a data transport layer 2804 and an operating system layer 2806. The operating system layer 2806 may include an operating system, such as a Linux operating system, or any type of signal processing code. A data storage/network connection layer 2808 may also be included. The data storage/network connection layer 2808 may include data storage, such as persistent data storage 2810 and one or more network connections, such as digital 2812, CAN 2814, USB 2816, Ethernet 2818, and serial 2820. The network connections may receive a plurality of data and types of data 2822 and output a plurality of data and types of data 2824.

FIG. 27 illustrates another embodiment of a robotic level controller software architecture 2900 that can include an application layer 2902 that includes one or more application types having one or more applications. For example, the application layer 2902 may include actuator control application types 2903 and/or alternative signal processing 2905. The actuator control 2903 may include motor controls for brush motors, motor controls for brushless motors, motor control for other actuators, and/or other motor control code. The alternative signal processing 2905 may include DSP signal processing code, and/or CPLD signal processing code. The RCU software may also include a DSP operating system layer 2904 that can include a DSP BIOS or other option operating system. An example of a DSP BIOS includes Texas Instruments™ DSP BIOS. The RCU 2900 can include a network connection layer 2906 that includes one or more network connectors, such as digital 2908, encoders 2910, Hall effects 2912, CAN 2914, analog 2916, serial 2918, USB, 2920, Ethernet 2922, and motor phases 2924. The network connectors can receive various types of data 2926 and output various types of data 2928.

FIGS. 28-33 illustrate particular embodiments of RCU software architecture, including architecture associated with applications, data transport, and physical layer arrangements associated with different exemplary configurations. The embodiments of RCU software architecture described herein are RCU having particular applications and perform certain functions that may be determined when the RCU is designated as such and includes the appropriate applications or executable code. The RCUs may be devices with the same electronic and physical configuration, but may have the same or different software loads.

Figure 28:
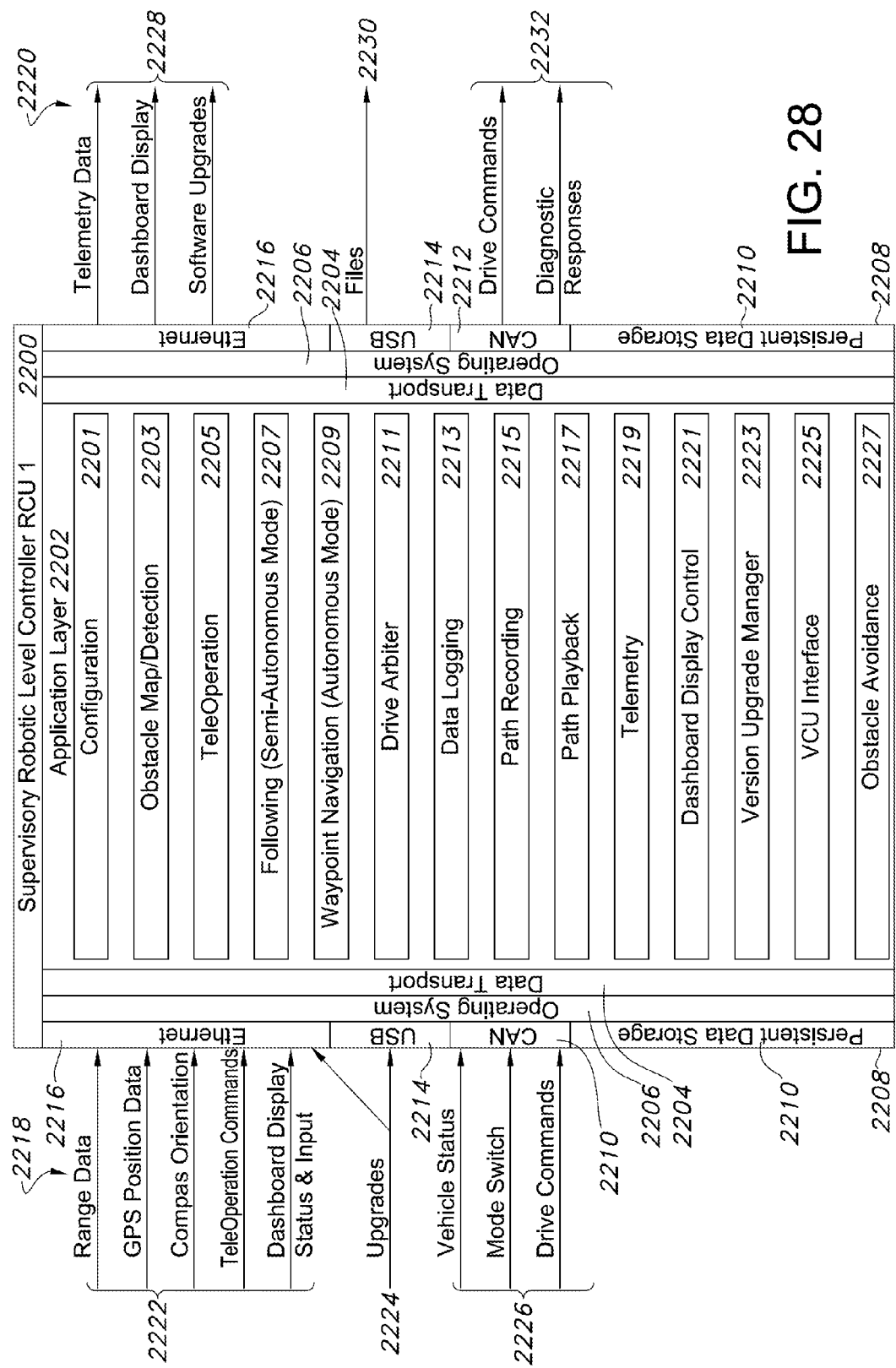
FIG. 28 illustrates a supervisory RCU software architecture according to one embodiment of the present invention.

One embodiment of a supervisory robotic level controller RCU software architecture 2200 is shown in FIG. 28. The RCU may become a supervisory RCU after being designated as such and receiving the appropriate applications. The RCU software architecture 2200 can include one or more layers. For example, the layers may include an application layer 2202 that includes computer-executable code, such as applications, a data transport layer 2204 that includes executable code, such as for example iRobot Aware™, to assist in the RCU communicating with outside devices, and/or applications on the application layer 2202, an operating system layer 2206 that includes an operating system such as BlueCat Linux, and a data storage/network connection layer 2208 that can send an receive data from other devices and store data. The data storage/network connection layer 2208 may include a data storage, such as a persistent data storage 2210.

The data storage/network connections layer 2208 may include one or more network connections adapted to connect with a plurality of devices outside of the RCU and send and receive data or control signals. The network connections may include a CAN connection 2212, such as a J1939 connector, a USB connector 2214, and an Ethernet connector 2216. The network connectors may receive a plurality of data 2218 or send a plurality of data 2220. Examples of Ethernet data 2222 received by the Ethernet connector include laser scanner range data, GPS position data, compass orientation data, teleoperation commands from a remote operator control unit (OCU), dashboard display status and input, and software upgrades. An example of USB data 2224 also includes software upgrades. Examples of CAN data 2226 includes vehicle status information, vehicle mode switch, and diagnostic commands from CAN diagnostic ports. Examples of transmitted Ethernet data 2228 includes telemetry data to a remote OCU, dashboard display instructions, and software updates to other RCUs. An example of transmitted USB data 2230 includes files. Examples of transmitted CAN data 2232 includes drive commands to a supervisory VCU and diagnostic responses to CAN diagnostic port.

The application layer 2202 can include one or more applications, such as RCU functional code and drive behaviors. For example, the applications may include configuration code 2201 that reads configuration files from storage, such as persistent storage, and puts these values into appropriate locations in the data transport. The applications may also include an obstacle map and detection 2203. The obstacle map and detection code can receive input range and odometry data and construct a two-dimensional obstacle map.

Other applications can include teleoperation code 2205 that receives input commands from a remote OCU and outputs a trajectory set for use by a drive arbiter 2211 and several discrete values and a follow mode or semi-autonomous mode 2207 that receives obstacle data from the obstacle map to locate a target or object to follow and outputs trajectory sets for use by the drive arbiter 2211. Waypoint navigation code 2209 may also be included that can receive input waypoint values from a chosen path an output a trajectory set for use by the drive arbiter 2211. The drive arbiter 2211 may be included with the applications to receive input trajectory sets and priorities from various drive behaviors, obstacle data form the obstacle map and configuration data from various configuration publications. The drive arbiter 2211 may also output selected trajectory data to actuators or other devices outside of the RCU.

The applications may also include data logging code 2213 that can receive status data from vehicle sensors and writes data to a data storage, such as persistent data storage 2210. After receiving an operator command, the data logging code 2213 can copy data wirelessly or on a wireline to an OCU or removable data storage device. The applications may also include path record 2215 and path playback 2217 code. The path record code 2215 can receive location data from vehicle sensors and inputs from an operator and write the data, such as representations of path waypoints, to data storage, such as persistent data storage. The path playback code 2217 can receive a path as designated by an operator and play the waypoints included with that path to waypoint navigation.

The applications may also include telemetry code 2219 that can receive status data from vehicle sensors and sends packets to a remote OCU. A dashboard display control 2221 may also be included that can receive status data from vehicle sensors and inputs from a dashboard display and send display instructions to the dashboard display.

The applications may also include a version upgrade manager 2223 and VCU interface 2225. The version upgrade manager 2223 can receive software upgrades and distribute the software upgrades throughout other RCUs. The VCU interface 2225 can receive driving and diagnostic commands and send driving commands to the VCU via appropriate CAN messages and sends diagnostic messages to other RCUs and returns their reports to the VCU. Obstacle avoidance code 2227 may also be included. The obstacle avoidance code 2227 can receive input trajectories from the drive arbiter 2211 and obstacle data from the two-dimensional obstacle map and scores these trajectories according to obstacle avoidance rules.

Figure 29:
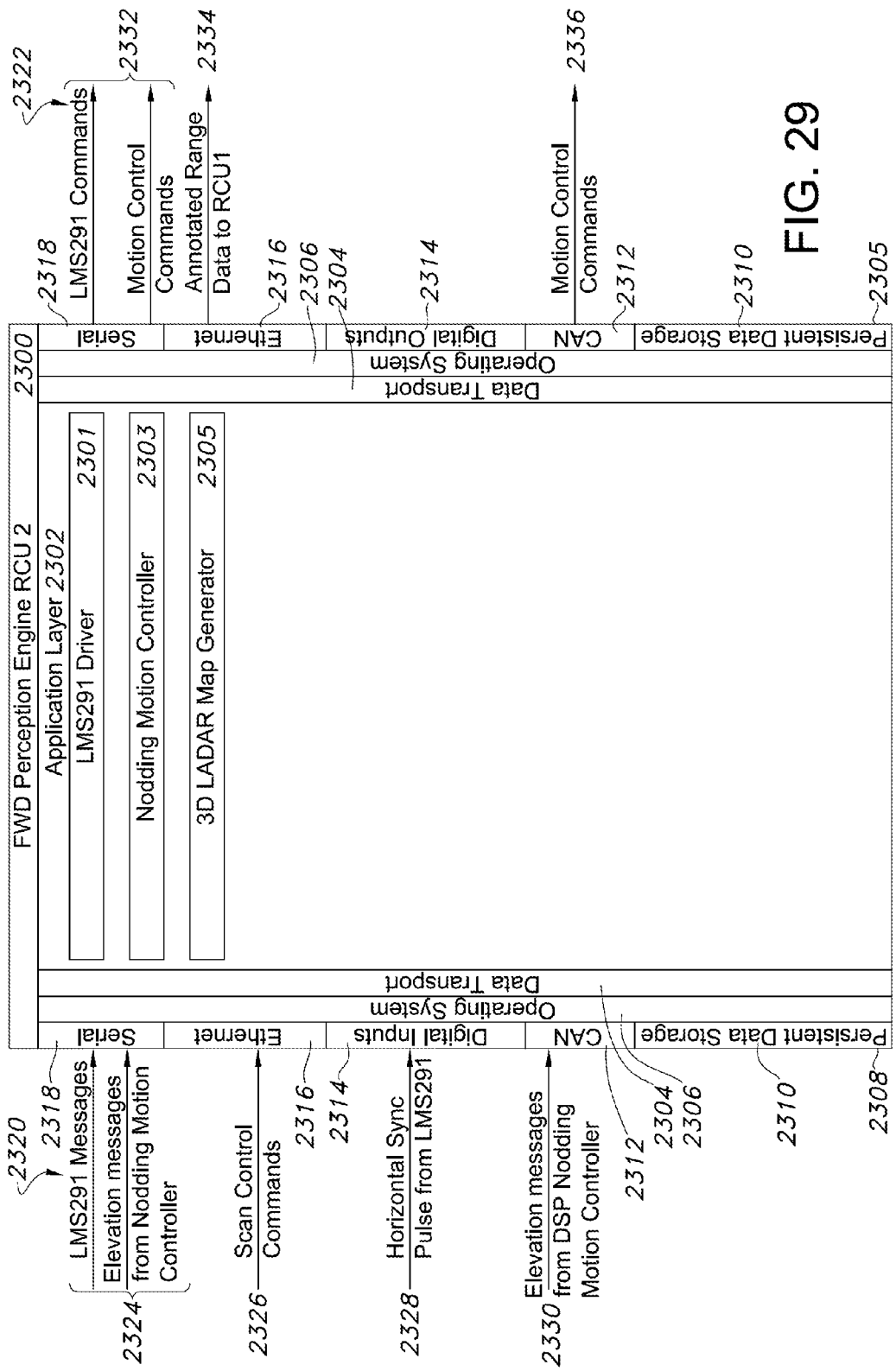
FIG. 29 illustrates a forward perception engine RCU software architecture according to one embodiment of the present invention.

FIG. 29 illustrates one embodiment of software architecture for a forward perception engine RCU 2 2300. The RCU may become a forward perception engine RCU after being designated as such and receiving the appropriate applications. The forward perception engine RCU 2 software architecture 2300 may include one or more software layers. For example, the layers may include an application layer 2302 that includes computer-executable code, such as applications, a data transport layer 2304 that includes executable code, such as for example iRobot Aware™, to assist communicating with outside devices, and/or applications on the application layer 2302, an operating system layer 2306 that includes an operating system such as BlueCat Linux, and a data storage/network connection layer 2308 that can send an receive data from other devices and store data. The data storage/network connection layer 2308 may include a data storage, such as a persistent data storage 2310.

The data storage/network connections layer 2308 may include one or more network connections adapted to connect with a plurality of devices outside of the RCU and send and receive data or control signals. The network connections may include a CAN connection 2312, such as a J1939 connector, a digital connector 2314, an Ethernet connector 2316, and a Serial connector 2318, such as an RS232 or RS 422 connector. The network connectors may be used to receive a plurality of data 2320 or send a plurality of data 2322. Examples of Serial data 2324 received by the serial connector 2218 include messages from a laser scanner, such as LMS291, and elevation messages from a nodding motion controller board. An example of Ethernet data 2326 includes scan control commands. An example digital data 2328 includes horizontal sync pulse data from an LMS291 laser scanner. An example of CAN data 2330 includes elevation messages from a nodding motion controller board. Examples of transmitted serial data 2332 includes commands to a laser scanner, such as LMS291, and motion control commands, such as to a nodding motion controller board. An example of Ethernet data 2334 includes range data to another RCU, such a via a message queue. An example of transmitted CAN data 2336 includes motion control commands, such as a nodding motion controller board. The application layer 2302 can include one or more applications, such as RCU functional code and drive behaviors. For example, the applications can include a laser scanner driver, such as LMS291 driver 2301, a nodding motion controller 2303, and a three-dimensional map generator 2305. The LMS291 driver 2301 may read configuration data that configures a laser scanner, such as for example LMS 291, for continuous output of range data at a particular frequency. One example of such frequency is 75 Hz. The LMS291 driver 2301 may also read range data and timestamp it and publish the data to a network message queue for use by a three-dimensional map generator.

The nodding motion controller 2303 can read configuration data, receive commands to control nodding/scanning behavior, and manipulate the scanning hardware according to the preceding commands. The nodding motion controller 2303 may also receive horizontal sync pulses as an interrupt and notes the time of the last interrupt. In addition, the nodding motion controller 2303 can receive elevation messages from a nodding motion controller board, compute the time of the start of the last scan based on empirically determined fixed offset from horizontal sync pulses, uses this time to timestamp the elevation data, and sends time stamped elevation data to the three-dimensional map generator 2305.

The three-dimensional map generator 2305 can read configuration data, read scans from the laser scanner driver 2305, read time stamped elevation messages from the nodding motion controller 2303, and compute the elevation of the nodding mechanism at the start of the last range scan based on, for example, sinusoidal motion of the nodder. The three-dimensional map generator 2305 may also mark each scan with computed elevation at the start of the scan, publish range data annotated with elevation information to a network message queue for use by a supervisory RCU, and detect a loss of synchronization due to errors and resynchronize by discarding data until a match can be achieved between all timestamps.

Figure 30:
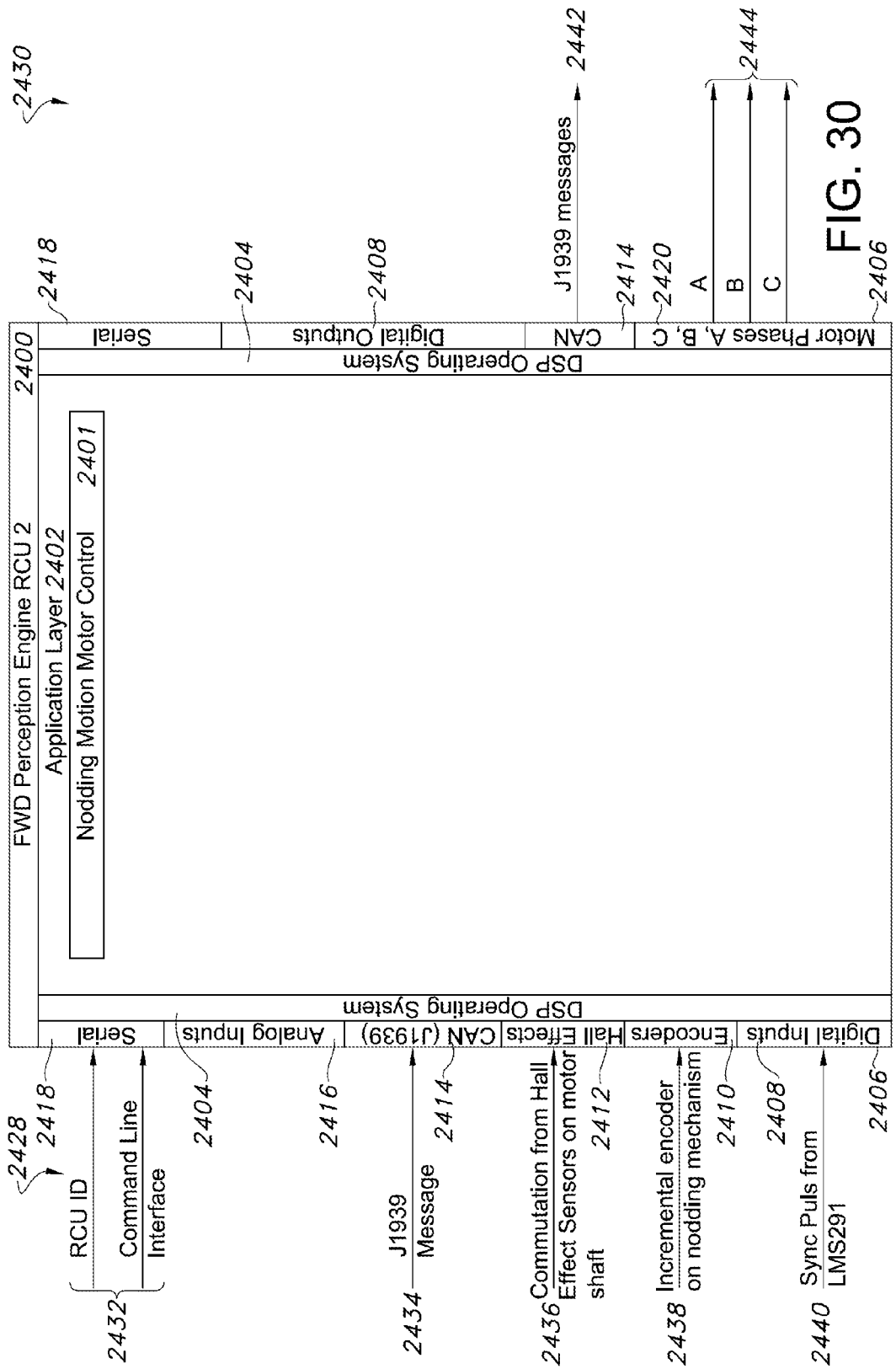
FIG. 30 illustrates a forward perception engine RCU software architecture according to another embodiment of the present invention.

FIG. 30 illustrates a second embodiment of software architecture for a forward perception engine RCU 2400. The software architecture 2400 includes a plurality of software layers. For example, the layers may include an application layer 2402 having applications, a DSP BIOS layer or optional operating system layer 2404 that can include an operating system or other signal processing code, and a network connection layer 2406. An example of an operating system including on the DSP operating system layer 2404 includes a Texas Instruments™ DSP BIOS.

The network connection layer 2406 may include one or more network connectors, such as a digital input and output 2408, encoder connector 2410, hall effect connector 2412, CAN connector 2414, such as a J1939 connector, analog input 2416, serial connector 2418, such as an RS232 or RS422 connector, and motor phases output 2420. The network connectors may be used to receive a plurality of data 2428 or send a plurality of data 2430. Examples of serial data 2432 received by the serial connector 2418 include identification from other RCUs and a command line interface. An example of received CAN data 2434 includes J1939 messages. An example of received hall effects 2436 includes a commutation from Hall effect sensors on motor shafts. An example of receive encoder data 2438 includes incremental encoder data on a nodding mechanism. An example of received digital data 2440 includes a sync pulse from a laser scanner, such as an LMS291 laser scanner. An example of transmitted CAN data 2442 includes J1939 messages. An example of motor phase data 2444 includes three-phase motor phases A, B, and C.

Application on the application layer 2402 may include a nodding motion motor control 2401. The nodding motion motor control 2401 may communicate with a laser nodding actuator or other device using a J1939 protocol and through a CAN bus. The nodding motion motor control may also provide command line debug via the same or different network connection.

Figure 31:
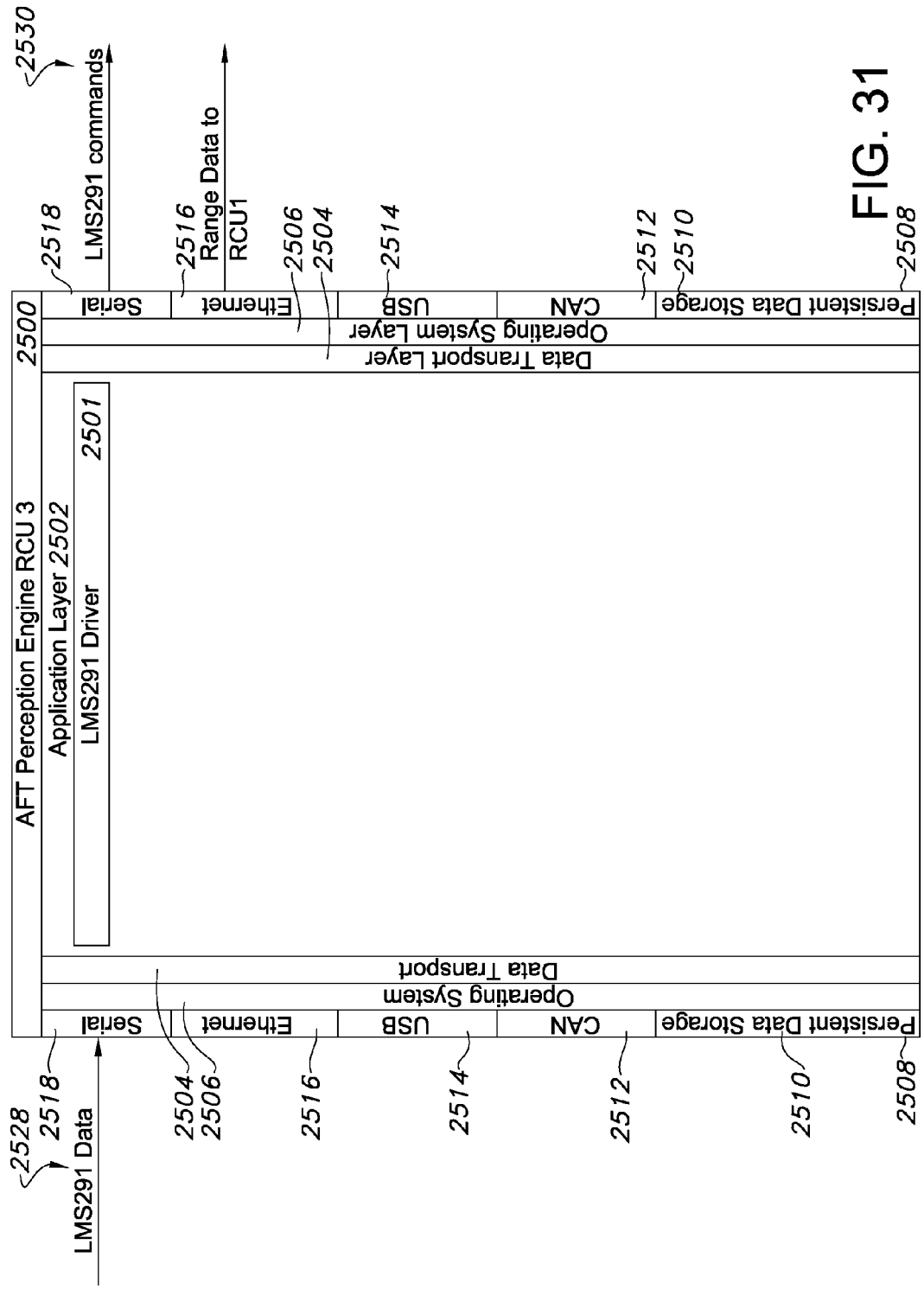
FIG. 31 illustrates a perception engine RCU software architecture according to one embodiment of the present invention.

FIG. 31 illustrates one embodiment of software architecture for a rear perception engine RCU 3 2500. The RCU may become a rear perception engine RCU after being designated as such and receiving the appropriate application code. The rear perception engine software architecture can also include a plurality of software layers, such as an application layer 2502 that includes one or more applications, a data transport layer 2504, an operating system layer 2506 that can include an operating system, such as BlueCat Linux, and a data storage/network connect layer 2508. The data storage/network connect layer 2508 can include a data storage, such as persistent data storage 2510, and one or more network connectors to allow the RCU to send and receive data and other communicate with devices outside of the RCU. The network connectors can include CAN 2512, USB 2514, Ethernet 2516, and Serial 2518. The network connectors can receive various types of data 2528 and output various types of data 2530.

The application layer 2502 may include a laser scanner driver application, such as LMS291 driver 2501, that reads configuration data, configurations the laser scanner for continuous output of range data, reads range data, and publishes the data to a network message queue for use by a supervisory RCU. The application layer 2502 may include similar or the same behavior code, architecture, or otherwise, as the forward perception engine.

Figure 32:
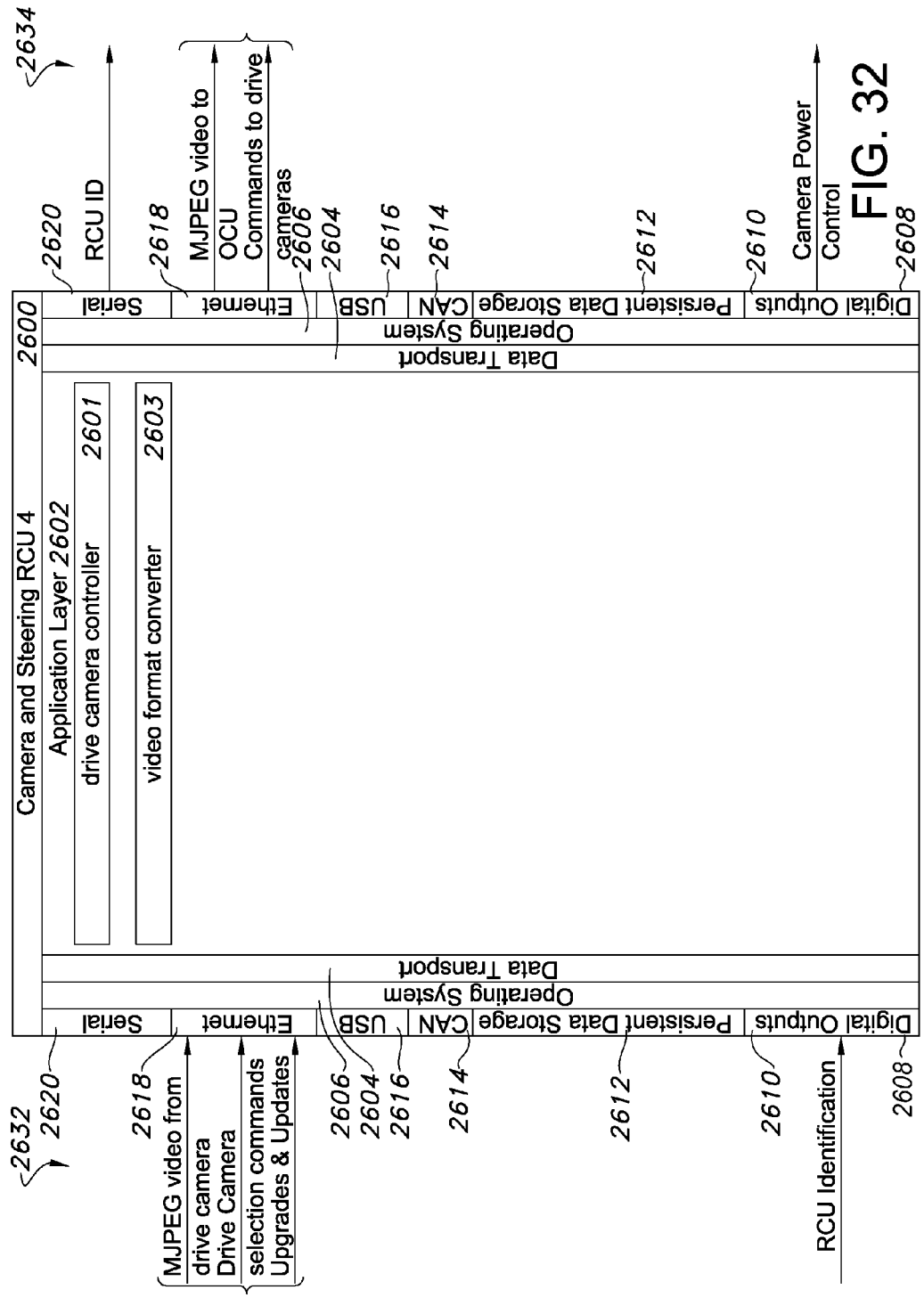
FIG. 32 illustrates a camera and steering RCU software architecture according to one embodiment of the present invention.

FIG. 32 illustrates one embodiment of a software architecture for a camera and steering RCU 4 2600. The camera and steering software architecture 2600 may include a plurality of software layers such as application layer 2602 that can include one or more applications, a data transport layer 2604, operating system layer 2606 that can include an operating system, such as BlueCat Linux, and data storage/network connection layer 2608. The data storage/network connection layer 2608 can include a data storage, such as persistent data storage 2612, and one or more network connectors for sending and receiving data. The network connectors can include digital outputs 2610, CAN 2614, USB 2616, Ethernet 2618, and Serial 2620. Examples of data received 2632 by the RCU includes video from drive cameras, drive camera selection commands, software upgrades and updates, and an identification from other RCUs. Examples of data transmitted 2634 by the RCU can include the RCU's identification, video to an OCU, commands to drive cameras, and camera power control.

The application layer 2602 may include one or more applications, such as drive camera controller 2601 and video format converter 2603. The drive camera controller 2601 can configure a drive camera based on configuration data and commands received over a network, select active drive camera based on commands, disable output from inactive cameras to reduce network load, and/or switch camera power on and off. The video format converter 2603 may read video, such as MJPEG video, from the active drive camera, convert MJPEG video into a subset format, and multicast video stream in the subset format to an OCU.

Figure 33:
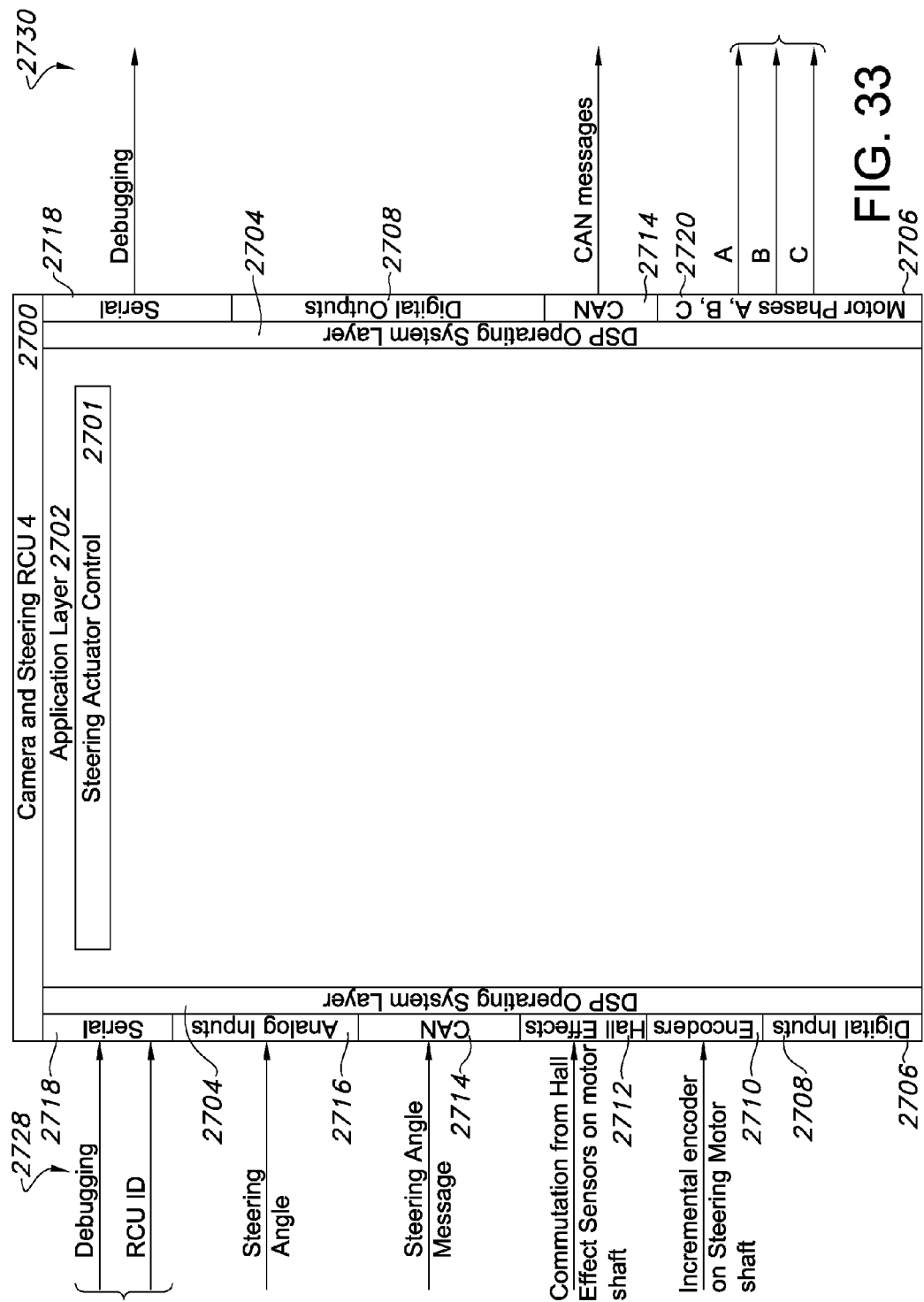
FIG. 33 illustrates a camera and steering RCU software architecture according to another embodiment of the present invention.

FIG. 33 illustrates another embodiment of software architecture for a camera and steering RCU 4 2700. The camera and steering software architecture 2700 can include a plurality of software layers, such as application layer 2702, a DSP operating system layer 2704, and network connection layer 2706. The DSP operating system layer 2704 may include an DSP BIOS or optional operating system. The network connection layer 2706 may include one or more types of network connectors, such as digital inputs 2708, encoders 2710, Hall effects 2712, CAN 2714, analog inputs 2716, serial 2718, and motor phases A, B, C 2720 that can be used to receive data 2728 and output data 2730.

The application layer 2702 may include one or more applications. For example, the applications may include a steering actuator control application 2701. The steering actuator control 2701 can provide command line debug over a first network connector, such as RS232 and communicate with one or more outside devices, such as actuators, over a second network connector, such as a CAN connector using J1939 protocol.

FIG. 9 illustrates a block diagram of an embodiment of a robotic control module 400. In the embodiment shown in FIG. 9, the robotic control module or RCU 400 has four high speed packet network ports 408, which are connected internal to the module 400 to the multi-port network switch 406. The ports 408 are externally connected to a packet network that is capable of relaying instructions for the reprogrammable actuator controller. In one embodiment, the packet network used is Ethernet and the ports 408 are Ethernet ports and the switch 406 is an Ethernet switch. For example, Ethernet packets from other robotic control modules, sensors, or other devices are received at the ports 408. These packets are processed by the switch 406. If a packet is intended for another device on the network, the switch routes the packet to the device. If a packet is intended for the robotic control unit 400, switch 406 passes the packet to the SBC 416. Similarly, the switch 408 receives outgoing packets from the SBC 416 and routes them to their destination. The switch 408 can perform all necessary authentication and confirmation routines and messages required by the network.

In one embodiment, the power supply 418 is capable of receiving vehicle power and outputting a variety of regulated voltages. For example, the input vehicle power may be from 8V to 36V DC and be unregulated. The vehicle power may be from an alternator on the vehicle and is thus unregulated and subject to power spikes, power drops, and in-rush currents, in the general range of 8-36V. As is explained in more detail below, the power supply 418 receives the unregulated vehicle power from the multi-pin connector 426 and outputs 5V, 12V, and 24V power. In one embodiment, the power supply includes a first stage that can convert and condition the unregulated power into a regulated first level voltage and a second stage that can covert the first level voltage into multiple level voltages. In other embodiments, the power supply includes one stage that coverts and conditions the unregulated power into multiple level voltages. In one embodiment, the 5V power is used internal to the robotic control module to power the SBC 416, motor controller 414, and the switch 406. In other embodiments, the 5V power may be made available exterior to the robotic control module 400. The robotic control module 400 can, in one embodiment, make the 12V and 24V power available external to the robotic control module 400 via the multi-pin connector 426. In one embodiment, there are two sources of 12V power available from the power supply 418 on the multi-port connector. More details about the power supply 418 are provided below with reference to FIGS. 12-14.

The motor amplifier 410 receives vehicle power from the motor connector 412 and outputs three phase DC power to control an associated actuator, such as a motor. The motor amplifier can provide power to control DC brushless motors and DC brushed motors. In one embodiment, the motor amplifier can provide sufficient power to control an AC motor. In some embodiments, a plurality of motor amplifiers may be used, where each provides power to a single associated actuator. Different motor amplifiers may also be used to provide different levels of DC power. The motor amplifier 410 provides the actuator or motor power via the motor connector 412. In one embodiment, the motor connector 412 is a Deutsch Connector. An Emergency Stop (E-Stop) system may be placed on the input vehicle power to the motor connector 412. This configuration provides that activation of an E-Stop removes power to the motor amplifier and the actuators, but power supplied by the power supply 418 to the SBC 416, and other components remains intact.

The motor amplifier 410 is controlled by signals received from the motor controller 414. Some embodiments of the motor controller include digital inputs and outputs and analog inputs. The motor controller 414 can receive inputs, such as robotic control behaviors, from the SBC 416, buffers 422, or other SBC's (e.g., in other RCU's) and process these inputs to generate control signals to send to the motor amplifier 410. For example, the motor controller 414 may receive analog inputs, such as voltage monitors at different levels, such as 24, 5, 3.3, 2.654, and 1.5 volts, temperature monitors of the motor amplifier 410 and board temperatures, current monitor signals regarding torque feedback, potentiometer readings used to control steering position, and RCU identifications used to identify the type of RCU and enable specific functionality, such as steering and nodding control. The motor controller 414 may also receive digital inputs, such as encoder inputs for nodding control, synchronization pulses for synchronizing laser data acquisition, signals used to configure the motor amplifier 410, signals used to communicate with the SBC 416, such as to provide user command line interface and to read compass data, CAN data used as a communication interface and physical layer for J1939 protocol, and motor amplifier fault signals that can trigger an interrupt as detected. The motor controller 414 may output digital signals such as PWM signals used to control motor torque, motor amplifier outputs, motor direction control, and an LED signal used as an indicator. Some embodiments of the motor controller 414 use a J1939 protocol communication standard based on a CAN physical interface. Data received and transmitted by the CAN interface may be periodically read, written, and stored into priority queues for processing by a J1939 stack. The J1939 stack can process incoming data by executing a callback function associated with incoming message data. The application can call an appropriate function for outgoing data based on the message to be sent. The data is then processed by the J1939 stack and placed on the transmit queue. The motor controller 414 may also use an RS232 physical interface. The signals to and from the motor controller 414 may be processed by peripherals, such as DSP peripherals. Analog inputs and one or more digital inputs may be processed by an application based on polling or interrupt handling.

In one embodiment, the motor controller 414 contains a Digital Signal Processor (DSP). In other embodiments, the motor controller can include a programmable logic device or a gate array. The motor controller DSP may boot application software, perform diagnostics, perform online software updates, set and configure motor controller and motor amplifier modules, determine RCU identification, perform position, velocity, and current control functions, read sensors, monitor system health, provide user with command line interface for configuration and testing.

More details about the operation of the motor amplifier 410 are described below with reference to FIGS. 14A-16.

In one embodiment, the robotic control module may include a mountable housing (e.g., module 500 formed from housings 502-504), a reprogrammable actuator controller (e.g., motor controller and/or DSP 414) within the mountable housing, an actuator connector (e.g., connector 412) available on the exterior of the mountable housing communicating a signal for actuator driving that is modulated by the reprogrammable actuator controller, a packet network switch (e.g., switch 406, such as an Ethernet switch or router) within the mountable housing, each of a plurality of network connectors (e.g., connectors or ports 408) available on the exterior of the mountable module being capable of connection to a packet network and communicating with the packet network switch, the packet network being capable of relaying instructions for the reprogrammable actuator controller, and a power supply (e.g., power supply 418) within the mountable housing, the power supply receiving unregulated power from the mobile robotic platform through a power input to the mountable housing (in this case, through multi-pin connector 426) and converting the unregulated power into interior regulated power (e.g., 5V) for the packet network switch and the reprogrammable actuator controller and into exterior regulated power (e.g., 12 and/or 24V), a power supply connector (e.g., also, but not necessarily, multi-pin connector 426) available on the exterior of the mountable module being capable of connection to the exterior regulated power.

With reference to FIG. 9, in one embodiment of the present invention, a robotic control module includes a mountable housing 404, a reprogrammable actuator controller 414 within the mountable housing capable of issuing actuator control signals within the mountable housing, an actuator amplifier (e.g., motor amplifier 410) within the mountable housing 404 that receives the actuator control signal from the reprogrammable actuator controller 414, an actuator connector 412 available on the exterior of the mountable housing (e.g. multipin connector 426) communicating an actuator drive signal modulated by the reprogrammable actuator controller 414 and the actuator amplifier (e.g. motor amplifier 410), a packet network switch 406 within the mountable housing, each of a plurality of network connectors 408 available on the exterior of the mountable housing being capable of connection to a packet network and communicating with the packet network switch 406, the packet network being capable of relaying instructions for the reprogrammable actuator controller 414, and a power supply 418 within the mountable housing 404, the power supply receiving unregulated power from the vehicle through a power input (e.g. 426) to the mountable housing 404 and converting the unregulated power into interior regulated power for the packet network switch 406 and the reprogrammable actuator controller 414 and into exterior regulated power, a power supply connector (e.g. 426) available on the exterior of the mountable housing being capable of connection to the exterior regulated power.

In one embodiment of the present invention, a robotic control module 400 includes a mountable housing 404, a microprocessor board 416 with code execution dynamic memory (e.g., RAM) and code storage nonvolatile memory (e.g., flash) within the mountable housing 404, the microprocessor board 416 being capable of executing and arbitrating among robotic control behaviors, a reprogrammable actuator controller 414 within the mountable housing 404 capable of issuing actuator control signals within the mountable housing according to the robotic control behaviors, an actuator amplifier (e.g. motor amplifier 410) within the mountable housing 404 that receives the actuator control signal from the reprogrammable actuator controller 414, an actuator connector 412 available on the exterior of the mountable module communicating an actuator drive signal modulated by the reprogrammable actuator controller 414 and the actuator amplifier (e.g. 426), a packet network switch 406 within the mountable module 404, each of a plurality of network connectors 408 available on the exterior of the mountable module being capable of connection to a packet network and communicating with the packet network switch 406, the packet network being capable of relaying instructions for the reprogrammable actuator controller 414, and a power supply 418 within the mountable module 404, the power supply 418 receiving unregulated power from the mobile robotic platform through a power input (e.g. 426) to the mountable module 404 and converting the unregulated power into interior regulated power for the microprocessor board, the reprogrammable actuator controller 414, and the packet network switch 406 and into exterior regulated power, a power supply connector (e.g. 426) available on the exterior of the mountable module being capable of connection to the exterior regulated power.

In one embodiment of the present invention, a robotic control module 400 includes a mountable housing 404, a microprocessor board 416 with code execution dynamic memory and code storage nonvolatile memory within the mountable housing 404, the microprocessor board 416 further including a plurality of protocol transceivers 420 (e.g., RS-232, -422; CAN bus) and being capable of executing transceiver monitoring code (e.g., protocol stacks or drivers), a multi-pin connector 426 available on the exterior of the mountable housing being capable of communicating with the plurality of protocol transceivers (e.g., to connect sensors or the like), a reprogrammable actuator controller 414 within the mountable module capable of issuing actuator control signals within the mountable housing 404, an actuator amplifier (e.g. motor amplifier 410) within the mountable housing 404 that receives the actuator control signal from the reprogrammable actuator controller 414, an actuator connector 412 available on the exterior of the mountable housing 404 communicating an actuator drive signal modulated by the reprogrammable actuator controller 414 and the actuator amplifier 410, a packet network switch 406 within the mountable housing 404, each of a plurality of network connectors 408 available on the exterior of the mountable housing 404 being capable of connection to a packet network and communicating with the packet network switch 406, the packet network being capable of relaying instructions for the reprogrammable actuator controller 414, and a power supply 418 within the mountable housing 404, the power supply 418 receiving unregulated power from the vehicle through a power input (e.g. 426) to the module and converting the unregulated power into interior regulated power for the microprocessor board 416, the reprogrammable actuator controller 414, and the packet network switch 406 and into exterior regulated power, a power supply connector (e.g. 426) available on the exterior of the mountable housing being capable of connection to the exterior regulated power.

Figure 2:
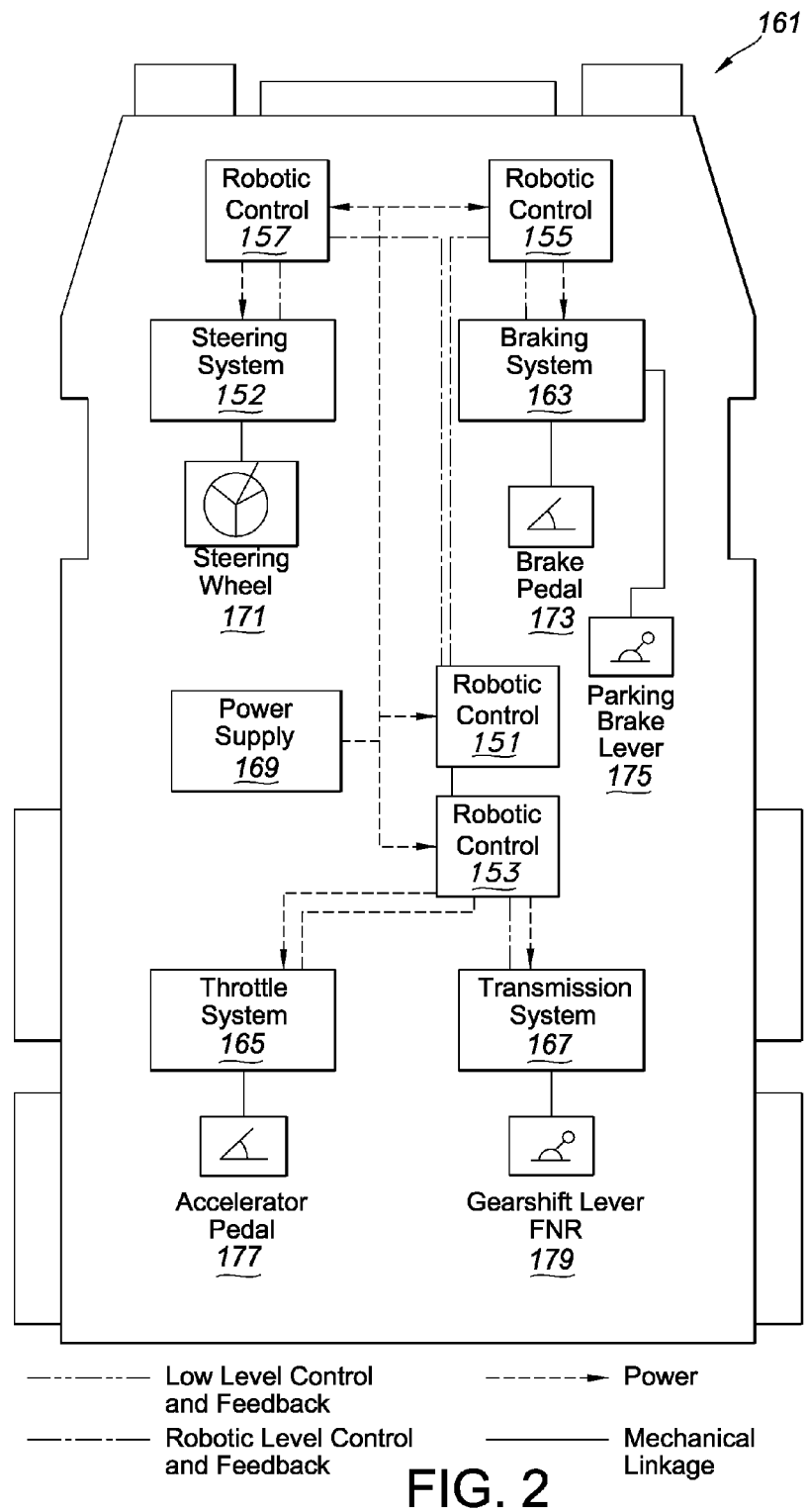
FIG. 2 is a block diagram illustrating a vehicle control systems according to one embodiment of the present invention.

As explained above, multiple robotic control modules can be used in a robotic control system of a vehicle or mobile platform. The robotic control modules can work together, such as for example as illustrated by FIG. 2 and explained with reference to FIGS. 3A-D, to distribute the processing and computing of the robotic control system. In one embodiment of the present invention, a distributed robotic control system for a robotic vehicle or mobile platform includes a robot platform having a body (e.g., as shown in FIGS. 4-7) and a motor 316 connected to a drive, a defined set of robotic control routines selected from behavior arbitration and behaviors; sensor drivers; drive/actuator controllers; database management and databases, or data converters, a plurality of interchangeable mountable modules (e.g., RCU #1-#4 238, 254, 244, 262), each interchangeable mountable module including a power input (e.g., optionally via multipin connector 426), a plurality of network connectors (e.g., ports 408), and a multi-pin connector (e.g., 426) available on the exterior of the interchangeable mountable module, and each interchangeable mountable module including: a microprocessor board 416 with code execution dynamic memory (e.g., SDRAM) the microprocessor board 416 further includes: a plurality of protocol transceivers 420, the multi-pin connector 426 being capable of communicating with the plurality of protocol transceivers sensors, and nonvolatile memory including executable code, each microprocessor board 420 of a interchangeable mountable module being configurable to execute a selected part of the executable code, a packet network switch 406, each of the plurality of network connectors being capable of connection to a packet network distributed through the body and communicating with the packet network switch 406, the packet network being capable of relaying instructions for or from the microprocessor board 416, the plurality of microprocessor boards can be provided with instructions to load and execute discrete ones of the defined set of robotic control routines, as illustrated and described above with respect to FIGS. 23-33, such that all of the defined set of robotic control routines are executed among the plurality of interchangeable mountable modules.

In one embodiment, the robotic control system includes versatile robotic control modules (sometimes referred to herein as Robotic Control Units (RCU)) that may be used to control the operation systems, such as a throttle system, a steering system, a braking system, and a shifting system. In this embodiment, the robotic control modules are distributed throughout the vehicle in idle spaces in the vehicle. Idle spaces can exist void spaces that are unused on the vehicle prior to installation of the robotic control system (as shown in FIGS. 4-8). The robotic control modules may each have different functions. For example, one robotic control module may control an operation system (i.e., a system for operation of a vehicle) and another robotic control module may perform supervisory functions. In one embodiment, each robotic control module is capable of performing any of the different functions depending on its placement in the vehicle.

Physical Configuration of Robotic Control Module

As shown in detail in FIGS. 10-11D, the robotic control module can be packaged in a single housing in a manner such that heat is reduced, overall size of the package/housing is reduced, and components are protected from electro-magnetic noise. In one embodiment of the present invention, robotic control packaging for a mobile robotic platform, includes a housing 500 formed as a flat rectangular prism of six face panels, front and rear faces of the housing being defined on the smallest surface panels of the six surface panels, a first circuit board arranged within the housing 508, extending from the front face to the rear face, the first circuit board including a signal processor 512 sensitive to electromagnetic noise arranged toward the front face of the housing, a second circuit board 506 arranged within the housing parallel to the first circuit board 508, extending from the front face to the rear face, the second circuit board 506 including a motor amplifier inductor 516 and a power supply inductor 514 both arranged toward the rear face of the housing 500 and both generating electromagnetic noise, and a third circuit board 510 arranged within the housing parallel to each of the first and second circuit boards 508, 506 and intermediate the first circuit board 508 and the second circuit board 506, the third circuit board 510 shielding the signal processor 512 from the electromagnetic noise generated by the motor amplifier inductor 514 and power supply inductor 516.

According to one embodiment, the first circuit board 508 and the second circuit board 506 may define there between a flat intermediate volume, each of the motor amplifier inductor 514, power supply inductor 516, and third circuit board 510, and at least some components of the first circuit board 508 and of the second circuit board 506 extend into the flat intermediate volume by an amount such that such components of the first circuit board 508 and second circuit board 506 overlap within the flat intermediate volume. The robotic controller packaging for a mobile robotic platform may further be configured such that the housing 500 is made from heat conductive material; the first circuit board 508 includes power supply circuitry generating internal heat connected to the housing 500 via a direct heat conductive path 520; and the second circuit board 506 includes motor amplifier circuitry generating internal heat connected to the module via a direct heat conductive path 518, so that the housing 500 acts as a heat sink for each of the power supply circuitry and the motor amplifier circuitry. The motor amplifier circuitry generating internal heat may include a plurality of MOSFETs, and such MOSFETs can be each arranged to directly contact the housing connected to the housing so that the housing acts as a heat sink for the plurality of MOSFETs.

An embodiment of the present invention includes a method of fitting an existing mobile platform with robotic control packaging and includes forming a plurality of mountable modules as flat rectangular prisms of six face panels, front and rear faces of each mountable module being defined on the smallest surface panels of the six surface panels, the front and rear faces having distributed between them a power input, an actuator connector, a plurality of network connectors 524A-D, and a power supply connector 522; selecting a plurality of mounting sites for the plurality of mountable modules on the existing mobile platform, at least some of the mounting sites being idle space within interior compartments of the existing mobile platform through which no moving part passes; mounting a plurality of the mountable modules within the mounting sites; connecting all of the mountable modules to form a communications network among the network connectors; connecting all of the mountable modules via the power input to a power source of the existing mobile platform; connecting selected ones of the mountable modules to a corresponding actuator proximate thereto to be driven via the actuator connector; and connecting selected ones of the mountable modules to a corresponding sensor proximate thereto to be powered by the power supply.

FIG. 10 is an exploded view of the portions of a robotic control module 500 according to one embodiment. FIGS. 11A-D is a further series of exploded views of the illustrative robotic control module 500. In the embodiment shown, the robotic control module 500 is contained in a wedge box housing or module that may be formed from two wedge halves, or other mountable housing, box or enclosure having a mating, interlocking or sealable top and bottom. In some embodiments, the wedge box housing or module includes configurations of mating, interlocking, or sealable outer walls. For example, the wedge box housing may include a first housing 502 and a second housing 504. The first housing 502 and the second housing 504 may fit together as shown in FIG. 11C to form a rectangular housing. The first and second housings can be heat conductive and act as a heat sink for the components contained in the housing. Within the housing, there can be three circuit boards, a second circuit board 506, a first circuit board 508, and a third circuit board 510. In one embodiment, the third circuit board is a single board computer, such as the SBC 416 described above. The first circuit 508 board may be affixed to the second housing 504 and the second circuit board 506 may be affixed to the first housing 502.

The second circuit board 506 may have two inductors, 514, 516. One of the inductors may be associated with power supply circuitry and the other inductor may be associated a motor amplifier circuitry. In some embodiments, the second circuit board 506 may have one inductor that may be associated with both the power supply circuitry and the motor amplifier circuitry. The inductors 514, 516, can be mounted to the second circuit board 506 with screws 528A-B. Mounting the inductors 514, 516 at one end of the circuit board reduces vibration of the board. The inductors, 514, 516, can produce electromagnetic noise that can interfere with various components of the robotic control module, such as a DSP or other signal processor. In one embodiment, the third circuit board 510 may be positioned parallel to the first and second circuit boards, 506, 508, and may be affixed to the first circuit board 508. The third circuit board 510 can be positioned on the first circuit board 508 over a signal processor 512, such as a DSP, in order to shield the signal processor 512 from the electromagnetic noise created by the inductors, 514, 516. Also as illustrated in FIG. 10, the signal processor 512 is at the opposite end of the robotic control module 500 than the inductors 514, 516.

The robotic control module 500 is configured in such a way to reduce the heat of the module 500. For example, in the embodiment shown in FIGS. 10 and 11A-D, the first circuit board contains a heat sink 518 that may be positioned over power supply modules to absorb heat created by these power supply modules. In the embodiment shown in FIG. 10, the heat sink has a portion that extends to the edge of the first circuit board 508 in order to make contact with the second housing 504 when the board 508 is fixed to the housing 504. This acts to further dissipate heat from the power supply modules as the second housing 504 conducts heat. The second circuit board 506 contains some electronics 520, such as MOSFETS, which are positioned at the edge of the board 506, so that the electronics 520 can provide a heat conductive path to the first housing. This can dissipate heat via the heat conductive first housing 502. The use of heat sink and the described heat dissipation techniques allows the robotic control module 500 to avoid using a mechanical fan for cooling.

The robotic control module 500 is configured in such a way to reduce the size of the module 500. The second circuit board 506 is arranged with a power connector 522, such as a Deutsch connector, and package network connectors 524A-D, such as Ethernet connectors at a first end of the housing. The first circuit board 508 is arranged with multi-pin connectors 526, such as a Cinch connector, arranged at a second end of the housing. These and other configuration features allow the robotic control module 500 to have a relatively small size. In one embodiment, the robotic control module has dimensions less than 5 inches by 8 inches by 10 inches. Configuring the robotic control module with the multi-pin connectors 526 at one end of the module 500 and the packet network connectors 524A-D at the other end also helps to reduce noise interference from the multi-pin connectors 526 interfering with the packet network connectors 524A-D.

Robotic Control Module Power Supply

Figure 12:
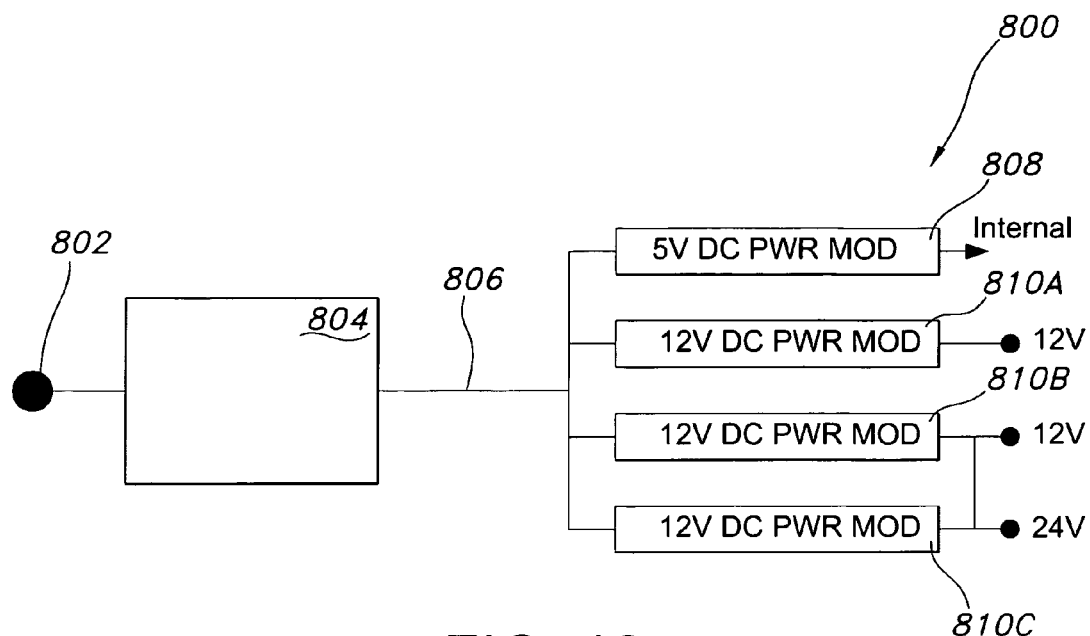
FIG. 12 is a block diagram illustrating a power system of a robotic control unit in one embodiment of the present invention.
Figure 13:
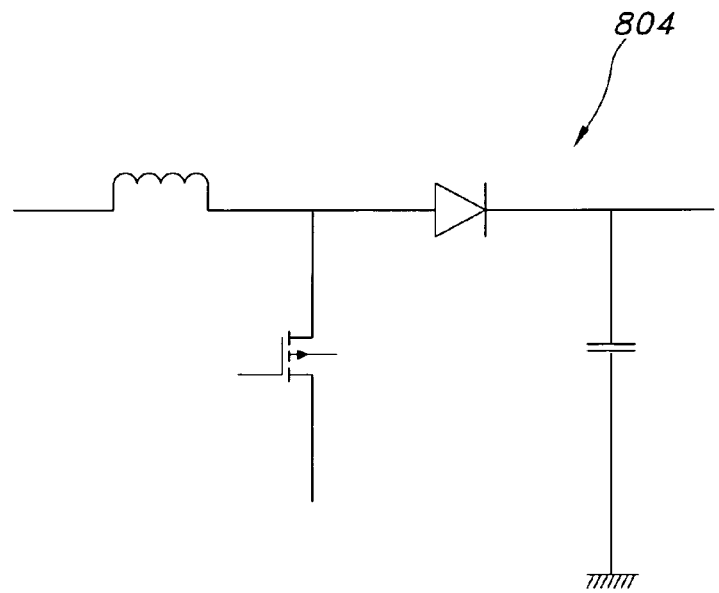
FIG. 13 is a schematic of a booster circuit of the power system of one embodiment of the present invention.

FIG. 12 is a block diagram of an illustrative power supply 800 of the robotic control module of one embodiment. The power supply receives vehicle power and outputs a variety of regulated voltages. In the embodiment shown in FIG. 12, the power supply circuit received vehicle power 802 that may be from 8V to 36V DC and be unregulated. The vehicle power 802 may be from an alternator on the vehicle and is thus unregulated and subject to power spikes, power drops, and N-rush currents in the general range of 8-36V. The vehicle power 802 is received first by a booster circuit 804. An illustrative schematic diagram of the booster circuit 804 is shown in FIG. 13.

In one embodiment of the power supply 800, a two stage process is used to provide various voltages of regulated power. In the first stage, the booster circuit 804 takes the highly variable input voltage 802 and puts out a steady 48V at 806. In the second stage, the output voltage 806 may be received by a transformer or transformers to reduce the voltage to the desired levels. In the embodiment shown in FIG. 12, a 5V transformer 808 and three 12V transformers 810A-C receive the output power 806 from the booster circuit 804. The 5V transformer 808 converts the 48V power to 5V power. In one embodiment, the 5V power is used internally to power components in the robotic control module as shown in FIG. 9, but could be made available externally. The 12V transformers 810A-C convert the 48V power to 12V power. The 12V transformers 810B-C are connected to provide 24V power. The 12V and 24 V power can be made available externally to the robotic control module.

This two stage approach provides significant advantages. For example, it is difficult to handle a very wide range of input power and relatively wide range of output power. If there is a 5-50V range of input power to do 50V max, a transformer has to handle 50-500V or so. To handle this in single stage is an enormous transformation and is also only typically handled with low duty cycles, and may typically produce ripples and noise.

RCU Motor Amplifier

Figure 14A:
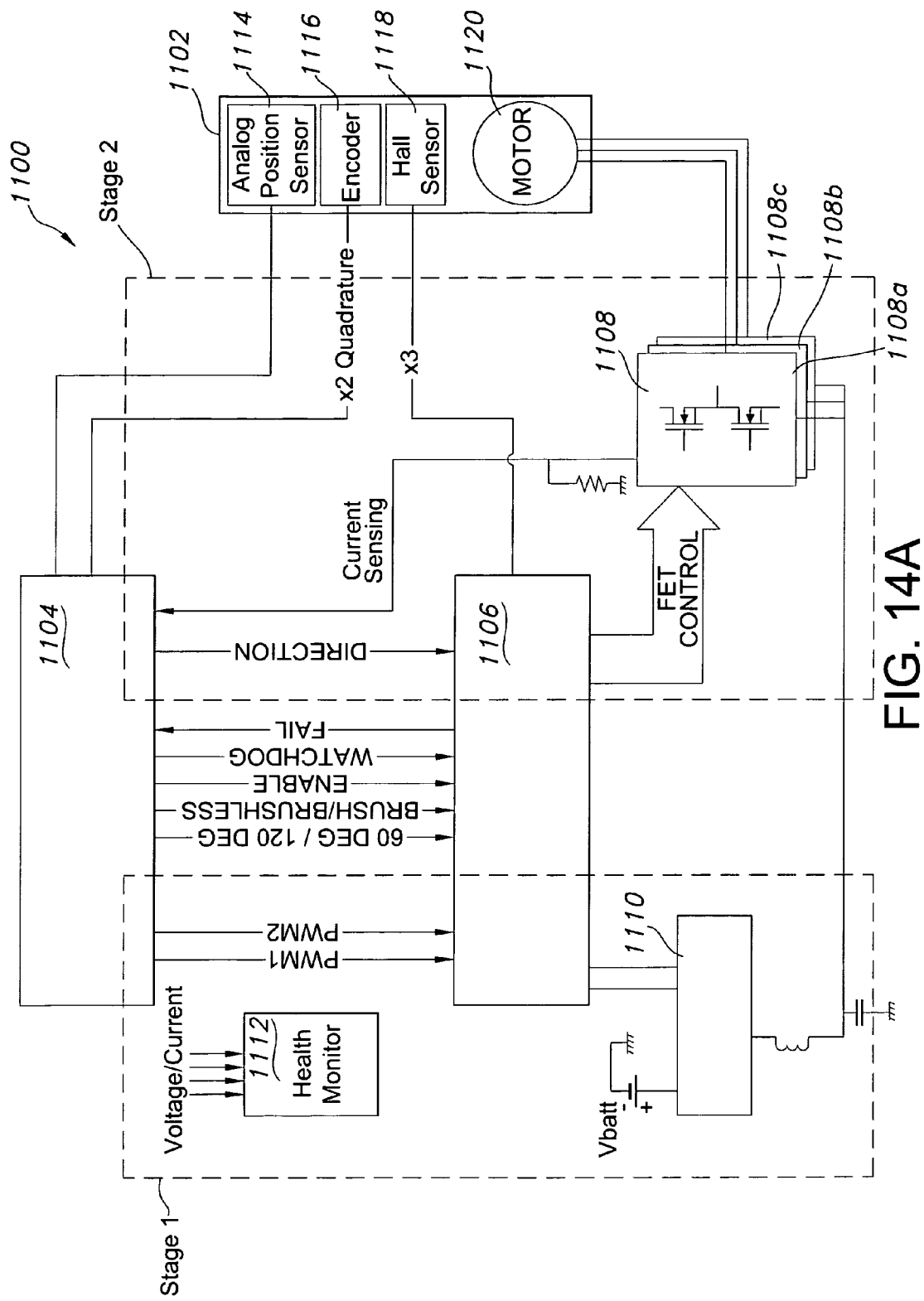
FIG. 14A is block diagram illustrating a motor amplifier of a robotic control unit according to one embodiment of the present invention.
Figure 14B:
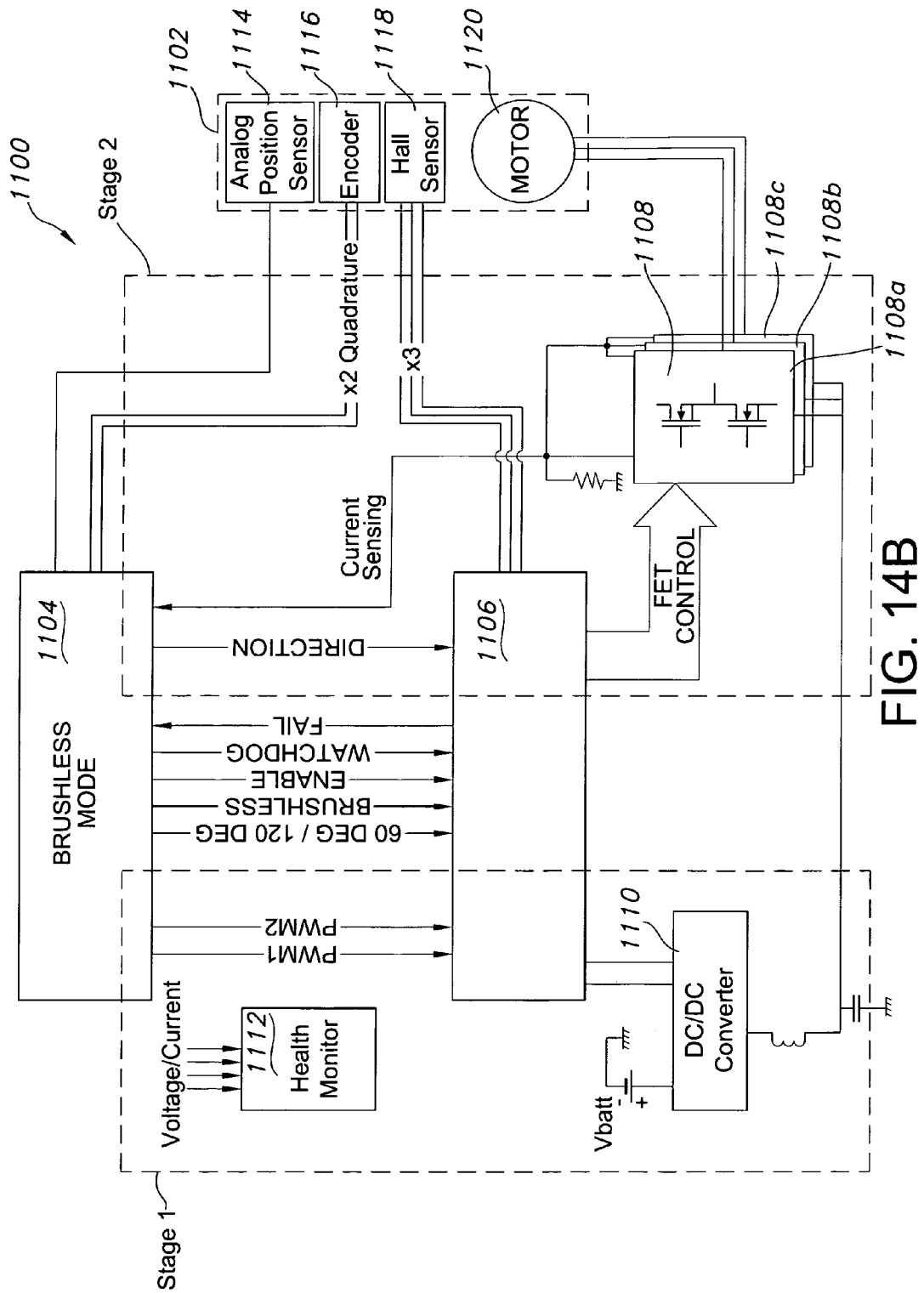
FIG. 14B is a block diagram illustrating the motor amplifier of FIG. 14A in a brushless mode.
Figure 14C:
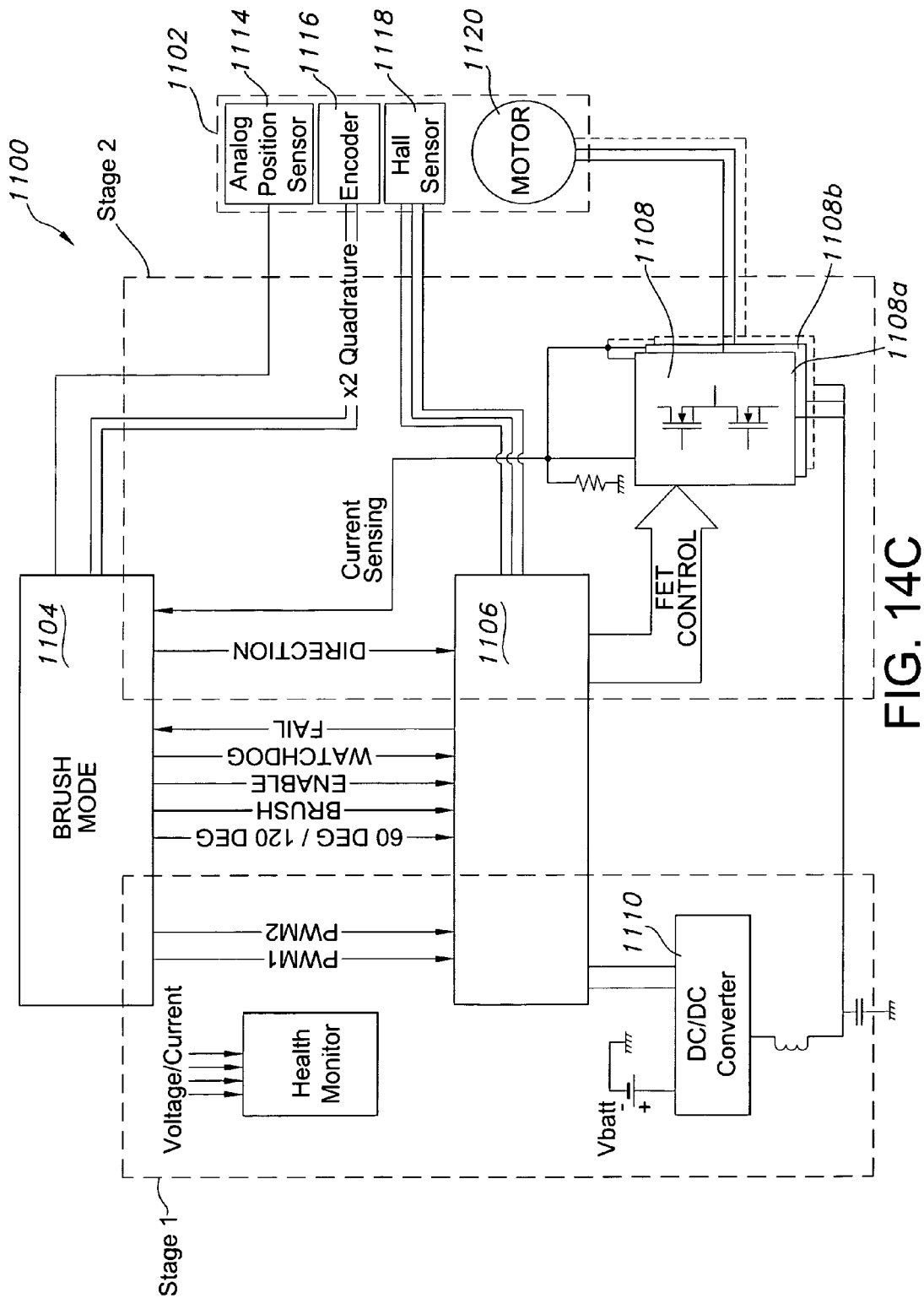
FIG. 14C is a block diagram illustrating the motor amplifier of FIG. 14A in a brush mode.
Figure 16:
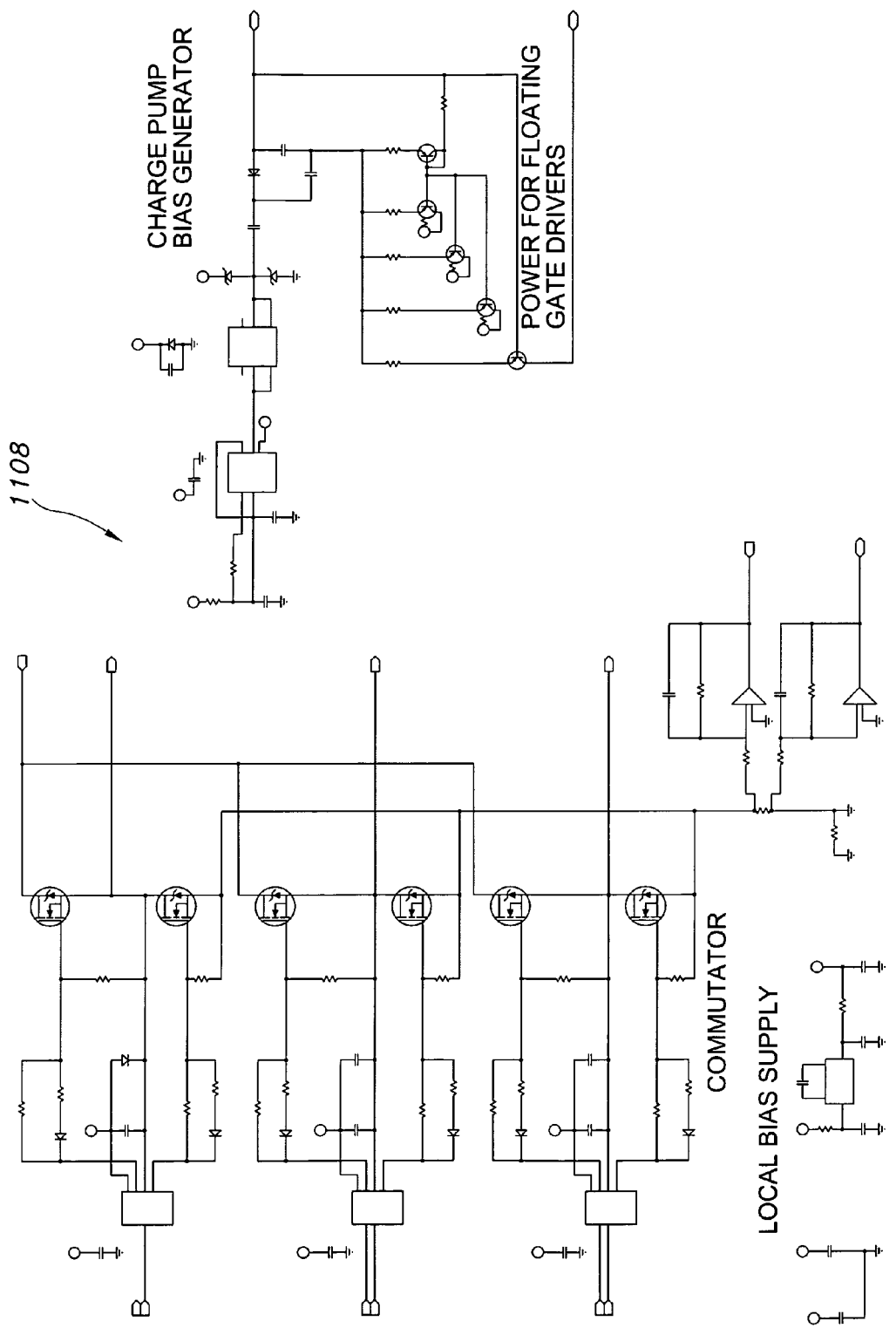
FIG. 16 is a schematic of a field effect transistor circuit of the motor amplifier of FIGS. 14A-C according to one embodiment of the present invention.

FIGS. 14A-C are block diagrams of embodiments of an illustrative motor amplifier 1100 of the robotic control module. The motor amplifier 1100 illustrated in FIGS. 14A-C allows for control of high torque, brushless or brushed motors with fairly accurate position control if needed. In one embodiment, the motor amplifier 1100 includes two stages. The first stage provides for large torque and includes a DC/DC converter 1110 for providing voltage to the second stage. The second stage includes a three-phase bridge that allows for control of different kinds of motors. A combination of current control via PWM control via the FETS/commutators 1108 as well as voltage control is used to control the supply into the bridge. FIG. 16 is a schematic diagram of a FET/commutators 1108 according to one embodiment of the present invention.

The motor amplifier 1100 can supply drive signals to a motor 1120, such as a brush motor, 3-phase induction motor in scalar control mode or vector control mode (using encoder), or brushless DC motor in sinusoidal or PWM (using encoder), and three-phase AC motor. Hall effect sensors 1118, quadrature encoding 1116, and an analog position sensor 1114 are available for speed/position feedback (also there is feedback from the commutators, etc.).

Figure 15:
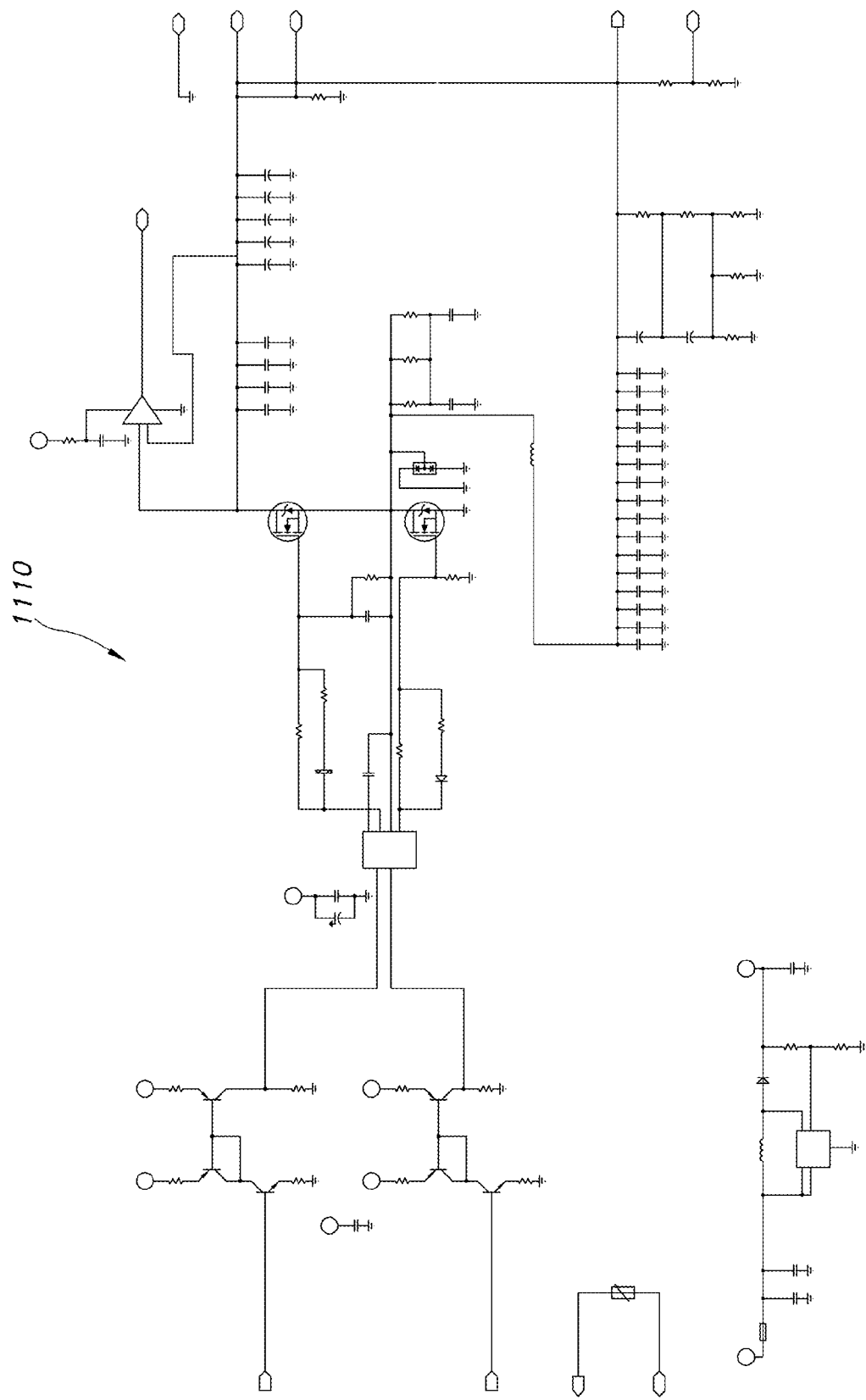
FIG. 15 is a schematic of a power system of the motor amplifier of FIGS. 14A-C according to one embodiment of the present invention.

Both the DSP 1104 and Complex Programmable Logic Device (CPLD) 1106 can conceivably be considered part of each stage, because of their (control) contribution to e.g., DC/DC conversion stage 1 (setting the voltage) and to running the FETS 1108 in stage 2. The DC/DC converter 1110 increases and regulates the input power, for example 8V-36V vehicle unregulated power, and can be connected to an inductor as shown. The DC/DC converter 1110 receives a pulse-width modulation (PWM) signal from the DSP 1104 via the CPLD 1106 having a duty cycle proportional to the required power. For example, the PWM signal can control one or more switches in the DC/DC converter 1110 which control the voltage or current out of the DC/DC converter 1110. The DSP 1104 sends to the CPLD 1106 two PWM signals with duty cycle proportional to current command. PWM1 controls High site MOSFET and PWM2 controls Low site MOSFET. To avoid through shot current PWM1 and PWM2 signals have dead time between falling and rising edges. The dead time can be set by DSP 1104, and it can be, for example, 125 nS. In one embodiment, the PWM frequency is 30 kHz. FIG. 15 is a schematic diagram of the illustrative DC/DC converter 1110 of the motor amplifier 1100 according to one embodiment.

The motor amplifier 1100 also contains the CPLD 1106. The CPLD 1106 provides commutation signals for 6 power MOSFETs 1108 assembled as 3 phase bridge and acts as a protection device for variety of signals. The commutation signals result from the logic conversion from three Hall sensors 1118 and direction to 6 outputs controlling power MOSFETs 1108. Commutation signals could be generated for 60° or 120° spaced Hall sensors 1118. Protection logic verifies that Gray Code is not violated.

In cases where a violation for Gray Code or Hall conditions occur a "Commutation fault—CF" signal will be established. The commutation sequence changes depending on direction command. Commutation signals can be generated for Brushed (illustrated in FIG. 14C) and Brushless (illustrated in FIG. 14B) DC motors. In the case of a brushed motor, whether Phase A or B will be used to commutate the motor depends on the direction command.

In FIG. 14C, one embodiment of the motor amplifier 1100 is illustrated operating in a brushless mode. The CPLD 1106 receives a brushless signal from the DSP 1104 to use commutation signals from tables associated with brushless operation and send a signal to the FETs/commutators 1108*a-c* accordingly. Similarly, as illustrated in FIG. 14B, the DSP 1104 may send a signal to the CPLD 1106 to operate in a brush mode. The CPLD 1106 can use commutation signals from tables associated with brush operation. In brushless mode, the CPLD receives a feedback signal from a Hall sensor and sends control signals based on the Hall sensor feedback signal to an H-bridge included with the FETs/commutators to control the motor. In brush mode, the DSP receives feedback from the encoder and sends control signals to the FET/commutator through the CPLD based at least in part on the encoder control signal. The FET/commutator controls the motor using the H-bridge.

After receiving the operation mode, the CPLD 1104 provides a control signal to the FETs/commutators 1108*a-c*. The FETs/commutators 1108*a-c* can drive DC power from the DC/DC converter 1110 to the motor 1120 change the direction of motor rotation based on control signals from the DSP 1104 via the CPLD 1106. The DSP 1104 can receive a current sensing feedback signal from the FETs/commutators 1108*a-c* and use the current sensing feedback signal to control the duty cycle of the PWM signals to the DC/DC converter 1110.

The motor amplifier 1100 may be in communication with a motor system 1102 including the motor 1120 along with one or more sensors and encoders, such as an analog position sensor 1114, encoder 1116, and Hall effect sensor 1118. The CPLD 1106 may receive a feedback signal from the hall sensor 1120 regarding the motor's (or rotor contained within the motor) orientation or position. The Hall effect sensor 1118 can measure the rotor's position or other position information associated with the motor, and provide a feedback signal to the CPLD 1106. The DSP 1104 can receive feedback from an analog position sensor 1114 and encoder 1116. The analog position sensor 1114 may obtain data associated with the motor gearbox or the shaft, such as position information related to the gearbox and shaft. The encoder 1118 may obtain the speed of the motor and provide the speed data to the DSP 1104. The DSP 1104 can change the duty cycle of the PWM based on the feedback signals. In some embodiments, the DSP 1104 can provide the CPLD commands based on the feedback signals.

In some embodiments, a health monitor 1112 may be provided that can receive data associated with whether the motor 1120 and/or motor amplifier components are functioning properly. If the health monitor 1112 determines the components are not functioning properly, it can provide a signal to the CPLD 1106 that stops the PWM signal from being sent to the DC/DC converter and can shut off power to the motor 1120.

Exclusive OR logic into the CPLD 1106 protect output signals from having High level conditions in the same time for High and Low sites MOSFETs. The CPLD 1106 may, for example, take configuration data through SPI as follows:

Motor type: brushed or brushless;
Motor: enable or disable;
Hall sensor: 60° or 120°;
Fault clear;
DC/DC—PWR Over current: enable or disable; and
Direction: clockwise or anticlockwise.

In some embodiments of the present invention the motor controller DSP 1104 and/or CPLD 1106 may be accessed by the RCU to perform other types of processing besides motor control and amplification. For example, the DSP 1104, CPLD 1106, and/or and another processor device, such as a field programmable gate array (FPGA) may be used by the RCU to perform specialized logic processing associated with relatively large vector arrays, floating point computations, or other requirements, as needed to control the robotic vehicle.

Robotic Control Module Software Configuration Check

Figure 17:
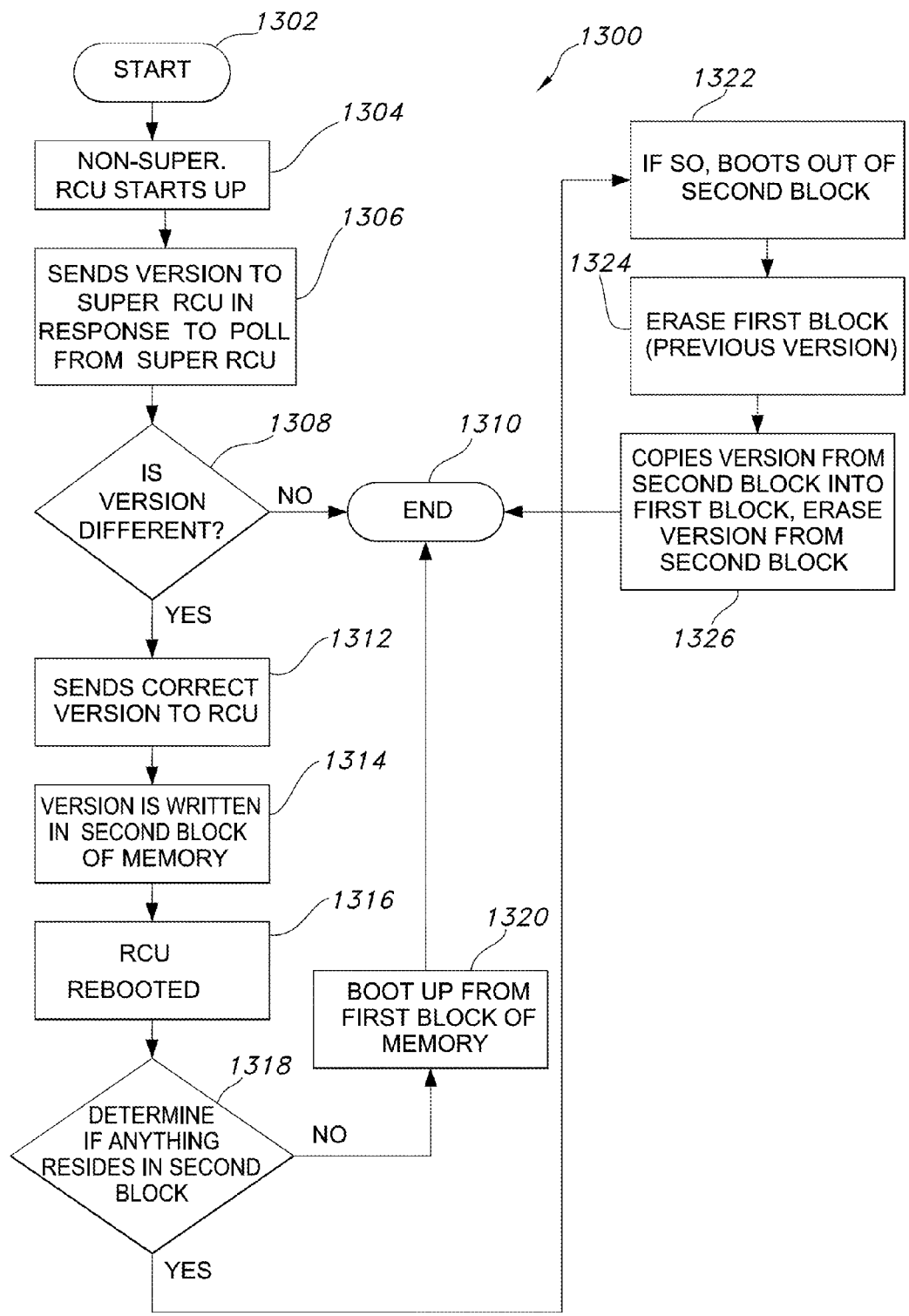
FIG. 17 is a flow diagram of an illustrative software check procedure of one embodiment of the present invention.
Figure 18:
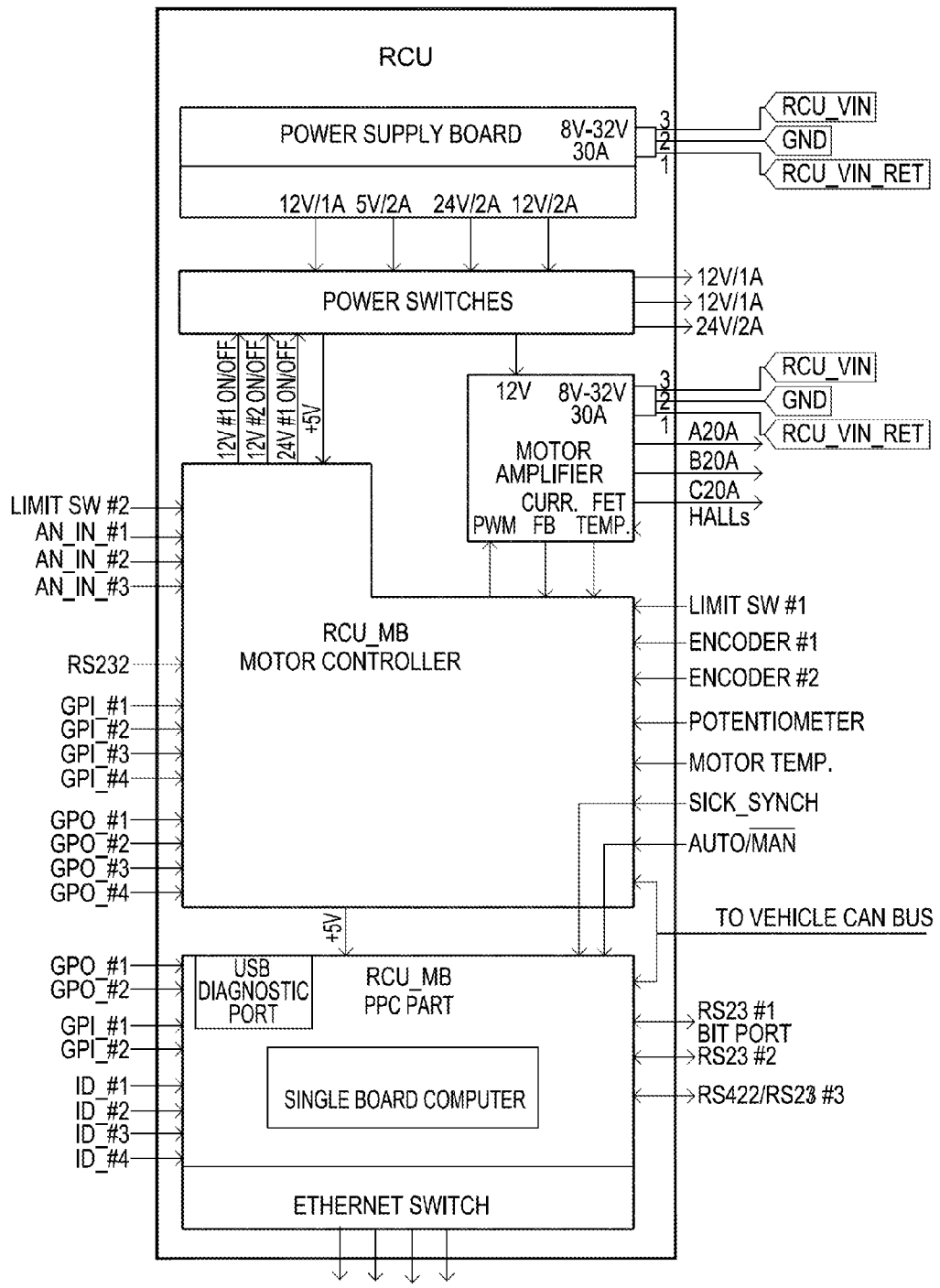
FIG. 18 is a layout of a robotic control unit layout according to one embodiment of the present invention.
Figure 19:
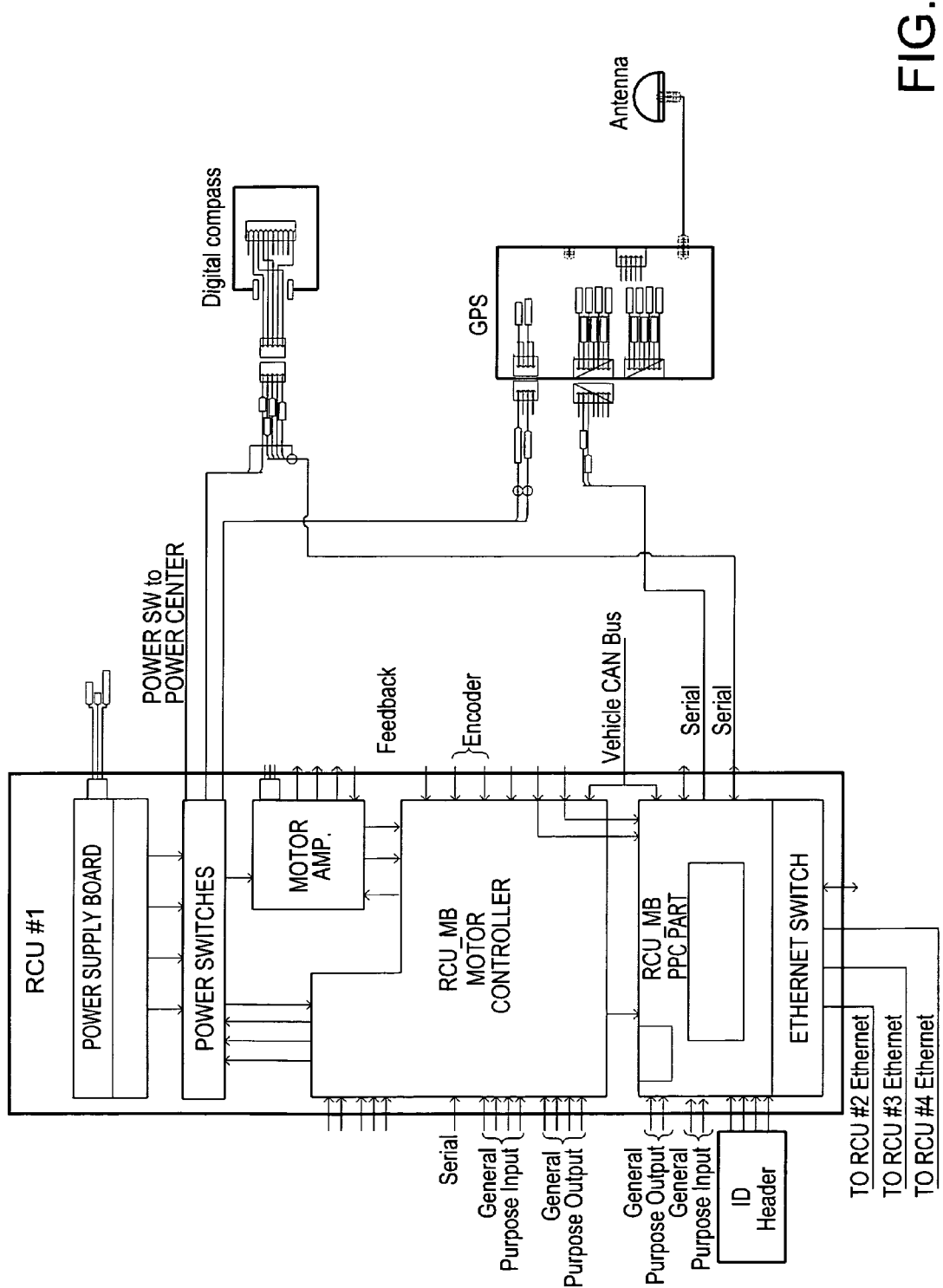
FIG. 19 is a schematic of a first robotic control unit according to one embodiment of the present invention.
Figure 20:
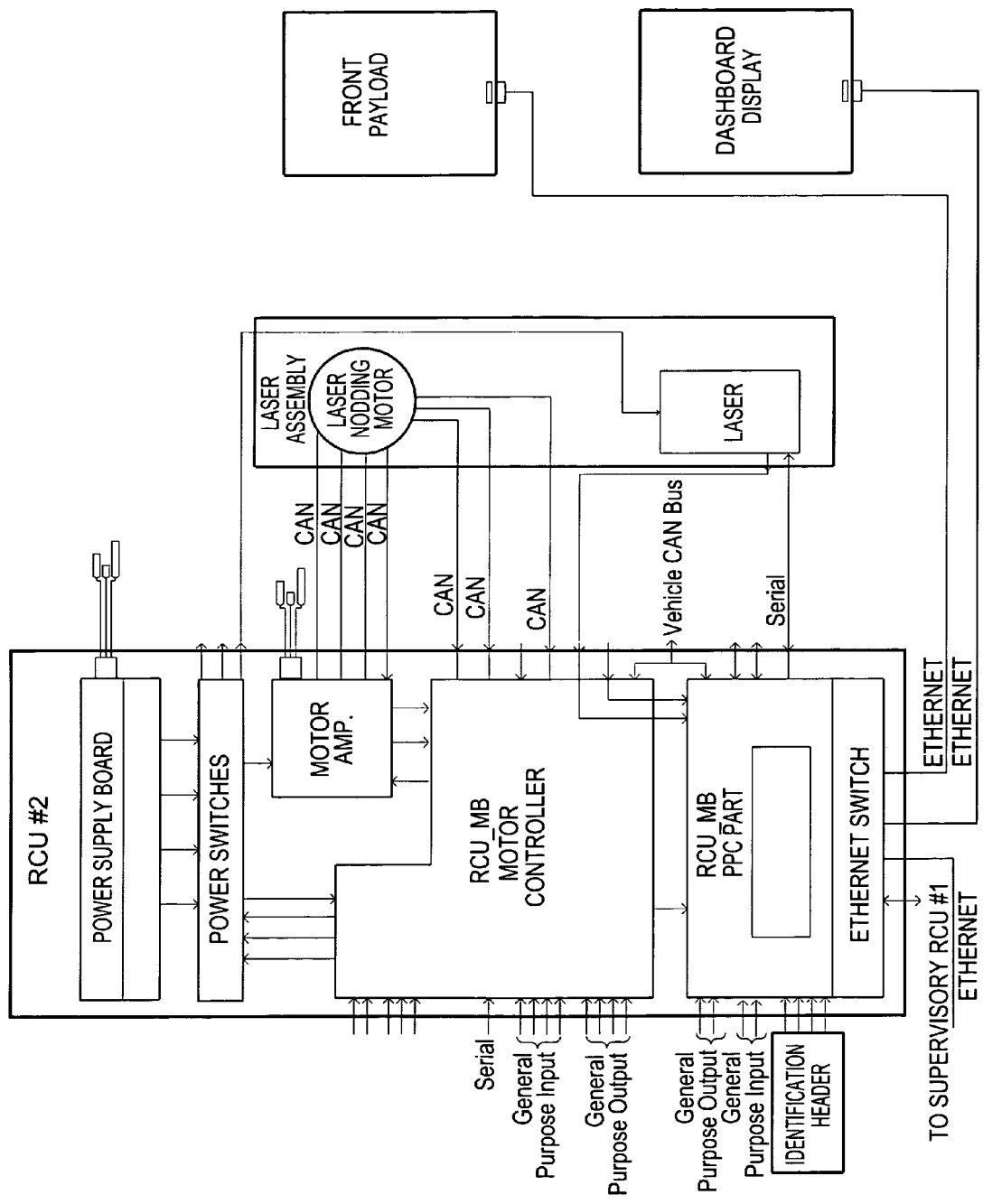
FIG. 20 is a schematic of a second robotic control unit according to one embodiment of the present invention.
Figure 21:
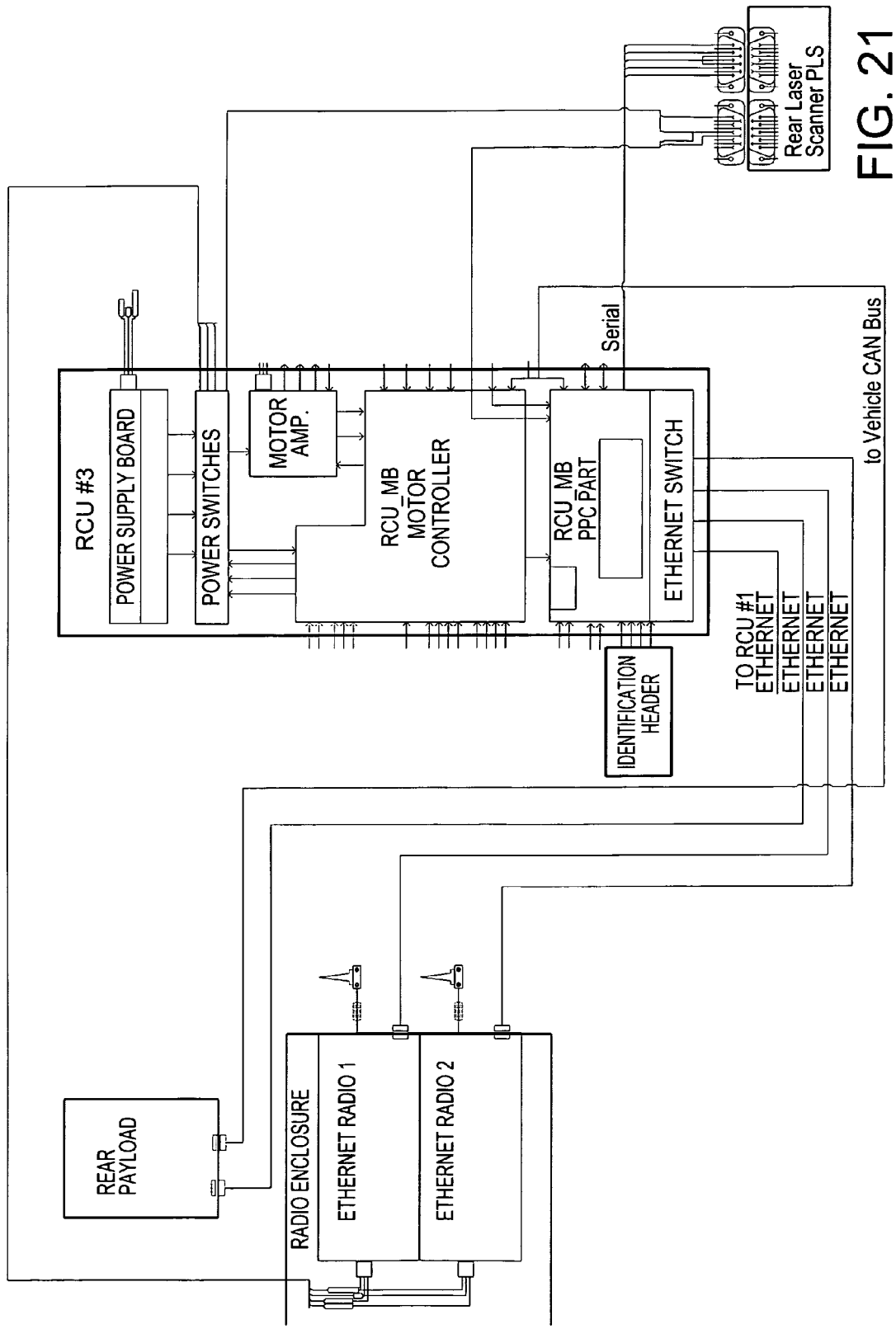
FIG. 21 is a schematic of a third robotic control unit according to one embodiment of the present invention.
Figure 22:
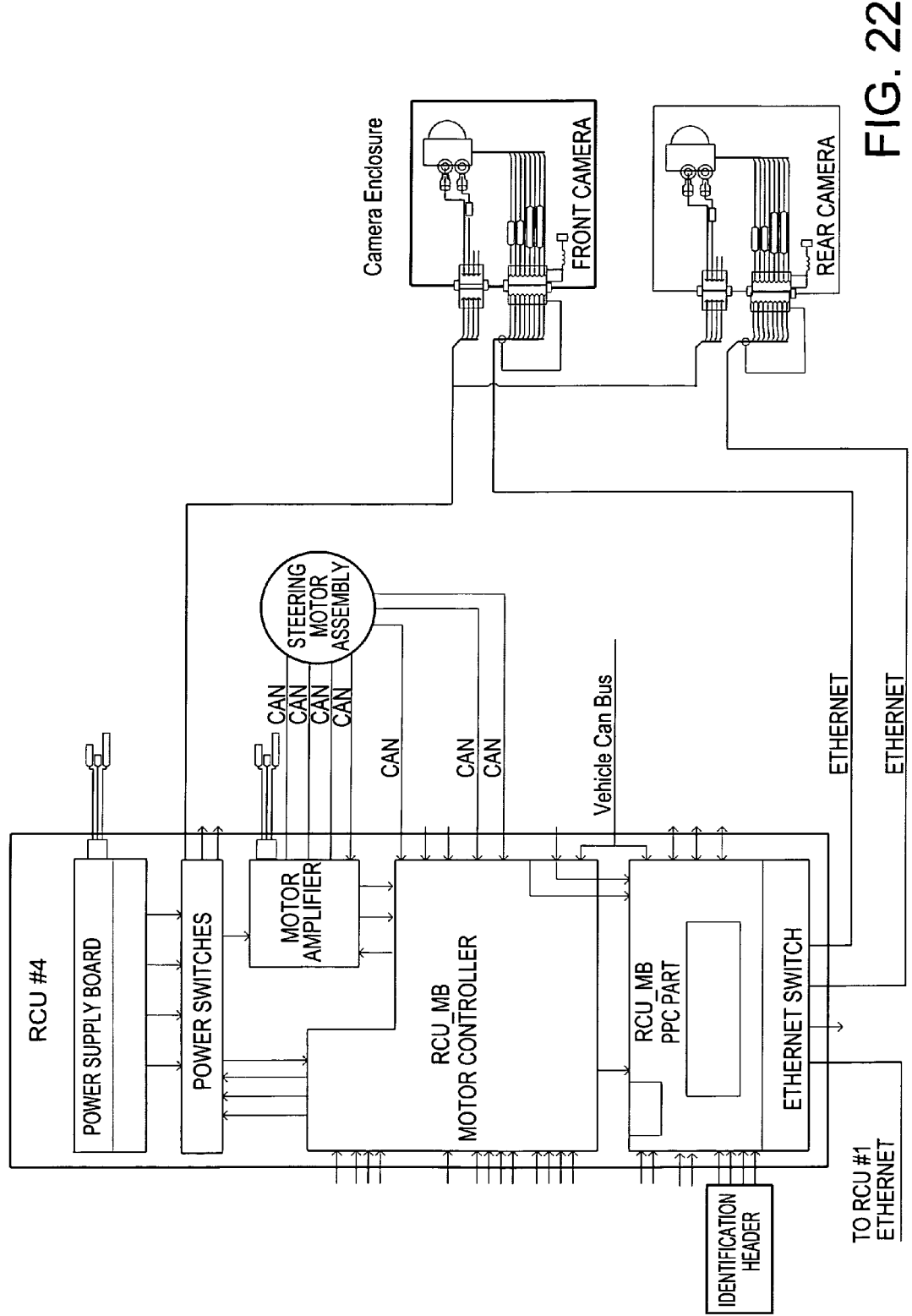
FIG. 22 is a schematic of a fourth robotic control unit according to one embodiment of the present invention.
Figure 23:
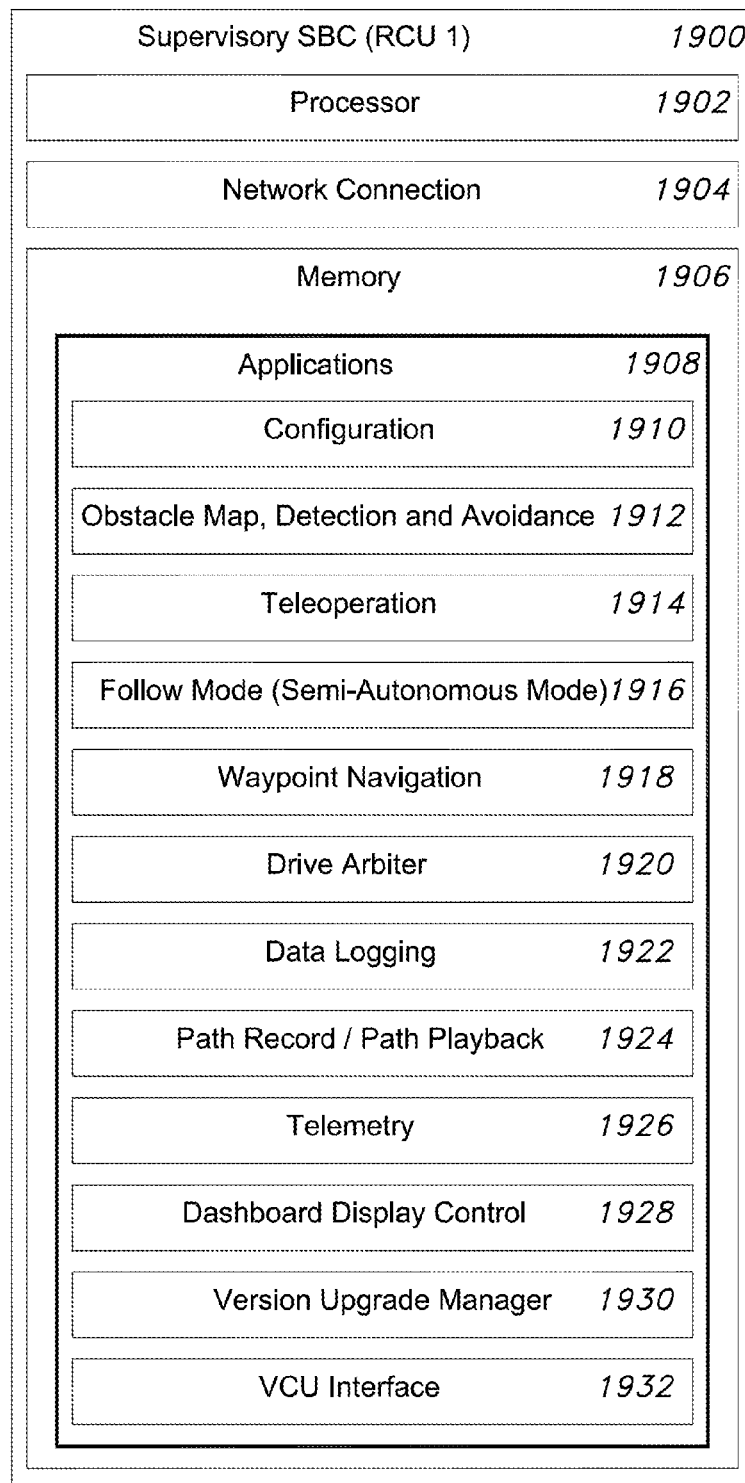
FIG. 23 illustrates a single board computer software architecture for a supervisory RCU according to one embodiment of the present invention.

In one embodiment of the present invention, the robotic control modules have a configuration check process that ensures that all robotic control modules on a vehicle are using the same version of software or executable code. FIG. 17 illustrates an illustrative software configuration check process 1300 according to one embodiment of the present invention. As an example, the process 1300 is described with reference to the illustrative control system of FIGS. 3A-B. Other suitable control system and robotic control modules are possible. At block 1302, the configuration check process begins. At block 1304 a non-supervisory robotic control module starts up. A robotic control module can start up by powering on. An example of a non-supervisory robotic control module can be robotic control module 262 shown in FIG. 3A. At block 1306 the robotic control module 262 sends an indication of the software version currently in memory in the robotic control module to the supervisory robotic control module, such as robotic control module 238. In one embodiment, the robotic control module 262 sends the software version in response to a poll request from the supervisory robotic control module 238.

In block 1308, the supervisory robotic control module 238 determines if the software version being used on robotic control module 262 is different than the one it is using. If the software versions are the same, then the process ends at block 1310. If the software versions are different, then the process proceeds to Block 1312. The software version on the non-supervisory robotic control module may be greater than or may be less than the robotic control module on the supervisory control module. In response to different versions, at block 1313, the supervisory robotic control module 238 sends a copy of the correct software version to robotic control module 262 through the packet network, such as Ethernet.

The robotic control module 262 receives the copy of the new software version via a packet network connection and writes the copy of the current software version into a second block of memory at block 1314.

Then in block 1316, the robotic control module 262 reboots. This can be a manual or an automatic reboot. During reboot, the robotic control module 262 determines if any software resides in the second block of memory at block 1318. If no software exists in this second block of memory then the robotic control module 262 boots up using the software in the first block of memory at block 1320. The process then ends at block 1310.

If the robotic control module 262 determines that new software resides in the second block of memory, then it proceeds to boot up using the software in the second block of memory at block 1322. The robotic control module 262 then erases the software in the first block of memory at block 1324. The software in the first block of memory is the previous version of software. At block 1326, robotic control module 262 copies the software from the second block into the first block of memory and then erases the software from the second block of memory. Then at block 1310 the process ends.

This process provides assurance that all of the robotic control modules are using the same version of software keyed to the supervisory robotic control module's software. Thus even if the supervisory robotic control module is using a prior version of software to the non-supervisory robotic control module's, the supervisory robotic control module's software will control and will replace the software in the non-supervisory robotic control module's. This process also provides an efficient way of replacing the software in the robotic control system. For example, a new version of software need only be uploaded to the supervisory robotic control module and the supervisory robotic control module will upload the new version to the non-supervisory robotic control modules.

Having described the versatile robotic control modules, hereinafter the same modules are described in use together with an appropriate control system and on an appropriate vehicle. As discussed herein, the illustrative control system demonstrates that the RCUs as a system can further be integrated with existing vehicle control units (e.g., as discussed below, integrated with a vehicle control unit or VCU), and or existing operation system controls (e.g., as discussed below, integrated with a throttle controller rather than controlling the throttle more directly).

Illustrative Control System

FIG. 1 is a high level block diagram on a vehicle control system 100 of one embodiment of the present invention. The vehicle control system 100 shown in FIG. 1 includes a robotic control system 104, which in the embodiment shown includes the versatile robotic control modules, 106A-106N. The robotic control modules may be connected and may communicate with each other and other control system and vehicle components via a Controller Area Network (CAN) bus 108 and a packet switched network 110, such as an Ethernet network. In some embodiments, only a packet switched network 110 may be used.

The vehicle control system shown in FIG. 1 also includes several operational systems, 102A-102N. Each operational system, 102A-102N may in some embodiments be in communication directly or indirectly with a robotic control module (RCU) 106A-106N. These operational systems 102A-102N can be used to control the movement of the vehicle and can include, for example, the steering system, the braking system, the throttle system, and the steering system. Each operational system may contain an actuator, such as a motor, for example, that can control the operation of the particular operational system. For example, the braking system can contain an actuator that controls the application of the brake for the vehicle.

The robotic control modules 106A-106N can further be connected or otherwise receive inputs from and provide signals to scanners 112A-B, such as laser scanners, cameras 114A-B, radios 116A-B, and a Global Positioning System (GPS) 118. The robotic control modules 106A-N may also be connected to other suitable payloads 120 and may be connected to one or more CAN devices 122. A CAN device can, for example, control headlights and other similar features of the vehicle. The robotic control modules 106A-N can receive inputs from these various devices, such as for example scanners 112A-B, cameras 114A-B, and the GPS 118 and determine the appropriate control behavior for the vehicle. The versatile robotic control modules 106A-N can communicate control information or signals to the operating systems to carry out the appropriate control behavior. For example, if the appropriate control behavior is to stop the vehicle, the robotic control module 106A can send control information to operate a braking actuator of the brake operating system 102A and cause the application of the vehicle brakes.

The vehicle may also comprise a vehicle control unit (VCU). The vehicle control unit receives inputs and utilizes the input to determine how to control one or more of the operational systems 102A-N. For example, the vehicle control unit may receive an input from a robotic control module that indicates that the vehicle should be turned to the right. In response to this signal the vehicle control unit may output a control signal to the steering system to cause the actuator to turn the steering shaft.

Both the vehicle control unit (VCU) 214 and robotic control modules (e.g. RCUs 238, 254, 244, and 262) may each comprise a processor. The processor comprises a computer-readable medium, such as a random access memory (RAM) coupled to the processor. The processor executes computer-executable program instructions stored in memory, such as vehicular or robotic control algorithms. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor with computer-readable instructions (such as executable code). Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other suitable medium from which a computer processor can read instructions. Also, various other forms of computer-readable media may transmit or carry instructions to a computer, including a router, private or public network, or other transmission device or channel, both wired and wireless. The instructions may comprise executable code from any suitable computer-programming language, including, for example, C, C++, C#, Visual Basic, Java, Python, Perl, and JavaScript.

It should be noted that the VCU 122 can be replaced with an additional RCU (e.g., RCU #5), or a combination of some RCUs can be replaced with one or more additional VCU's, although a VCU does not have all of the functionality of the RCUs as described herein.

Figure 3A:
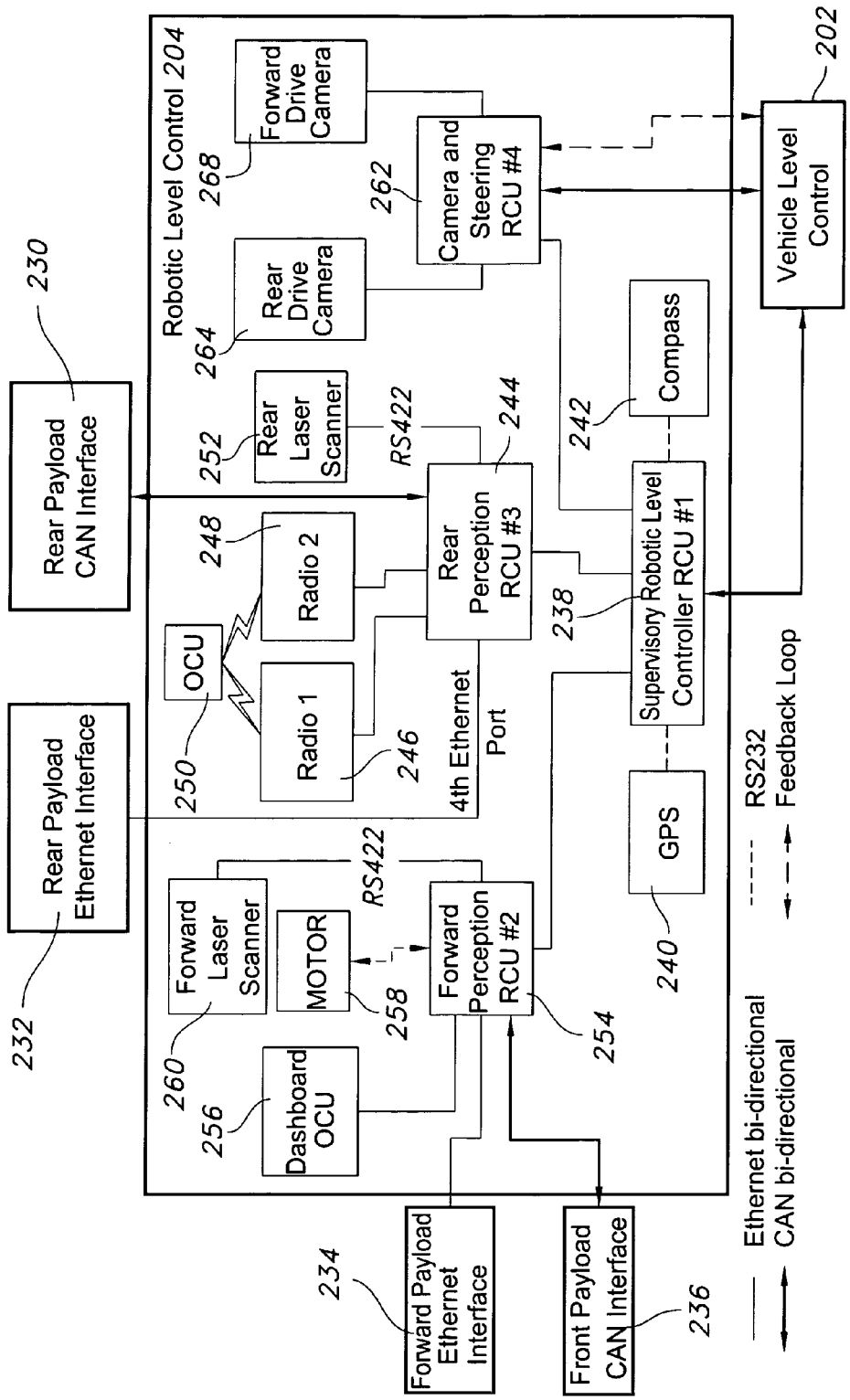
FIGS. 3A-B are block diagrams illustrating a vehicle control system according to another embodiment of the present invention.
Figure 3B:
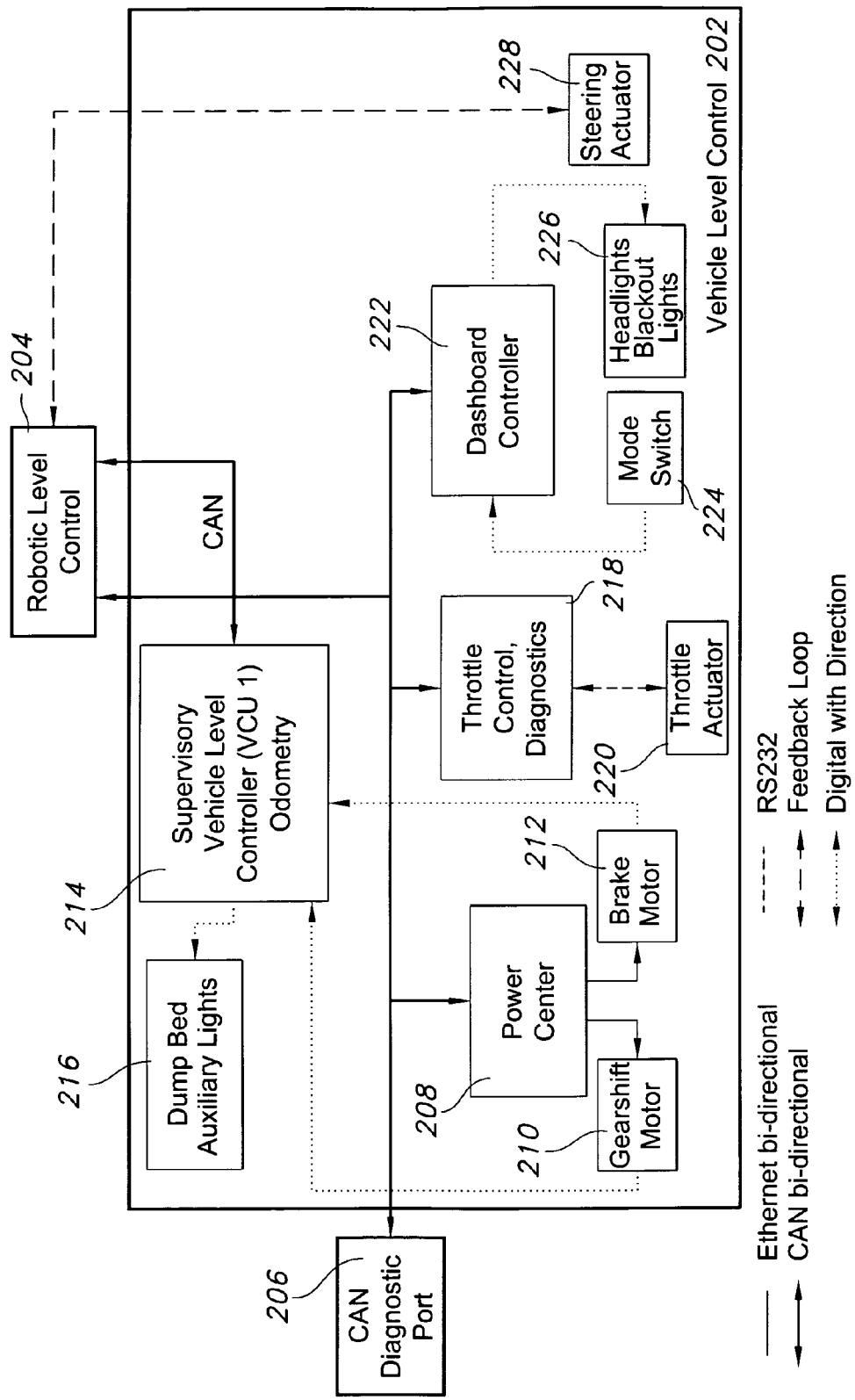

FIGS. 3A-B is a functional schematic diagram of an illustrative vehicle control system in one embodiment of the present invention. The vehicle control system shown comprises four of the versatile robotic control modules or Robotic Control Units (RCU) and various sensors. The vehicle control system receives various inputs from scanners, creates an obstacle map, determines control of the vehicle, and sends control information to the Vehicle Control Unit (VCU), which controls various operational systems of vehicle. The embodiment shown in FIGS. 3A-B comprises a vehicle control system, such as vehicle level control section 202, that can communicate with a robotic control system, such as robotic level control section 204. The two sections 202, 204 operate as a hierarchy. The vehicle level control section 202 maintains the personality of the vehicle for which it is configured.

The vehicle level control 202 comprises one external interface, a CAN diagnostic port 206. The vehicle level control 202 also comprises a electronic power center 208. The electronic power center provides power to a gearshift motor 210 and a brake motor 212. The gearshift motor 210 and brake motor 212 are the actuators for the transmission and brake systems, respectively.

The vehicle level control section 202 also comprises a supervisory level controller (VCU 1) 214. This role could be performed by an additional RCU. The supervisory level controller 214 is in communication with various systems of the vehicle. For instance, the supervisory level controller 214 is in communication with the dump bed, auxiliary lights, and enunciator 216. The supervisory level controller 214 is also in communication with the gearshift motor 210 and the brake motor 212.

The vehicle level control section 202 also comprises an APECS™ controller 218 for throttle control and diagnostics. This role could be performed by an additional RCU. The APECS™ controller 218 is in communication with the throttle actuator 220. The APECS™ controller 218 provides actuator signals to and receives feedback from the throttle actuator 220.

The vehicle level control section 202 also comprises a dashboard controller 222. The dashboard controller 222 provides control for a mode switch 224 and for headlights and blackout lights 226. The vehicle level control section 202 also comprises the steering actuator 228.

The robotic level control section 204 also comprises external interfaces. The external interfaces of the robotic control section 204 shown in FIG. 3A comprise a rear payload CAN interface 230 and a rear payload Ethernet interface 232. The external interfaces also comprise a front payload CAN interface 234 and Ethernet interface 236. In some embodiments of the present invention, the RCU may include Ethernet switches. In other embodiments of the present invention, one or more of the RCUs may be associated with an Ethernet switch outside of the RCU.

The robotic level control section 204 according to the embodiment shown in FIG. 3A includes four robotic control modules: a supervisory robotic control module 238, a rear perception robotic control module 244, a forward perception robotic control module 254, and a camera and steering robotic control module 262. The robotic control modules, 238, 244, 254, and 262 can be configured identically or can be configured for the specific function. If the robotic control modules are configured identically, then the robotic control modules can determine based on the location in the system or connection what function or role they will perform. For example, a resistor can be placed in a connection with a robotic control module and based on the resistance the robotic control module determines its respective function. Other ways of identifying the function or role of a robotic control module can be used.

Various elements of the vehicle level control section 202 are in communication with elements of the robotic level control section 204. For instance, the supervisory robotic level control module (RCU #1) 238 is in communication with the electronic power center 208, APECS™ controller 218, and dashboard controller 222. The supervisory robotic level control module 238 receives input from various sensors and provides commands for operation of a vehicle in an autonomous mode. U.S. patent application Ser. Nos. 10/972,082; 10/971,718; and 10/971,724, describe exemplary autonomous modes and control thereof.

In the embodiment shown in FIG. 3A, the supervisory robotic level control module 238 receives input from a GPS navigation/communication 240, such as a NAVCOM module or unit manufactured by NAVCOM Technology of Torrance, Calif., and from a compass 242. These sensors provide position and heading information to the controller 238 for navigation purposes. Embodiments of the present invention may comprise other sensors as well. For instance, one embodiment comprises an inertial measurement unit (IMU), which measures acceleration of the vehicle in each direction. The supervisory robotic level control module 238 is also in communication with the rear perception control module (RCU #3) 244. The rear perception control module 244 may receive sensor input from for example, a laser scanner 252, such as a SICK laser scanner, via an RS422 connection.

The rear perception control module 244 also is in communication with a pair of radio receivers, a Nova Roam™ EH 900, Radio 1 246 and an 802.11b-compatible radio, Radio 2 248. The radios allow the rear perception control module 244 to receive commands from an operator control unit (OCU) 250. The OCU may be used, for example, for tele-operation of the vehicle in an autonomous mode.

The supervisory robotic level control module 238 in the embodiment shown in FIG. 3A is also in communication with the forward perception control module 254. The forward perception control module 254 is in communication with the dashboard operator control unit (OCU) 256. In the embodiment shown, the dashboard OCU 256 comprises a TDS Recon IPAQ™, a type of personal digital assistant. The forward perception control module 254 is also in communication with a forward laser scanner 260. In one embodiment, the forward laser scanner 260 is a nodding-type laser scanner and includes a laser scanner motor 258 that controls the movement of the scanner 260. The forward perception control module 254 sends control signals to control the laser scanner motor 258.

The supervisory robotic level control module 238 is also in communication with a camera and steering controller (RCU #4) 262. The camera and steering controller 262 is in communication with a rear drive camera 264 and a forward drive camera 268. The camera and steering controller 262 is also in two-way communication with the steering actuator 228 and supervisory vehicle level controller 214 of the vehicle control section 202.

The layout of the various controllers and sensors shown in FIGS. 3A-B may be implemented in a variety of ways in embodiments of the present invention. For instance, the various controllers may be combined or split in various ways depending on the number and types of sensors used and depending on the configuration of the vehicle. Also, the various sensors and instruments may be utilized in various ways. For instance, embodiments of the present invention may utilize sensor fusion to operate efficiently and effectively. Sensor fusion allows the vehicle to operate even when certain sensors are inoperative.

Figure 3C:
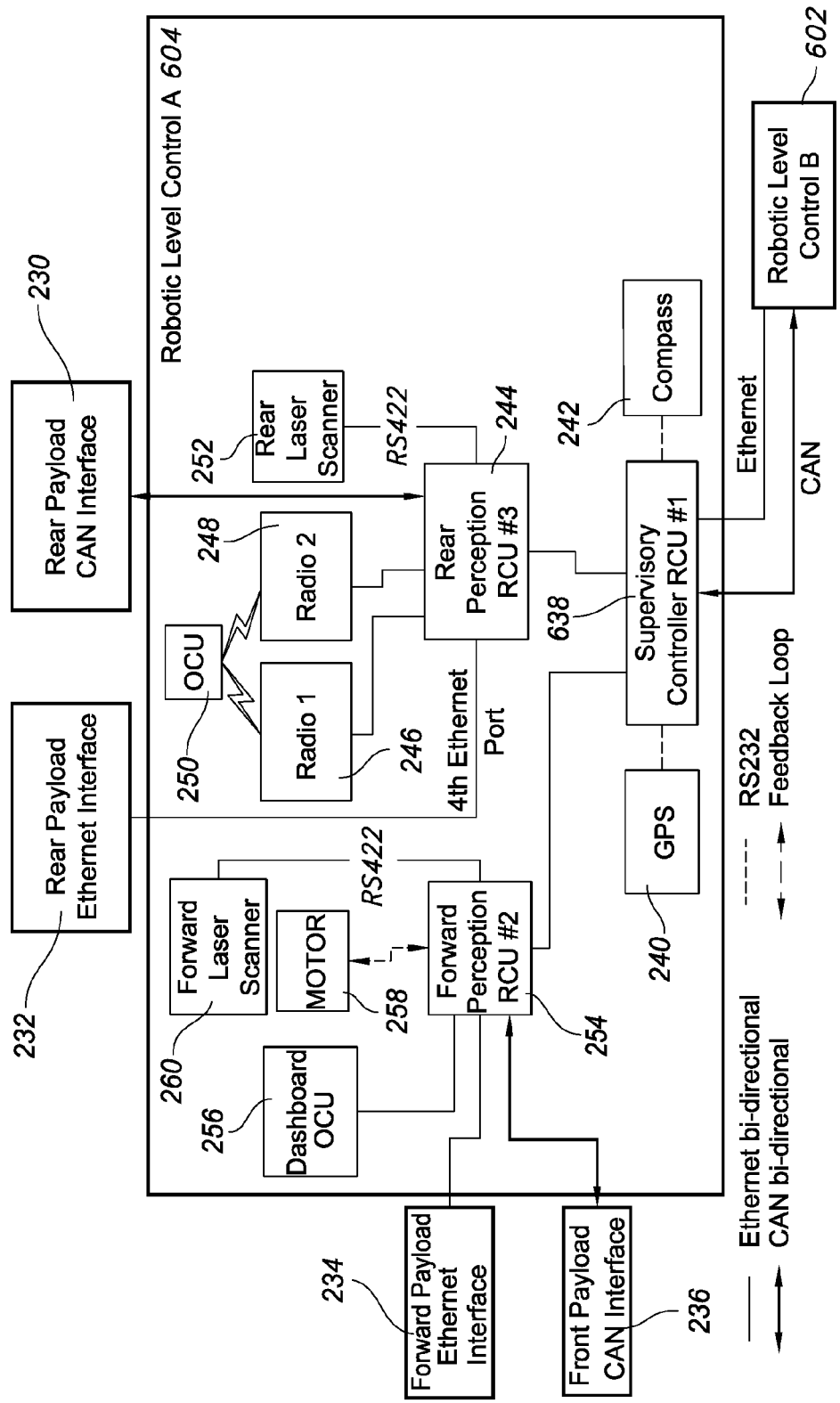
FIGS. 3C-D are block diagrams illustrating another vehicle control system according to one embodiment of the present invention.
Figure 3D:
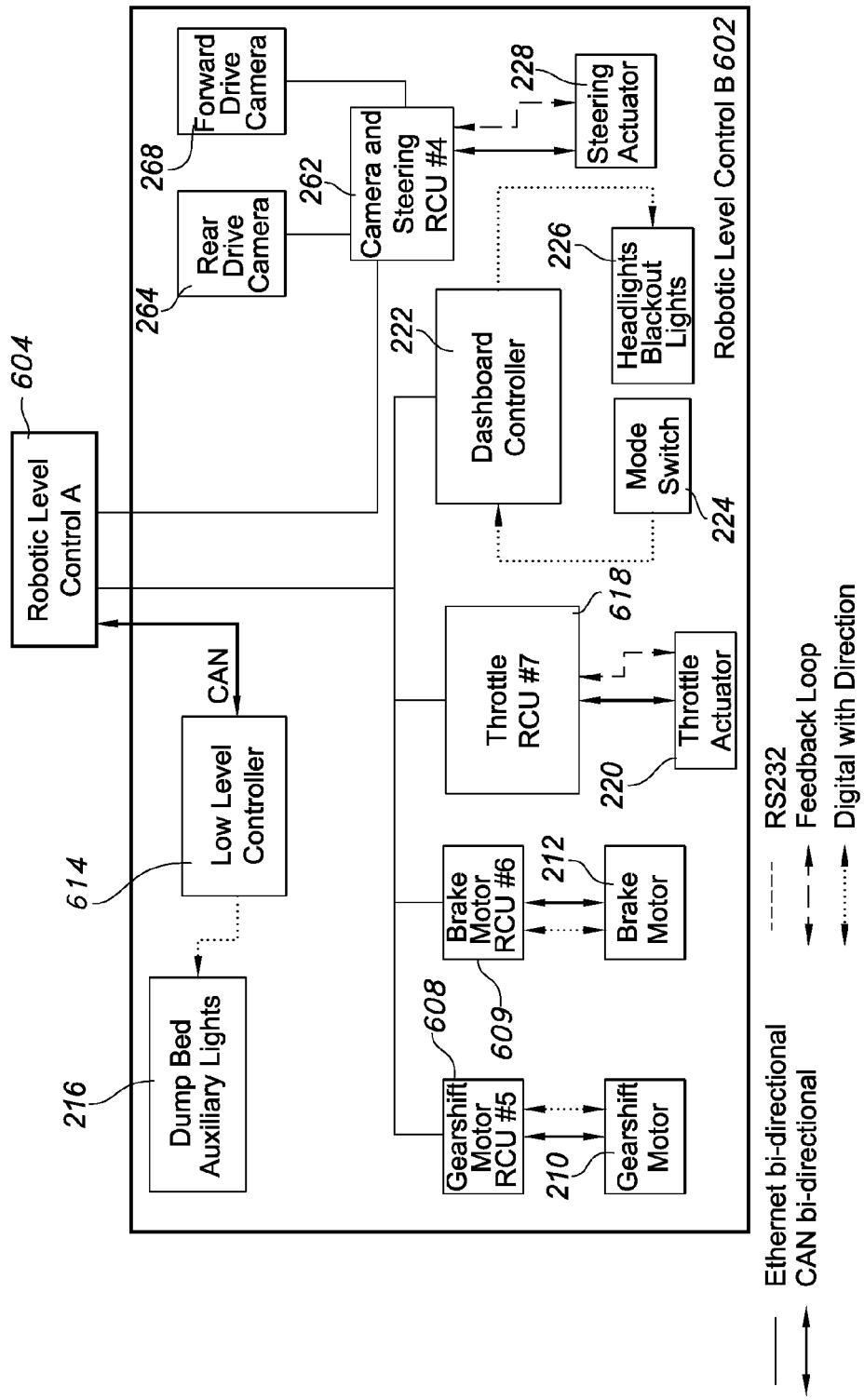

FIGS. 3C-D illustrate alternative layouts of the various controllers and sensors in which robotic control modules perform functions associated with vehicle control units. For example, FIG. 3C shows a robotic level control A 604 having the same layout as FIG. 3A, except the robotic level control A 604 is in communication with a second robotic level control, such as robotic level control B 602 and illustrated in FIG. 3D. Robotic level control B 602 includes a low level controller 614 that can receive commands from a supervisory RCU, such as supervisory RCU #1 638, and control the vehicle dump bed and auxiliary lights 616.

The robotic level control B 602 may also include a gearshift motor RCU #5 608 that can control a gearshift motor 610 and communicate with the supervisory RCU #1 638. The gearshift motor 610 may be an actuator for the vehicle transmission. A brake motor RCU #6 609 may be included that can control a brake motor 612 that is an actuator for the vehicle brakes. A throttle RCU #7 618 may be included to control the throttle actuator 620. In other embodiments of the present invention, the robotic control system may include more or less RCUs that are adapted to control one, or sometimes more than one, component. For example, one RCU may be included to control both the gearshift motor 610 and brake motor 612.

Figure 3E:
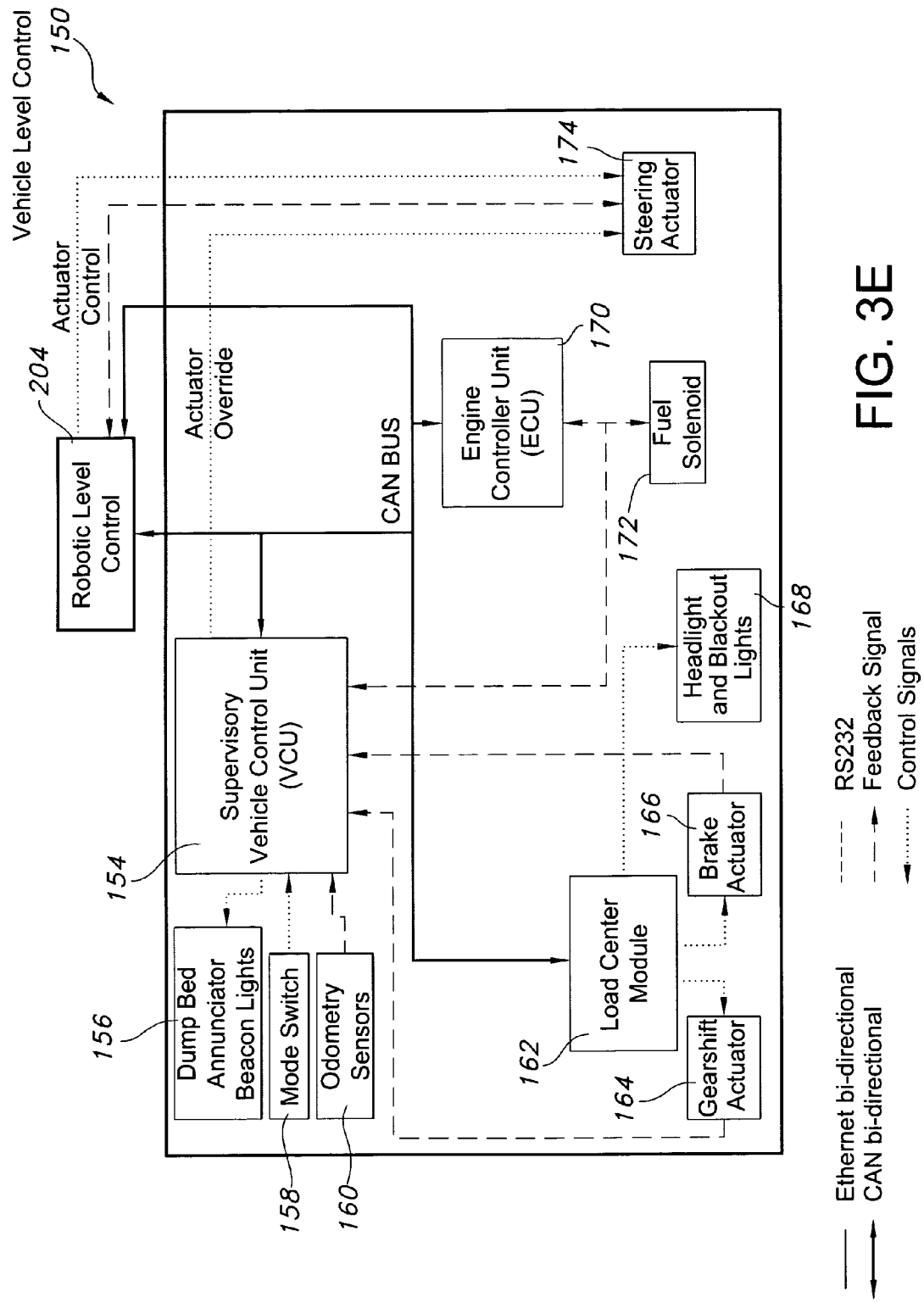
FIG. 3E is a block diagram illustrating a vehicle level control according to one embodiment of the present invention.

FIG. 3E shows another embodiment of a vehicle level control 150 in communication with the robotic level control 204 of FIG. 3A. In this embodiment, there is a supervisory vehicle control unit (VCU) 154 that corresponds to the supervisory vehicle level controller (VCU 1) in FIG. 3B. The supervisory VCU 154 may send control signals, also called "digital with direction" in other embodiments, to the dump bed, annunciator, and beacon lights 156 and steering actuator 174. The supervisory VCU 154 may receive control signals from the mode switch 158. The supervisory VCU 154 also receives feedback signals, also called "feedback loop" in other embodiments, from each of the odometry sensors 160, the gear shift actuator 164, the brake actuator 166, and the fuel solenoid 172. In the embodiment of FIG. 3E, there is a separate odometry sensor 160. Also, in other embodiments the gear shift actuator 164, brake actuator 166, and fuel solenoid 172 are referred to interchangeably as the gearshift motor, the brake motor, and the throttle actuator, respectfully. The vehicle level control 150 also has a load center module 162, called a "power center" in other embodiments. The load center module 162 is in CAN communication with the robotic level control 204, and further sends control signals to each of the gear shift actuator 164, the brake actuator 166, and the headlights/blackout lights 168. Finally, the vehicle level control 150 may have an engine controller unit, or ECU 170, called a "throttle control" in other embodiments. The ECU 170 is in CAN communication with the robotic level control 204, and controls the fuel solenoid 172 to deliver fuel to the engine.

Further variations of the layout embodiments of RCUs and VCUs within a vehicle, such as in FIGS. 3A-3E, are contemplated by the inventors via different combinations of the elements by their interfaces—e.g., an element controlled by CAN and having feedback can be connected to either of an available RCU or VCU at either robotic or vehicle control level. Connections shown in the drawings as single Ethernet cables may be split into two or more cables to connect the network as generally described herein.

FIG. 2 shows another embodiment of a vehicle 161 having a robotic control system. In this embodiment, there are four RCUs 151, 153, 155, and 157 and no vehicle control units as in FIGS. 3A-B. RCU 157 controls the steering system 152 (and a steering wheel 171), RCU 155 controls the braking system 163 (and a brake pedal 173 and parking brake level 175), and RCU 153 controls the throttle system 165 (and an accelerator pedal 177) and the transmission system 167 (and gearshift lever FNR 179). The remaining RCU 151 may be a supervisory robotic control unit that connects and operates the other RCUs 153, 155, and 157. A power supply 169 delivers power to each RCU 151, 153, 155, and 157, which in turn delivers power to the corresponding system.

In one embodiment, the vehicle is equipped with an Obstacle Detection/Obstacle Avoidance (ODOA) system which is designed to detect obstacles external to the vehicle, and to initiate the proper control actions to avoid them. The vehicle ODOA system comprises both hardware and software components, and is designed to be fail-safe without limiting the ability for external operators to fully control the vehicle under conditions of operational military necessity. In one such embodiment, the vehicle comprises the following components: (i) a forward nodding laser scanner assembly; (ii) range guard software; (iii) an obstacle map; and (iv) control software.

The forward nodding laser scanner assembly gathers true 3-D data about obstacles in front of the vehicle and passes that data to onboard computers for processing. The forward laser scanner unit nods at a 2 Hz rate, reaching a minimum look angle of 15 degrees below the horizontal (looking at the ground), and reaching a maximum look angle of 25 degrees above the horizontal (looking at the sky). The laser scanner unit produces 181 range readings per scan (each scan completes in 26 milliseconds), out to a maximum range of 50 meters, from 90 degrees right (starboard side of the vehicle) to 90 degrees left (port side of the vehicle).

Rear fixed laser scanner assembly. The rear fixed laser scanner assembly gathers 2-D data about obstacles behind the vehicle and passes that data to onboard computers for processing. The rear laser scanner unit is mounted in a fixed horizontal position. The laser scanner unit produces 181 range readings per scan (each scan completes in 26 milliseconds), out to a maximum range of 50 meters, from 90 degrees right to 90 degrees left.

The range guard software detects interruptions of obstacle data from the laser scanners and publishes substitute data that indicate that obstacles are close in every direction that can be seen ("half moons"). This prevents the vehicle from moving in a direction, which has not been positively determined to be clear of obstacles by the onboard software.

The obstacle map indicates the relative positions of obstacles with regard to the vehicle, and the control software determines the correct trajectory through the obstacle field, and properly commands the control system (steering, throttle, brake, shift) to achieve that trajectory. It should be noted that obstacle avoidance and navigation are not the primary subject matter of this disclosure.

Illustrative Vehicle

Figure 5:
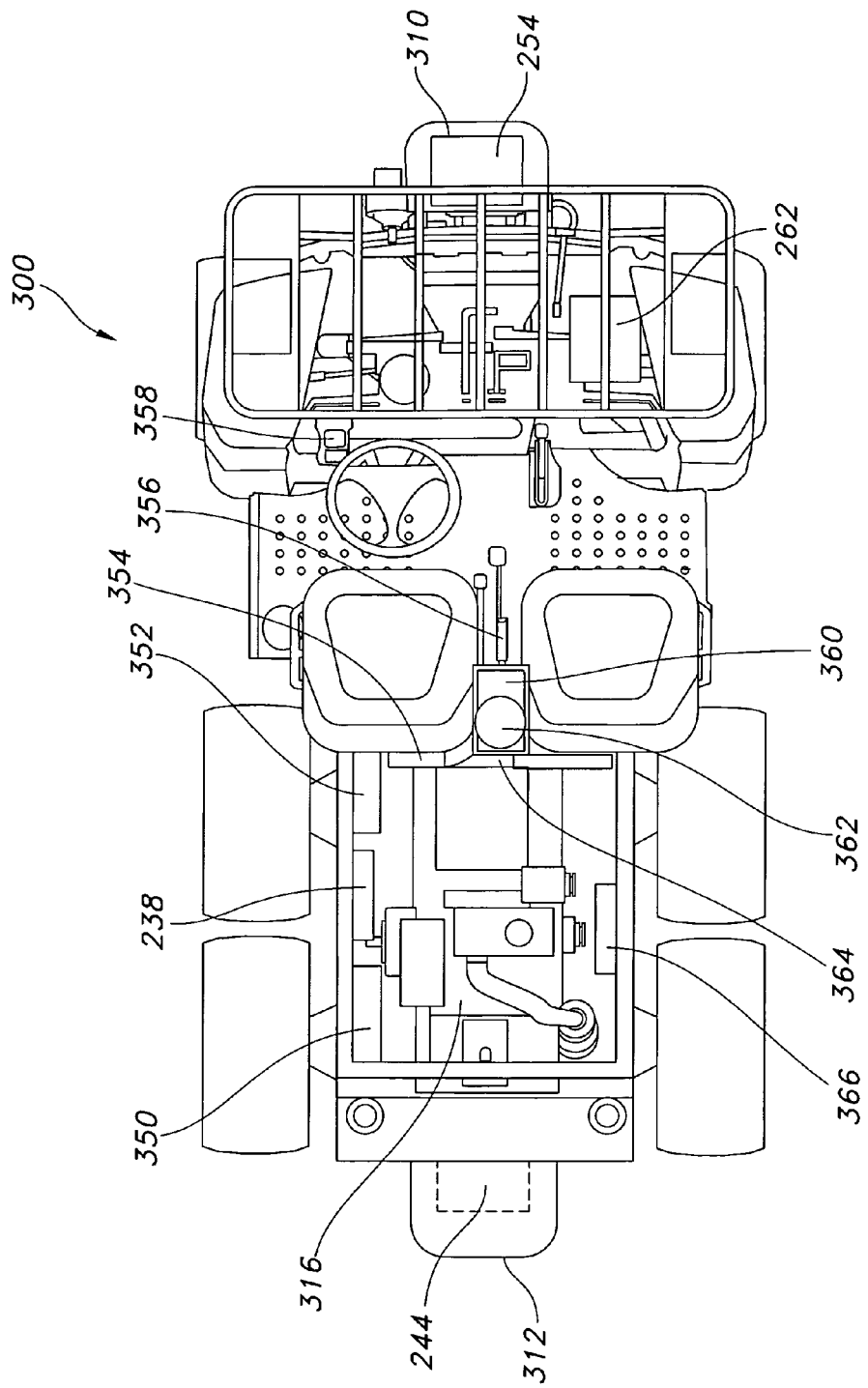
FIG. 5 is a top view of the illustrative vehicle of FIG. 4 including an engine and robotic control modules according to one embodiment of the present invention.

Embodiments of the present invention may be used in a variety of vehicles, such as automobiles, trucks, utility vehicles and any other suitable autonomous vehicle. FIGS. 4 and 5 are top view diagrams of an illustrative vehicle in one embodiment of the present invention. The vehicle 300 shown in FIGS. 4 and 5 is a six wheeled, diesel powered utility vehicle, such as the John Deere™ Gator™ (www.deere.com). Note that FIGS. 4 and 5 illustrate the vehicle 300 having an engine 316 where a dump bed at the rear of the vehicle 300 was removed.

The robotic control modules, systems, and methods as described, however, is generally applied by a simple mechanic of one RCU per actuator, using the available RCUs then for sensors, computation, and communications. Additional RCUs can be added just for additional sensors, computation, or communications, without driving an actuator. Indeed, the RCU can be used to control only sensors, computation, and/or communications. This applies to any vehicle of any size or configuration, including small electric vehicles with as little as one or two actuators (e.g., skid steered) or agricultural or construction vehicles with many more (e.g., an actuator for every control in a complex construction vehicle). The RCUs are networked and operate in the same manner as discussed herein.

The illustrative vehicle 300 includes a robotic control system having a number of robotic control modules each contained in a mountable housing. In the embodiment shown in FIGS. 4 and 5, the robotic control systems has the four robotic control modules, 238, 244, 254, 262, illustrated in FIG. 3A. Other embodiments of the same or different vehicles may have more or less robotic control modules. The robotic control modules can be mounted in idle or void spaces in the vehicle. In this manner valuable person or payload space is not taken up by the electronics of the robotic control system. For example, robotic control module 1 238 is positioned in the engine compartment 302 of the vehicle 300. A heat shield 304 may be used to shield the robotic control module 1 238 and other electronics 306, 308 from the heat of the engine. In one embodiment the heat shield 304 can have a seal on its top surface so that it can form a seal with the bottom surface of the dump bed (not shown).

The robotic control module 2 254 can be positioned on the front laser scanner assembly 310. The robotic control module 3 244 can be positioned on the rear laser scanner assembly 312. The robotic control module 4 262 can be positioned in the hood cavity 314 of the vehicle. The position of the robotic control modules in the idle spaces shown in FIGS. 4 and 5 are illustrative and a variety of other configurations are possible. Positioning and mounting the robotic control modules near the devices that they send control signals to and receive signals from can reduce noise interference with these signals. FIG. 5 also illustrates the layout of various other electronic components of the robotic control system of the vehicle 300 according to one embodiment of the present invention. Examples of such other components include a battery equalizer 350, GPS 352, VCU 354, cameras 358, compass 360, radios 362, power center 364, and controller 366.

Figure 6:
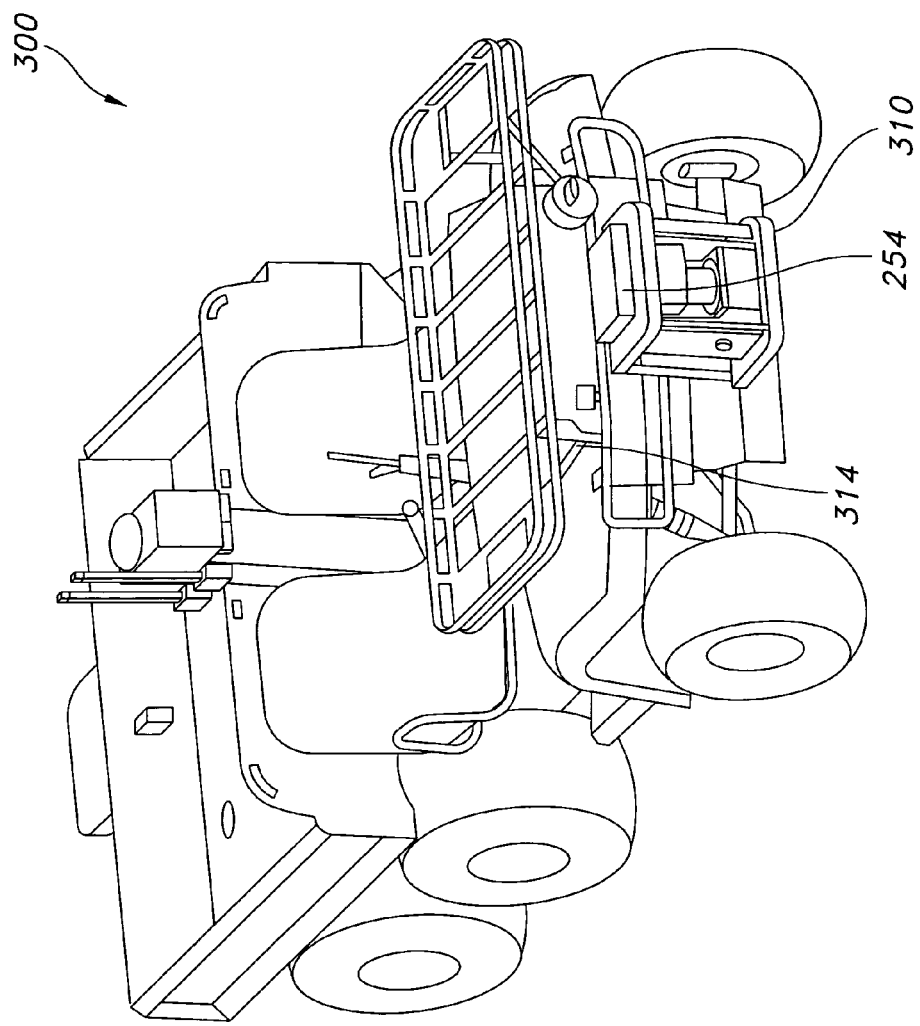
FIG. 6 is a perspective view of the vehicle of FIG. 4 including a bed according to one embodiment of the present invention.
Figure 7:
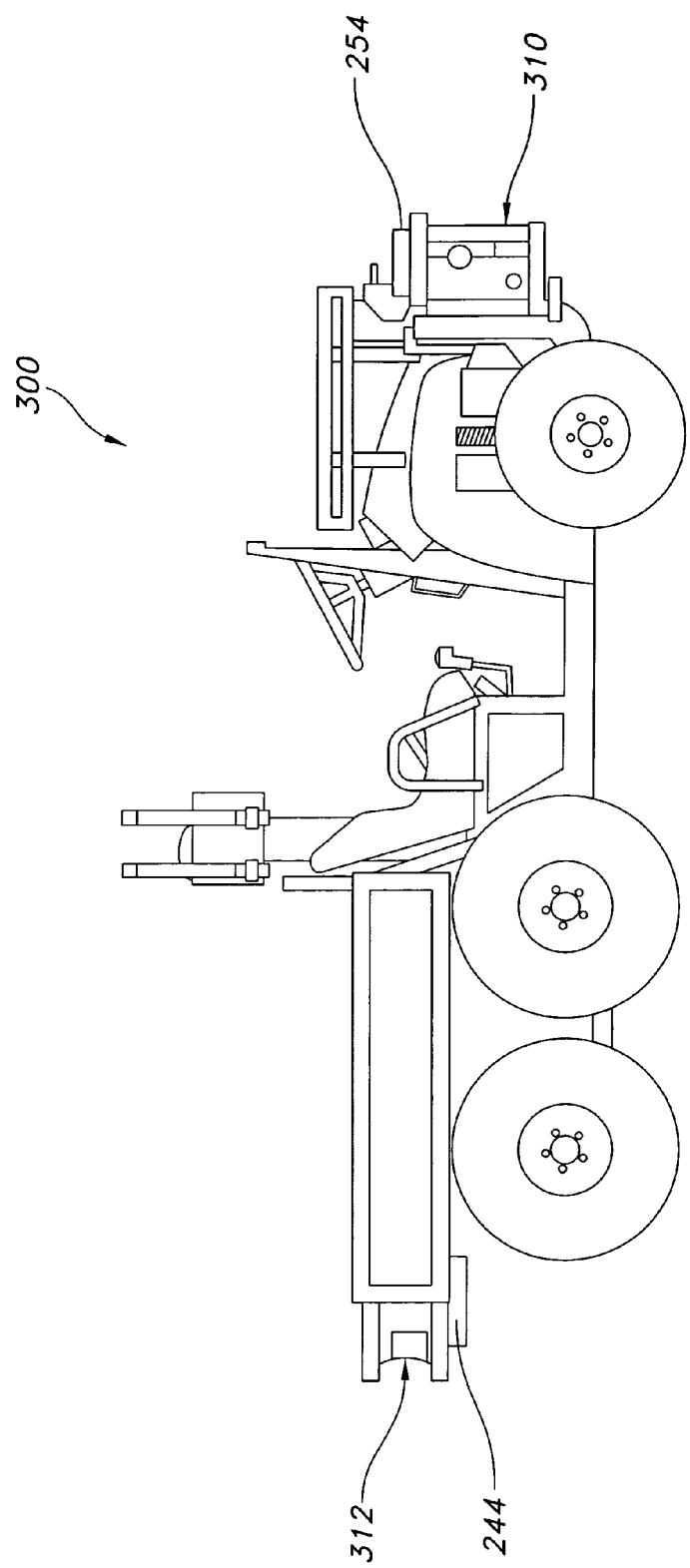
FIG. 7 is a side view of the illustrative vehicle of FIG. 4 including a bed according to one embodiment of the present invention.
Figure 8:
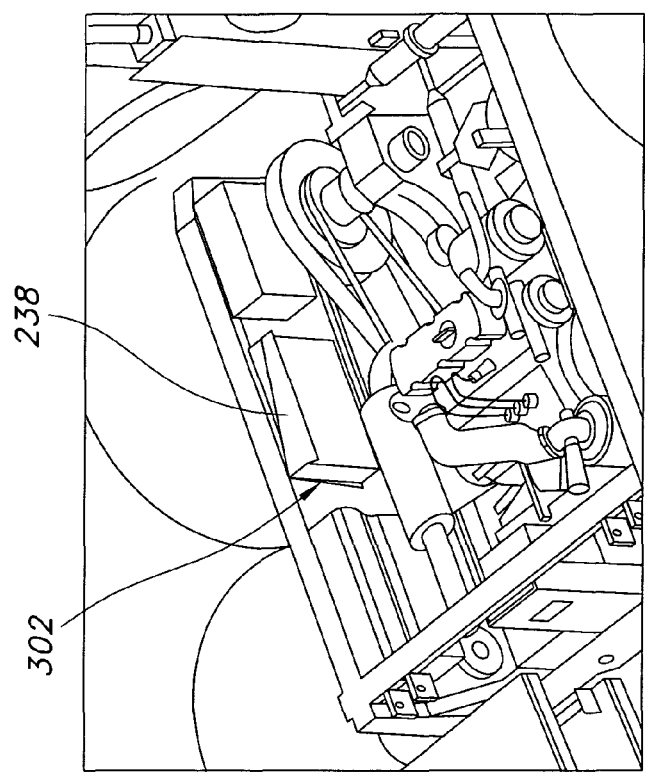
FIG. 8 is a close-up view of the engine and robotic control modules of the vehicle of FIG. 5 according to one embodiment of the present invention.

FIGS. 6-8 further illustrate the placement of the robotic control modules in the vehicle 300 according to one embodiment of the present invention.

GENERAL

The foregoing description of the embodiments, including preferred embodiments, of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the this invention.

What is claimed is:

1. A robotic control module comprising:
an enclosure having at least one surface, the enclosure being mountable on or in the vehicle;
a processing module disposed within the enclosure, the processing module having a processor and memory, wherein the processing module is configured for monitoring sensors on or in the vehicle; for determining a role of the robotic control module based on (i) a location of the robotic control module in the vehicle or (ii) a physical connection to the robotic control module; and for executing and arbitrating among mobile robotic control behaviors that are configured to control operation of the vehicle as a robotic vehicle based on the role of the robotic control module, the mobile robotic control behaviors comprising steering actuator control, braking actuator control, throttle actuator control, transmission actuator control, and sensor driver;
a reprogrammable actuator controller disposed within the enclosure and configured for being in communication with the processing module for issuing actuator control signals based at least in part on the mobile robotic control behaviors and for controlling signals other than the actuator control signals for actuator driving;
an actuator connector on the at least one surface of the enclosure, the actuator connector being in communication with the reprogrammable actuator controller and configured for transmitting actuator control signals that are configured to robotically control actuator operation in a vehicle steering system, a vehicle braking system, a vehicle throttle system, and a vehicle transmission system;
a packet network switch disposed within the enclosure; and
a network connector on the at least one surface of the enclosure, the network connector being configured for connecting to a packet network and communicating with the packet network switch, wherein the processing module is configured for transmitting instructions to the packet network.

2. The robotic control module of claim 1, wherein the packet network is configured for transmitting and receiving signals between the robotic control module and a second robotic control module and between the robotic control module and a peripheral.

3. The robotic control module of claim 1, further comprising:
a power supply disposed within the enclosure, wherein the power supply is configured for receiving unregulated power from a mobile robotic platform in the vehicle through a power input to the enclosure and converting the unregulated power into interior regulated power for (i) the processor module, (ii) the packet network switch and (iii) the reprogrammable actuator controller, and into exterior regulated power; and
a power supply connector on the at least one surface of the enclosure configured for connecting to the exterior regulated power.

4. The robotic control module of claim 1, further comprising an actuator amplifier disposed within the enclosure, the actuator amplifier being configured for amplifying the actuator control signal from the reprogrammable actuator controller.

5. The robotic control module of claim 1, wherein the processor module further comprises at least one protocol transceiver that is configured for executing transceiver monitoring code.

6. The robotic control module of claim 1, wherein the processing module is configured to execute only the transmission actuator control of the mobile robotic control behaviors.

7. The robotic control module of claim 1, wherein the processing module is configured to execute only the throttle actuator control of the mobile robotic control behaviors.

8. The robotic control module of claim 1, wherein the processing module is configured to execute only the braking actuator control of the mobile robotic control behaviors.

9. The robotic control module of claim 1, wherein the processing module is configured to execute only the steering actuator control of the mobile robotic control behaviors.

10. The robotic control module of claim 1, wherein the processing module is configured to execute only the sensor driver of the mobile robotic control behaviors.

11. The robotic control module of claim 1, wherein the mobile robotic control behaviors further comprise obstacle map and detection, teleoperation mode, follow mode, waypoint navigation mode, drive arbiter, path recording, path playback, and obstacle avoidance.

12. The robotic control module of claim 1, wherein the enclosure is a single housing that is a flat rectangular prism having six face panels comprising a front face and a rear face.

13. The robotic control module of claim 1, wherein the mobile robotic control behaviors further comprise a nodding motion controller, a three-dimensional map generator, and drive camera controller.

14. The robotic control module of claim 1, wherein the actuator control signals are configured to robotically control actuator operation in a vehicle sensor system.

15. The robotic control module of claim 1, wherein:
the steering actuator control is executable for generating the actuator control signals for robotically controlling steering positions for the vehicle based on monitored data by causing a steering actuator of the vehicle steering system to turn a steering shaft;
the braking actuator control is executable for generating the actuator control signals for robotically controlling a braking actuator of the vehicle braking system by causing application of vehicle brakes;
the throttle actuator control is executable for generating the actuator control signals for robotically controlling delivery of fuel to a vehicle engine by controlling actuation of a fuel solenoid of the vehicle throttle system; and
the transmission actuator control is executable for generating the actuator control signals for robotically controlling a gearshift motor of the vehicle transmission system.

16. The robotic control module of claim 1, wherein the steering actuator control is executable for generating the actuator control signals for robotically controlling steering positions for the vehicle based on monitored data by causing a steering actuator of the vehicle steering system to turn a steering shaft.

17. The robotic control module of claim 1, wherein the braking actuator control is executable for generating the actuator control signals for robotically controlling a braking actuator of the vehicle braking system by causing application of vehicle brakes.

18. The robotic control module of claim 1, wherein the throttle actuator control is executable for generating the actuator control signals for robotically controlling delivery of fuel to a vehicle engine by controlling actuation of a fuel solenoid of the vehicle throttle system.

19. The robotic control module of claim 1, wherein the transmission actuator control is executable for generating the actuator control signals for robotically controlling a gearshift motor of the vehicle transmission system.

20. A robotic control modular enclosure for use in a robotic vehicle, comprising:
a mountable enclosure having at least one surface, the mountable enclosure being mountable on or in the robotic vehicle;
a processing module disposed within the mountable enclosure, the processing module being configured for monitoring sensors on or in the robotic vehicle; for determining a role of the robotic control module based on (i) a location of the robotic control module in the vehicle or (ii) a physical connection to the robotic control module; and for executing and arbitrating among mobile robotic control behaviors that are configured to control operation of the robotic vehicle based on the role of the robotic control module, the processing module comprising a processor and memory, the memory comprising transceiver monitoring code, the processing module comprising at least one protocol transceiver configured for executing the transceiver monitoring code, the mobile robotic control behaviors comprising steering actuator control, braking actuator control, throttle actuator control, transmission actuator control, and sensor driver, the mobile robotic control behaviors being executable by the processing module for causing actuator control signals to be transmitted from the mountable enclosure, the actuator control signals being configured to robotically control actuator operation in a vehicle steering system, a vehicle braking system, a vehicle throttle system, and a vehicle transmission system;
a reprogrammable actuator controller configured for communicating with the processing module, the reprogrammable actuator controller being disposed within the mountable enclosure and configured for issuing the actuator control signals based at least in part on the mobile robotic control behaviors and for controlling signals other than the actuator control signals for actuator driving;
a packet network switch disposed within the mountable enclosure;
a protocol transceiver connector on the at least one surface of the mountable enclosure, the protocol transceiver connector being configured for communicating with a plurality of protocol transceivers sensors;
a network connector on the at least one surface of the mountable enclosure, the network connector being configured for connecting to a packet network and communicating with the packet network switch, wherein the processing module is configured for transmitting instructions to the packet network through the network connector; and
a power supply disposed within the mountable enclosure, the power supply being configured for receiving power from the mobile robotic platform through a power input to the mountable enclosure and converting the power into interior power.

21. The robotic control modular enclosure of claim 20, further comprising a power supply connector on the at least one surface of the mountable enclosure, the power supply connector being configured for connecting to an exterior regulated power; and
wherein the power supply is configured for receiving unregulated power from a mobile robotic platform in the robotic vehicle through a power input to the mountable enclosure and converting the unregulated power into interior regulated power for the processor module and the packet network switch, and into exterior regulated power.

22. The robotic control modular enclosure of claim 20, further comprising an actuator connector on the at least one surface of the mountable enclosure, the actuator connector being in communication with the reprogrammable actuator controller and being configured for transmitting the actuator control signals.

23. The robotic control modular enclosure of claim 20, further comprising an actuator amplifier within the mountable enclosure configured for amplifying the actuator control signals from the reprogrammable actuator controller.

24. A robotic control modular enclosure for use in a robotic vehicle, comprising:

a mountable enclosure having at least one surface, the mountable enclosure being mountable on or in the robotic vehicle;

a processing module disposed within the mountable enclosure, the processing module being configured for monitoring sensors on or in the robotic vehicle; for determining a role of the robotic control module based on (i) a location of the robotic control module in the vehicle or (ii) a physical connection to the robotic control module; and for executing and arbitrating among mobile robotic control behaviors that are configured to control operation of the robotic vehicle based on the role of the robotic control module, and having a processor and memory, the memory comprising transceiver monitoring code, the processing module comprising at least one protocol transceiver configured for executing the transceiver monitoring code, the mobile robotic control behaviors comprising steering actuator control, braking actuator control, throttle actuator control, transmission actuator control, and sensor driver;

a network connector on the at least one surface of the mountable enclosure, the network connector being configured for connecting to a network that is configured for transmitting instructions to the processing module;

a reprogrammable actuator controller configured for communicating with the processing module, the reprogrammable actuator controller being disposed within the mountable enclosure and configured for issuing actuator control signals based at least in part on the mobile robotic control behaviors and for controlling signals other than the actuator control signals for actuator driving, the actuator control signals being configured to robotically control actuator operation in a vehicle steering system, a vehicle braking system, a vehicle throttle system, and a vehicle transmission system;

an actuator amplifier disposed within the mountable enclosure, the actuator amplifier being configured for amplifying the actuator control signal from the reprogrammable actuator controller; and a power supply disposed within the mountable enclosure, the power supply being configured for receiving unregulated power from the mobile robotic platform through a power input to the mountable enclosure and converting the unregulated power into interior regulated power for the processing module and into exterior regulated power.

25. The robotic control modular enclosure of claim 24, further comprising a power supply connector on the at least one surface of the mountable enclosure, the power supply connector being configured for connecting to an exterior regulated power.

26. The robotic control modular enclosure of claim 24, further comprising a packet network switch disposed within the mountable enclosure, the packet network switch being configured for communicating with the network connector.

27. The robotic control modular enclosure of claim 24, further comprising an actuator connector on the at least one surface of the mountable enclosure, the actuator connector being configured for communicating with an actuator drive signal modulated by the reprogrammable actuator controller and the actuator amplifier.

28. A robotic control modular enclosure for use in a robotic vehicle, comprising:

a mountable enclosure having at least one surface, the mountable enclosure being mountable in or on the robotic vehicle;

a processing module within the mountable enclosure having a processor and memory, the memory comprising mobile robotic control behaviors, wherein the processing module is configured for determining a role of the robotic control module based on (i) a location of the robotic control module in the vehicle or (ii) a physical connection to the robotic control module; and for executing and arbitrating among the mobile robotic control behaviors that are configured to control operation of the robotic vehicle based on the role of the robotic control module, the mobile robotic control behaviors comprising steering actuator control, braking actuator control, throttle actuator control, transmission actuator control, and sensor driver;

a reprogrammable actuator controller configured for communicating with the processing module, the reprogrammable actuator controller being disposed within the mountable enclosure and configured for issuing actuator control signals based at least in part on the mobile robotic control behaviors and for controlling signals other than signals for actuator driving;

an actuator connector on the at least one surface of the mountable enclosure, the actuator connector being in communication with the reprogrammable actuator controller and configured for transmitting actuator control signals that are configured for robotically controlling actuator operation in a vehicle steering system, a vehicle braking system, a vehicle throttle system, and a vehicle transmission system; and a network connector on the at least one surface of the mountable enclosure, the network connector being configured for connecting to a network, wherein the processing module is configured for transmitting instructions to the network.

29. The robotic control modular enclosure of claim 28, wherein the mobile robotic control behaviors further comprise a teleoperation mode, an obstacle avoidance mode, a waypoint navigation mode, and a following mode.

30. The robotic control modular enclosure of claim 28, wherein the memory comprises a vehicle control unit interface for communicating with a vehicle control unit in the robotic vehicle.

31. The robotic control modular enclosure of claim 28, further comprising a power supply disposed within the mountable enclosure, the power supply being configured for receiving unregulated power from a mobile robotic platform in the robotic vehicle through a power input to the mountable enclosure and converting the unregulated power into interior regulated power for the processing module, and into exterior regulated power.

32. A robotic control modular enclosure for use in a robotic vehicle, comprising:

a mountable enclosure having at least one surface, the mountable enclosure being mountable in or on the robotic vehicle;

a processing module disposed within the mountable enclosure, the processing module having a processor and memory, the memory comprising mobile robotic control behaviors, wherein the processing module is configured for determining a role of the robotic control module based on (i) a location of the robotic control module in the vehicle or (ii) a physical connection to the robotic control module; and for executing and arbitrating among the mobile robotic control behaviors that are configured to control operation of the robotic vehicle based on the role of the robotic control module, the mobile robotic control behaviors comprising steering actuator control, braking actuator control, throttle actuator control, transmission actuator control, and sensor driver;

a reprogrammable actuator controller configured for communicating with the processing module, the reprogrammable actuator controller being disposed within the mountable enclosure and configured for issuing actuator control signals based at least in part on the mobile robotic control behaviors and for controlling signals other than the actuator control signals for actuator driving, the actuator control signals being configured to robotically control actuator operation in a vehicle steering system, a vehicle braking system, a vehicle throttle system, and a vehicle transmission system;

a packet network switch disposed within the mountable enclosure configured for relaying instructions for the reprogrammable actuator controller; and a power supply disposed within the mountable enclosure, the power supply being configured for receiving unregulated power from the mobile robotic platform through a power input to the mountable enclosure and converting the unregulated power into interior regulated power for the processing module, and into exterior regulated power.

33. The robotic control modular enclosure of claim 32, wherein the mobile robotic control behaviors further comprise a teleoperation mode, an obstacle avoidance mode, a waypoint navigation mode, and a following mode.

34. The robotic control modular enclosure of claim 32, wherein the memory comprises a vehicle control unit interface for communicating with a vehicle control unit in the robotic vehicle.

35. The robotic control modular enclosure of claim 32, further comprising an actuator amplifier disposed within the mountable enclosure configured for amplifying the actuator control signal from the reprogrammable actuator controller.

36. A robotic control apparatus for a robotic vehicle, comprising:
  a mountable modular enclosure having at least one surface, the mountable modular enclosure being mountable on or in the robotic vehicle;
  a reprogrammable actuator controller disposed within the mountable modular enclosure and configured for controlling signals other than signals for actuator driving;
  a processor module disposed within the mountable modular enclosure, wherein the processing module is configured for executing and arbitrating among mobile robotic control behaviors based on (i) a location of the mountable modular enclosure module in the vehicle or (ii) a physical connection to the mountable modular enclosure;
  an actuator connector on the at least one surface of the mountable modular enclosure, the actuator connector being configured for communicating the signals for actuator driving in a vehicle steering system, a vehicle braking system, a vehicle throttle system, and a vehicle transmission system, the signals being modulated by the reprogrammable actuator controller and based on the mobile robotic control behaviors, the mobile robotic control behaviors comprising steering actuator control, braking actuator control, throttle actuator control, transmission actuator control, and sensor driver;
  a packet network switch disposed within the mountable modular enclosure, the packet network being configured for relaying instructions for the reprogrammable actuator controller;
  a plurality of network connectors on the at least one surface of the mountable modular enclosure, the plurality of network connectors being configured for connecting to a packet network and communicating with the packet network switch;
  a power supply disposed within the mountable modular enclosure, the power supply being configured for receiving unregulated power from a mobile robotic platform in the robotic vehicle through a power input to the mountable modular enclosure and converting the unregulated power into interior regulated power for the packet network switch and the reprogrammable actuator controller, and into exterior regulated power; and
  a power supply connector on the at least one surface of the mountable modular enclosure, the power supply connector being configured for connecting to the exterior regulated power.

37. The robotic control apparatus of claim 36, wherein the signals for actuator driving are from an actuator amplifier that is modulated by the reprogrammable actuator controller.

38. The robotic control apparatus of claim 36, wherein the signals for actuator driving are from an actuator amplifier that is modulated by the reprogrammable actuator controller and the actuator amplifier.

39. The robotic control apparatus of claim 36, wherein the reprogrammable actuator controller is configured for processing and includes one of a digital signal processor, programmable logic device, or gate array; and
  wherein at least part of the processing capability control signals other than the signals for actuator driving.

40. A robotic control apparatus for a robotic vehicle, comprising:
  a mountable modular enclosure having at least one surface, the mountable modular enclosure being mountable on or in the robotic vehicle;
  a processor module disposed within the mountable modular enclosure, wherein the processing module is configured for executing and arbitrating among mobile robotic control behaviors based on (i) a location of the mountable modular enclosure module in the vehicle or (ii) a physical connection to the mountable modular enclosure;
  a reprogrammable actuator controller disposed within the mountable modular enclosure, the reprogrammable actuator controller being configured for issuing actuator control signals within the mountable module and for controlling signals other than the actuator control signals for actuator driving, the actuator control signals being based on the mobile robotic control behaviors, the mobile robotic control behaviors comprising steering actuator control, braking actuator control, throttle actuator control, transmission actuator control, and sensor driver;
  an actuator amplifier disposed within the mountable modular enclosure, the actuator amplifier being configured for receiving the actuator control signals from the reprogrammable actuator controller;
  an actuator connector on the at least one surface of the mountable modular enclosure, the actuator connector being configured for communicating actuator drive signals modulated by the reprogrammable actuator controller and the actuator amplifier based on the actuator control signals, the actuator drive signals being configured to robotically control actuator operation in a vehicle steering system, a vehicle braking system, a vehicle throttle system, and a vehicle transmission system;
  a packet network switch disposed within the mountable modular enclosure;

a plurality of network connectors on the at least one surface of the mountable modular enclosure, the plurality of network connectors being configured for connecting to a packet network and communicating with the packet network switch, the packet network being configured for relaying instructions for the reprogrammable actuator controller;

a power supply disposed within the mountable modular enclosure, the power supply being configured for receiving unregulated power from a mobile robotic platform in the robotic vehicle through a power input to the mountable modular enclosure and converting the unregulated power into interior regulated power for the packet network switch and the reprogrammable actuator controller, and into exterior regulated power; and a power supply connector on the at least one surface of the mountable modular enclosure, the power supply connector being configured for connecting to the exterior regulated power.

41. A robotic control unit for use in an autonomous vehicle, comprising:

a single enclosure mountable on or in the autonomous vehicle;

a power supply integrated into the single enclosure;

a processor module integrated into the single enclosure;

a motor controller integrated into the single enclosure;

a motor amplifier positioned proximate to the motor controller integrated into the single enclosure;

a reprogrammable actuator controller configured for communicating with the processor module, the reprogrammable actuator controller being disposed within the mountable enclosure and configured for issuing actuator control signals based at least in part on the mobile robotic control behaviors and for controlling signals other than the actuator control signals for actuator driving; and an Ethernet switch integrated into the single enclosure, wherein the processor module, motor controller and motor amplifier are configured for robotically controlling actuator operation in a vehicle steering system, a vehicle braking system, a vehicle throttle system, and a vehicle transmission system based on mobile robotic control behaviors comprising steering actuator control, braking actuator control, throttle actuator control, transmission actuator control, and sensor driver, and wherein the processor module is configured for:

determining a role of the robotic control unit based on (i) a location of the robotic control unit in the vehicle or (ii) a physical connection to the robotic control unit; and executing and arbitrating among the mobile robotic control behaviors based on the role of the robotic control unit.

42. A robotic control unit for use in an autonomous vehicle, comprising:

an enclosure mountable on or in the autonomous vehicle;

a processor within the enclosure; and a reprogrammable actuator controller configured for communicating with the processor, the reprogrammable actuator controller being disposed within the mountable enclosure and configured for issuing actuator control signals based at least in part on the mobile robotic control behaviors and for controlling signals other than the actuator control signals for actuator driving, wherein the robotic control unit is configured for controlling at least one motor associated with an operating system of the autonomous vehicle based on mobile robotic control behaviors comprising steering actuator control, braking actuator control, throttle actuator control, and transmission actuator control, the operating system being selected from the group consisting of a vehicle steering system, a vehicle braking system, a vehicle throttle system, and a vehicle transmission system, wherein the processor module is configured for:

determining a role of the robotic control unit based on (i) a location of the robotic control unit in the vehicle or (ii) a physical connection to the robotic control unit; and executing and arbitrating among the mobile robotic control based on the role of the robotic control unit, and wherein the robotic control unit is configured for receiving unregulated vehicle power and outputting regulated power.

43. A robotics kit for use on a vehicle, comprising:

at least one robotic control unit having a single enclosure mountable on or in the vehicle and configurable to have, within the single enclosure, at least three of a power supply, an Ethernet switch, a motor controller, or a motor amplifier; and a reprogrammable actuator controller configured for communicating with the processor, the reprogrammable actuator controller being disposed within the mountable enclosure and configured for issuing actuator control signals based at least in part on the mobile robotic control behaviors and for controlling signals other than the actuator control signals for actuator driving, a processor configured for determining a role of the robotic control unit based on (i) a location of the robotic control unit in the vehicle or (ii) a physical connection to the robotic control unit; and for executing and arbitrating among the mobile robotic control behaviors based on the role of the robotic control unit, wherein the single enclosure is sized to fit into available idle spaces in the vehicle and the single enclosure is configurable for outputting actuator control signals based on mobile robotic control behaviors comprising steering actuator control, braking actuator control, throttle actuator control, transmission actuator control, and sensor driver, the actuator control signals being configured to robotically control actuator operation in a vehicle steering system, a vehicle braking system, a vehicle throttle system, and a vehicle transmission system.

44. The robotics kit of claim 43, wherein the dimensions of the robotic control unit are less than 5 inches by 8 inches by 10 inches.

45. A robotic vehicle control system for a robotic vehicle, comprising:

a plurality of interchangeable mountable modular enclosures, each interchangeable mountable modular enclosure being mountable on or in the robotic vehicle and comprising:

at least one surface;

a power input;

an actuator connector on the at least one surface;

a plurality of network connectors on the at least one surface;

a power supply connector on the at least one surface;

a reprogrammable actuator controller configured for communicating signals for actuator driving and for controlling signals other than signals for actuator driving, the signals being modulated by the actuator controller and based on mobile robotic control behaviors;

a packet network switch, each network connector being configured for connecting to a packet network and communicating with the packet network switch, the packet network being configured for relaying instructions for the actuator controller;

a power supply, the power supply being configured for receiving unregulated power from a mobile robotic platform of the robotic vehicle through the power input and converting the unregulated power into interior regulated power for the packet network switch and the reprogrammable actuator controller, and into exterior regulated power, the power supply connector being connected to the exterior regulated power; and a memory including executable code comprising the mobile robotic control behaviors comprising steering actuator control, braking actuator control, throttle actuator control, transmission actuator control, and sensor driver, wherein each interchangeable mountable modular enclosure is configurable to execute a selected part of the executable code such that each of the plurality of interchangeable mountable modular enclosures is provided with multiple possible executable code parts for different modular roles and each of the plurality of interchangeable mountable modular enclosures is configurable to execute only the selected part of the executable code appropriate for a selected modular role, wherein the modular roles comprise controlling a vehicle sensor and robotically controlling actuator operation in a vehicle steering system, a vehicle braking system, a vehicle throttle system, and a vehicle transmission system, wherein the modular role is based on (i) a location of the interchangeable mountable modular enclosure in the robotic vehicle or (ii) a physical connection to the interchangeable mountable modular enclosure.

46. A system, comprising:
a robotic control system configured for controlling a vehicle control system, the robotic control system comprising:
  a packet network configured for fitting to extend into and between available idle space within interior compartments of a vehicle body; and
  a plurality of interchangeable robotic modular enclosures configured to connect to the packet network, each interchangeable robotic modular enclosure comprising:
    a single housing mountable into the available idle space;
    a processing module, memory, a reprogrammable actuator controller, and a packet network switch, all integrated into the single housing, the memory comprising mobile robotic control behaviors comprising steering actuator control, braking actuator control, throttle actuator control, transmission actuator control, and sensor driver, wherein the reprogrammable actuator controller is configured for communicating with the processor module and for controlling signals other than signals for actuator driving;
  wherein the processing module is configured for determining a role of the interchangeable robotic modular enclosure based on (i) a location of the interchangeable robotic modular enclosure in the vehicle or (ii) a physical connection to the interchangeable robotic modular enclosure; and for executing and arbitrating among the mobile robotic control behaviors based on the role of the interchangeable robotic modular enclosure; and
  a network connector on a surface of the single housing, the network connector being configured for connecting to the packet network and communicating with the packet network switch; and
  the vehicle control system coupled to the vehicle body, the vehicle control system being configured to control a vehicle operational system of the robotic vehicle based on the mobile robotic control behaviors, the vehicle operational system comprising a vehicle steering system, a vehicle braking system, a vehicle throttle system, and a vehicle transmission system.

47. The robotic control module of claim 12, wherein the enclosure comprises:
a first circuit board arranged within the single housing and extending from the front face to the rear face, the first circuit board comprising the processor arranged toward the front face of the single housing; and
a second circuit board arranged with the single housing parallel to the first circuit board and extending from the front face to the rear face, the second circuit board comprising a motor amplifier inductor and a power supply inductor arranged toward the rear face of the housing.

48. The robotic control module of claim 47, wherein the enclosure further comprises:
a third circuit board arranged within the single housing parallel to the first circuit board and the second circuit board and extending from the front face to the rear face, the third circuit board being between the first circuit board and the second circuit board.

* * * * *